US010893279B2

(12) United States Patent
Suzuki et al.

(10) Patent No.: US 10,893,279 B2
(45) Date of Patent: Jan. 12, 2021

(54) DECODING APPARATUS AND DECODING METHOD, AND CODING APPARATUS AND CODING METHOD

(71) Applicant: SONY CORPORATION, Tokyo (JP)

(72) Inventors: Teruhiko Suzuki, Kanagawa (JP); James Gamei, Kingston-upon-Thames (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/585,899

(22) Filed: Sep. 27, 2019

(65) Prior Publication Data
US 2020/0029083 A1  Jan. 23, 2020

Related U.S. Application Data

(63) Continuation of application No. 15/037,204, filed as application No. PCT/JP2014/084229 on Dec. 25, 2014, now Pat. No. 10,523,952.

(30) Foreign Application Priority Data

Jan. 8, 2014 (JP) .................................. 2014-002047
Jan. 10, 2014 (JP) .................................. 2014-003739

(51) Int. Cl.
*H04N 19/176* (2014.01)
*H04N 19/70* (2014.01)
(Continued)

(52) U.S. Cl.
CPC .......... *H04N 19/176* (2014.11); *H04N 19/115* (2014.11); *H04N 19/157* (2014.11); *H04N 19/70* (2014.11)

(58) Field of Classification Search
CPC .. C07D 215/56; C07D 471/04; H04N 19/115; H04N 19/157; H04N 19/176; H04N 19/70
See application file for complete search history.

(56) References Cited

U.S. PATENT DOCUMENTS

2007/0274393 A1  11/2007  Toma et al.
2008/0101457 A1  5/2008  Toma et al.
(Continued)

FOREIGN PATENT DOCUMENTS

JP  2007-336573 A  12/2007
WO  WO 2013/065431 A1  5/2013

OTHER PUBLICATIONS

Sullivan et al, Overview of the High Efficiency Video Coding (HEVC) Standard, Dec. 2012, IEEE, 1649-1668 (Year: 2012).*
(Continued)

*Primary Examiner* — Joon Kwon
(74) *Attorney, Agent, or Firm* — Paratus Law Group, PLLC

(57) ABSTRACT

The present disclosure relates to a decoding apparatus and a decoding method and a coding apparatus and a coding method capable of adjusting a compression rate of a lowest limit. A decoding unit decodes a bit stream coded according to an H.265/HEVC standard having a profile in which a lowest compression rate at the time of coding an image is set for each of a main tier and a high tier in units of Coding Units (CU) that are recursively divided. The present disclosure, for example, can be applied to a decoding apparatus of an High Efficiency Video Coding (HEVC) system and the like.

10 Claims, 41 Drawing Sheets

Table A-2—Tier and level limits for the Main and Main 10 profiles

| Level | Max luma sample rate MaxLumaSr (samples/sec) | Max bit rate MaxBR (CpbBrVclFactor or CpbBrNalFactor bits/s) | | MinCrBase | |
|---|---|---|---|---|---|
| | | Main tier | High tier | Main tier | High tier |
| 1 | 552 960 | 128 | – | 2 | – |
| 2 | 3 686 400 | 1 500 | – | 2 | – |
| 2.1 | 7 372 800 | 3 000 | – | 2 | – |
| 3 | 16 588 800 | 6 000 | – | 2 | – |
| 3.1 | 33 177 600 | 10 000 | – | 2 | – |
| 4 | 66 846 720 | 12 000 | 120 000 | 4 | 2 |
| 4.1 | 133 693 440 | 20 000 | 200 000 | 4 | 2 |
| 5 | 267 386 880 | 25 000 | 400 000 | 6 | 3 |
| 5.1 | 534 773 760 | 40 000 | 640 000 | 8 | 4 |
| 5.2 | 1 069 547 520 | 60 000 | 960 000 | 8 | 4 |
| 6 | 1 069 547 520 | 60 000 | 960 000 | 8 | 4 |
| 6.1 | 2 139 095 040 | 120 000 | 1 920 000 | 8 | 4 |
| 6.2 | 4 278 190 080 | 240 000 | 3 200 000 | 6 | 3 |

(51) Int. Cl.
*H04N 19/115* (2014.01)
*H04N 19/157* (2014.01)

(56) References Cited

U.S. PATENT DOCUMENTS

2013/0294522 A1 11/2013 Lim et al.
2014/0003525 A1 1/2014 Fuldseth

OTHER PUBLICATIONS

Jul. 11, 2019, Japanese Office Action issued for related JP Application No. 2015-556767.
Flynn, et al., High Efficiency Video Coding (HEVC) Range Extensions text specification: Draft 4, Joint Collaborative Team on Video Coding (JCT-VC) of ITU-T SG16 WP3 and ISO/IEC JTC1/SC29/WG11, Apr. 18-26, 2013, pp. 1-311, 13th Meeting: Incheon, KR.
Bross, et al., Editors' proposed corrections to HEVC version 1, Joint Collaborative Team on Video Coding (JCT-VC) of ITU-T SG16 WP3 and ISO/IEC JTC1/SC29/WG11, Apr. 18-26, 2013, pp. 1-298, 13th Meeting: Incheon, KR.
Flynn, et al., High Efficiency Video Coding (HEVC) Range Extensions text specification: Draft 4, Joint Collaborative Team on Video Coding (JCT-VC) of ITU-T SG16 WP3 and ISO/IEC JTC1/SC29/WG11, Oct. 23-Nov. 1, 2013, pp. 1 and 223-231, 15th Meeting: Geneva, CH.
Okubo et al., H.265/HEVC, Oct. 21, 2013, pp. 1, 97, and 98, Impress Japan Corporation, Tokyo, Japan.
Suzuki, On MinCR, Joint Collaborative Team on Video Coding (JCT-VC) of ITU-T SG16 WP3 and ISO/IEC JTC1/SC29/WG11, Jan. 9-17, 2014, pp. 1-3, 16th Meeting: San Jose, US.
Jul. 24, 2018, Chinese Office Action issued for related CN application No. 201480072111.1.
Sullivan et al., Overview of the High Efficiency Video Coding (HEVC) Standard, IEEE Transactions on Circuits and Systems for Video Technology, Dec. 2012, pp. 1649-1668, vol. 22, No. 12, IEEE.
Jul. 24, 2018, Japanese Office Action issued for related JP application No. 2015-556767.
Okubo et al., H.265/HEVC Textbook, Oct. 21, 2013, pp. 97-99, Impress Japan Corporation, Tokyo, Japan.
Jan. 22, 2019, Japanese Office Action issued for related JP Application No. 2015-556767.
Chen et al., High efficiency video coding (HEVC) scalable extension Draft 4, Joint Collaborative Team on Video Coding (JCT-VC) of ITU-T SG 16 WP 3 and ISO/IEC JTC 1/SC 29/WG 11, Oct. 23-Nov. 1, 2013, pp. 1 and 49, 15th Meeting: Geneva, CH.
Okubo et al., H.265/HEVC Textbook, Oct. 21, 2013, pp. 298 and 299, Impress Japan Corporation, Tokyo, Japan.

* cited by examiner

FIG. 1

| Level | Max luma picture size MaxLumaPs(samples) | Max CPB size MaxCPB (1000 or 1100 bits) | | Max slice segments per picture MaxSliceSegmentsPerPicture | Max # of tile rows MaxTileRows | Max # of tile columns MaxTileCols |
|---|---|---|---|---|---|---|
| | | Main tier | High tier | | | |
| 1 | 36 864 | 350 | – | 16 | 1 | 1 |
| 2 | 122 880 | 1 500 | – | 16 | 1 | 1 |
| 2.1 | 245 760 | 3 000 | – | 20 | 1 | 1 |
| 3 | 552 960 | 6 000 | – | 30 | 2 | 2 |
| 3.1 | 983 040 | 10 000 | – | 40 | 3 | 3 |
| 4 | 2 228 224 | 12 000 | 30 000 | 75 | 5 | 5 |
| 4.1 | 2 228 224 | 20 000 | 50 000 | 75 | 5 | 5 |
| 5 | 8 912 896 | 25 000 | 100 000 | 200 | 11 | 10 |
| 5.1 | 8 912 896 | 40 000 | 160 000 | 200 | 11 | 10 |
| 5.2 | 8 912 896 | 60 000 | 240 000 | 200 | 11 | 10 |
| 6 | 35 651 584 | 60 000 | 240 000 | 600 | 22 | 20 |
| 6.1 | 35 651 584 | 120 000 | 480 000 | 600 | 22 | 20 |
| 6.2 | 35 651 584 | 240 000 | 800 000 | 600 | 22 | 20 |

FIG. 2

| Level | Max luma sample rate MaxLumaSr (samples/sec) | Max bit rate MaxBR (CpbBrVclFactor or CpbBrNalFactor bits/s) | | Min compression ratio MinCr |
|---|---|---|---|---|
| | | Main tier | High tier | |
| 1 | 552 960 | 128 | – | 2 |
| 2 | 3 686 400 | 1 500 | – | 2 |
| 2.1 | 7 372 800 | 3 000 | – | 2 |
| 3 | 16 588 800 | 6 000 | – | 2 |
| 3.1 | 33 177 600 | 10 000 | – | 2 |
| 4 | 66 846 720 | 12 000 | 30 000 | 4 |
| 4.1 | 133 693 440 | 20 000 | 50 000 | 4 |
| 5 | 267 386 880 | 25 000 | 100 000 | 6 |
| 5.1 | 534 773 760 | 40 000 | 160 000 | 8 |
| 5.2 | 1 069 547 520 | 60 000 | 240 000 | 8 |
| 6 | 1 069 547 520 | 60 000 | 240 000 | 8 |
| 6.1 | 2 139 095 040 | 120 000 | 480 000 | 8 |
| 6.2 | 4 278 190 080 | 240 000 | 800 000 | 6 |

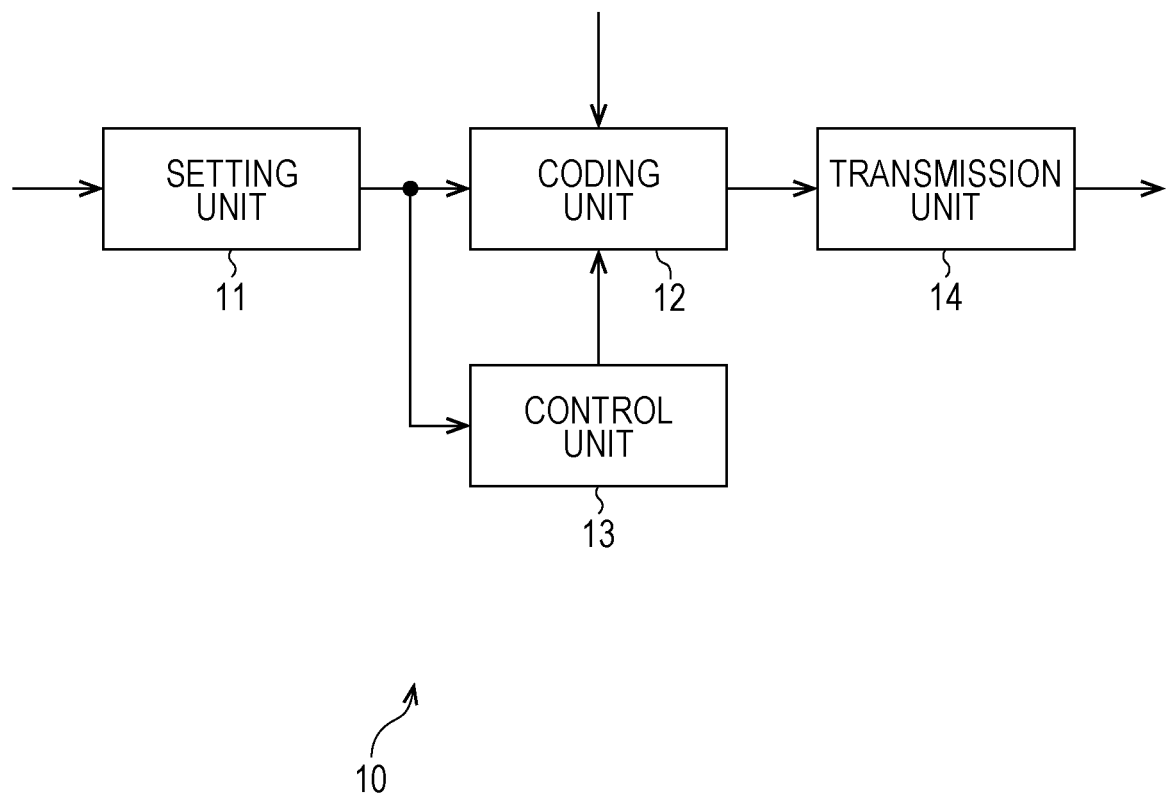

FIG. 4

| profile_tier_level(maxNumSubLayersMinus1) { | Descriptor |
|---|---|
| general_profile_space | u(2) |
| general_tier_flag | u(1) |
| general_profile_idc | u(5) |
| for(j = 0; j < 32; j++) | |
|    general_profile_compatibility_flag[j] | u(1) |
| general_progressive_source_flag | u(1) |
| general_interlaced_source_flag | u(1) |
| general_non_packed_constraint_flag | u(1) |
| general_frame_only_constraint_flag | u(1) |
| general_max_12bit_constraint_flag | u(1) |
| general_max_10bit_constraint_flag | u(1) |
| general_max_8bit_constraint_flag | u(1) |
| general_max_422chroma_constraint_flag | u(1) |
| general_max_420chroma_constraint_flag | u(1) |
| general_max_monochrome_constraint_flag | u(1) |
| general_intra_constraint_flag | u(1) |
| general_lower_bit_rate_constraint_flag | u(1) |
| general_higher_bit_rate_indication_flag | u(1) |
| general_reserved_zero_35bits | u(35) |
| general_level_idc | u(8) |

FIG. 5

| Profile | CpbBrVclFactor | CpbBrNalFactor | FormatCapability Factor | MinCrScaleFactor |
|---|---|---|---|---|
| Monochrome 12 | 1000 * ShFactor | 1100 * ShFactor | 1.500 | 1.0 ÷ HbrFactor |
| Monochrome 16 | 1000 * ShFactor | 1100 * ShFactor | 2.000 | 1.0 ÷ HbrFactor |
| Main | 1000 * ShFactor | 1100 * ShFactor | 1.500 | 1.0 ÷ HbrFactor |
| Main 10 | 1000 * ShFactor | 1100 * ShFactor | 1.875 | 1.0 ÷ HbrFactor |
| Main 12 | 1000 * ShFactor | 1100 * ShFactor | 2.250 | 1.0 ÷ HbrFactor |
| Main 4:2:2 10 | 1250 * ShFactor | 1375 * ShFactor | 2.500 | 0.5 ÷ HbrFactor |
| Main 4:2:2 12 | 1250 * ShFactor | 1375 * ShFactor | 3.000 | 0.5 ÷ HbrFactor |
| Main 4:4:4 10 | 1500 * ShFactor | 1650 * ShFactor | 3.750 | 0.5 ÷ HbrFactor |
| Main 4:4:4 12 | 1500 * ShFactor | 1650 * ShFactor | 4.500 | 0.5 ÷ HbrFactor |
| Main Intra | 1000 * HbrFactor | 1100 * HbrFactor | 1.500 | 1.0 ÷ HbrFactor |
| Main 10 Intra | 1000 * HbrFactor | 1100 * HbrFactor | 1.875 | 1.0 ÷ HbrFactor |
| Main 12 Intra | 1000 * HbrFactor | 1100 * HbrFactor | 2.250 | 1.0 ÷ HbrFactor |
| Main 4:2:2 10 Intra | 1250 * HbrFactor | 1375 * HbrFactor | 2.500 | 0.5 ÷ HbrFactor |
| Main 4:2:2 12 Intra | 1250 * HbrFactor | 1375 * HbrFactor | 3.000 | 0.5 ÷ HbrFactor |

FIG. 6

Long GOP profiles

| Tier | general_tier_flag | general_intra_constraint_flag | general_lower_bit_rate_constraint_flag | general_higher_bit_rate_indication_flag | HbrFactor | ShFactor |
|---|---|---|---|---|---|---|
| Main | 0 | 0 or 1 | 1 | 0 | 1 | 1 |
| High | 1 | 0 or 1 | 1 | 1 | 2 | 1 |
| Super High | 1 | 0 or 1 | 0 | 1 | 4 | 4 |

All Intra profiles

| Tier | general_tier_flag | general_intra_constraint_flag | general_lower_bit_rate_constraint_flag | general_higher_bit_rate_indication_flag | HcrFactor | HbrFactor |
|---|---|---|---|---|---|---|
| Main | 0 | 1 | 0 or 1 | 0 | 2 or 1 | 2 or 1 |
| High | 1 | 1 | 0 or 1 | 1 | 4 or 2 | 4 or 2 |
| Super High | 1 | 1 | 0 | 1 | 4 | 4 |

FIG. 16

| Profile | CpbBrVclFactor | CpbBrNalFactor | FormatCapability Factor | MinCrScaleFactor |
|---|---|---|---|---|
| Monochrome 12 | 1000 * ShFactor | 1100 * ShFactor | 1.500 | 1.0 ÷ HbrFactor |
| Monochrome 16 | 1000 * ShFactor | 1100 * ShFactor | 2.000 | 1.0 ÷ HbrFactor |
| Main | 1000 * ShFactor | 1100 * ShFactor | 1.500 | 1.0 ÷ ShFactor |
| Main 10 | 1000 * ShFactor | 1100 * ShFactor | 1.875 | 1.0 ÷ ShFactor |
| Main 12 | 1000 * ShFactor | 1100 * ShFactor | 2.250 | 1.0 ÷ HbrFactor |
| Main 4:2:2 10 | 1250 * ShFactor | 1375 * ShFactor | 2.500 | 0.5 ÷ HbrFactor |
| Main 4:2:2 12 | 1250 * ShFactor | 1375 * ShFactor | 3.000 | 0.5 ÷ HbrFactor |
| Main 4:4:4 10 | 1500 * ShFactor | 1650 * ShFactor | 3.750 | 0.5 ÷ HbrFactor |
| Main 4:4:4 12 | 1500 * ShFactor | 1650 * ShFactor | 4.500 | 0.5 ÷ HbrFactor |
| Main Intra | 1000 * HbrFactor | 1100 * HbrFactor | 1.500 | 1.0 ÷ HbrFactor |
| Main 10 Intra | 1000 * HbrFactor | 1100 * HbrFactor | 1.875 | 1.0 ÷ HbrFactor |
| Main 12 Intra | 1000 * HbrFactor | 1100 * HbrFactor | 2.250 | 1.0 ÷ HbrFactor |
| Main 4:2:2 10 Intra | 1250 * HbrFactor | 1375 * HbrFactor | 2.500 | 0.5 ÷ HbrFactor |
| Main 4:2:2 12 Intra | 1250 * HbrFactor | 1375 * HbrFactor | 3.000 | 0.5 ÷ HbrFactor |

FIG. 17

Long GOP profiles

| Tier | general_tier_flag | general_intra_constraint_flag | general_lower_bit_rate_constraint_flag | general_higher_bit_rate_indication_flag | HbrFactor | ShFactor |
|---|---|---|---|---|---|---|
| Main | 0 | 0 or 1 | 1 | 0 | 1 | 1 |
| High | 1 | 0 or 1 | 1 | 1 | 2 | 1 |
| Super High | 1 | 0 or 1 | 0 | 1 | 4 | 2 |

All Intra profiles

| Tier | general_tier_flag | general_intra_constraint_flag | general_lower_bit_rate_constraint_flag | general_higher_bit_rate_indication_flag | HbrFactor |
|---|---|---|---|---|---|
| Main | 0 | 1 | 0 or 1 | 0 | 2 or 1 |
| High | 1 | 1 | 0 or 1 | 1 | 4 or 2 |
| Super High | 1 | 1 | 0 | 1 | 4 |

FIG. 18

| Profile | CpbBrVclFactor | CpbBrNalFactor | FormatCapability Factor | MinCrScaleFactor |
|---|---|---|---|---|
| Monochrome 12 | 1000 | 1100 | 1.500 | 1.0 ÷ HbrFactor |
| Monochrome 16 | 1000 | 1100 | 2.000 | 1.0 ÷ HbrFactor |
| Main | 1000 | 1100 | 1.500 | 1.0 ÷ HbrFactor |
| Main 10 | 1000 | 1100 | 1.875 | 1.0 ÷ HbrFactor |
| Main 12 | 1000 | 1100 | 2.250 | 1.0 ÷ HbrFactor |
| Main 4:2:2 10 | 1250 | 1375 | 2.500 | 0.5 ÷ HbrFactor |
| Main 4:2:2 12 | 1250 | 1375 | 3.000 | 0.5 ÷ HbrFactor |
| Main 4:4:4 10 | 1500 | 1650 | 3.750 | 0.5 ÷ HbrFactor |
| Main 4:4:4 12 | 1500 | 1650 | 4.500 | 0.5 ÷ HbrFactor |
| Main Intra | 1000 * HbrFactor' | 1100 * HbrFactor' | 1.500 | 1.0 ÷ HbrFactor |
| Main 10 Intra | 1000 * HbrFactor' | 1100 * HbrFactor' | 1.875 | 1.0 ÷ HbrFactor |
| Main 12 Intra | 1000 * HbrFactor' | 1100 * HbrFactor' | 2.250 | 1.0 ÷ HbrFactor |
| Main 4:2:2 10 Intra | 1250 * HbrFactor' | 1375 * HbrFactor' | 2.500 | 0.5 ÷ HbrFactor |
| Main 4:2:2 12 Intra | 1250 * HbrFactor' | 1375 * HbrFactor' | 3.000 | 0.5 ÷ HbrFactor |

FIG. 19

Long GOP profiles

| Tier | general_tier_flag | general_intra_constraint_flag | general_lower_bit_rate_constraint_flag | general_higher_bit_rate_indication_flag | HbrFactor |
|---|---|---|---|---|---|
| Main | 0 | 0 or 1 | 1 | 0 | 1 |
| High | 1 | 0 or 1 | 1 | 1 | 2 |

All Intra profiles

| Tier | general_tier_flag | general_intra_constraint_flag | general_lower_bit_rate_constraint_flag | general_higher_bit_rate_indication_flag | HbrFactor |
|---|---|---|---|---|---|
| Main | 0 | 1 | 0 or 1 | 0 | 2 or 1 |
| High | 1 | 1 | 0 or 1 | 1 | 4 or 2 |

FIG. 20

| Level | Max luma sample rate MaxLumaSr (samples/sec) | Max bit rate MaxBR (CpbBrVclFactor or CpbBrNalFactor bits/s) | | Min compression ratio MinCr | |
|---|---|---|---|---|---|
| | | Main tier | High tier | Main tier | High tier |
| 1 | 552 960 | 128 | – | 2 | 2 |
| 2 | 3 686 400 | 1 500 | – | 2 | 2 |
| 2.1 | 7 372 800 | 3 000 | – | 2 | 2 |
| 3 | 16 588 800 | 6 000 | – | 2 | 2 |
| 3.1 | 33 177 600 | 10 000 | – | 2 | 2 |
| 4 | 66 846 720 | 12 000 | 30 000 | 4 | 4 |
| 4.1 | 133 693 440 | 20 000 | 50 000 | 4 | 4 |
| 5 | 267 386 880 | 25 000 | 100 000 | 6 | 4 |
| 5.1 | 534 773 760 | 40 000 | 160 000 | 8 | 4 |
| 5.2 | 1 069 547 520 | 60 000 | 240 000 | 8 | 4 |
| 6 | 1 069 547 520 | 60 000 | 240 000 | 8 | 4 |
| 6.1 | 2 139 095 040 | 120 000 | 480 000 | 8 | 4 |
| 6.2 | 4 278 190 080 | 240 000 | 800 000 | 6 | 4 |

Table A-2—Tier and level limits for the Main and Main 10 profiles

FIG. 21

Variant 1: Reduce MinCR for high tier

HbrFactor = (2-general_lower_bit_rate_constraint_flag) + 2*general_higher_bit_rate_indication_flag Table A-3—Specification of CpbBrVclFactor, CpbBrNalFactor, FormatCapabilityFactor, and MinCrScaleFactor

| Profile | CpbBrVclFactor | CpbBrNalFactor | FormatCapability Factor | MinCrScaleFactor |
|---|---|---|---|---|
| Monochrome 12 | 1000 | 1100 | 1.500 | 1.0 ÷ HbrFactor |
| Monochrome 16 | 1000 | 1100 | 2.000 | 1.0 ÷ HbrFactor |
| Main | 1000 | 1100 | 1.500 | 1.0 ÷ HbrFactor |
| Main 10 | 1000 | 1100 | 1.875 | 1.0 ÷ HbrFactor |
| Main 12 | 1000 | 1100 | 2.250 | 1.0 ÷ HbrFactor |
| Main 4:2:2 10 | 1250 | 1375 | 2.500 | 0.5 ÷ HbrFactor |
| Main 4:2:2 12 | 1250 | 1375 | 3.000 | 0.5 ÷ HbrFactor |
| Main 4:4:4 10 | 1500 | 1650 | 3.750 | 0.5 ÷ HbrFactor |
| Main 4:4:4 12 | 1500 | 1650 | 4.500 | 0.5 ÷ HbrFactor |
| Main Intra | 1000 * HbrFactor | 1100 * HbrFactor | 1.500 | 1.0 ÷ HbrFactor |
| Main 10 Intra | 1000 * HbrFactor | 1100 * HbrFactor | 1.875 | 1.0 ÷ HbrFactor |
| Main 12 Intra | 1000 * HbrFactor | 1100 * HbrFactor | 2.250 | 1.0 ÷ HbrFactor |
| Main 4:2:2 10 Intra | 1250 * HbrFactor | 1375 * HbrFactor | 2.500 | 0.5 ÷ HbrFactor |
| Main 4:2:2 12 Intra | 1250 * HbrFactor | 1375 * HbrFactor | 3.000 | 0.5 ÷ HbrFactor |

FIG. 22

Long GOP profiles

| Tier | general_tier_flag | general_intra_constraint_flag | general_lower_bit_rate_constraint_flag | general_higher_bit_rate_indication_flag | HbrFactor |
|---|---|---|---|---|---|
| Main | 0 | 0 or 1 | 1 | 0 | 1 |
| High | 1 | 0 or 1 | 1 | 1 | 2 |

All Intra profiles

| Tier | general_tier_flag | general_intra_constraint_flag | general_lower_bit_rate_constraint_flag | general_higher_bit_rate_indication_flag | HbrFactor |
|---|---|---|---|---|---|
| Main | 0 | 1 | 0 or 1 | 0 | 2 or 1 |
| High | 1 | 1 | 0 or 1 | 1 | 4 or 2 |

VCL HRD parameter: Max bit rate = CpbBrVclFactor * MaxBR
NAL HRD parameter: Max bit rate = CpbBrNalFactor * MaxBR
MinCR = Max(1, MinCrBase * MinCrScaleFactor)

FIG. 23

Variant 2: Add "Super high tier" and MinCR of Main and Main 10 are only changed for new tier HbrFactor = (2−general_lower_bit_rate_constraint_flag) +2*general_higher_bit_rate_indication_flag
ShFactor =1+ (!general_lower_bit_rate_constraint_flag) *general_higher_bit_rate_indication_flag Table A-3—Specification of CpbBrVclFactor, CpbBrNalFactor, FormatCapabilityFactor, and MinCrScaleFactor

| Profile | CpbBrVclFactor | CpbBrNalFactor | FormatCapability Factor | MinCrScaleFactor |
|---|---|---|---|---|
| Monochrome 12 | 1000 * ShFactor | 1100 * ShFactor | 1.500 | 1.0 ÷ HbrFactor |
| Monochrome 16 | 1000 * ShFactor | 1100 * ShFactor | 2.000 | 1.0 ÷ HbrFactor |
| Main | 1000 * ShFactor | 1100 * ShFactor | 1.500 | 1.0 ÷ ShFactor |
| Main 10 | 1000 * ShFactor | 1100 * ShFactor | 1.875 | 1.0 ÷ ShFactor |
| Main 12 | 1000 * ShFactor | 1100 * ShFactor | 2.250 | 1.0 ÷ HbrFactor |
| Main 4:2:2 10 | 1250 * ShFactor | 1375 * ShFactor | 2.500 | 0.5 ÷ HbrFactor |
| Main 4:2:2 12 | 1250 * ShFactor | 1375 * ShFactor | 3.000 | 0.5 ÷ HbrFactor |
| Main 4:4:4 10 | 1500 * ShFactor | 1650 * ShFactor | 3.750 | 0.5 ÷ HbrFactor |
| Main 4:4:4 12 | 1500 * ShFactor | 1650 * ShFactor | 4.500 | 0.5 ÷ HbrFactor |
| Main Intra | 1000 * HbrFactor * ShFactor | 1100 * HbrFactor * ShFactor | 1.500 | 1.0 ÷ HbrFactor |
| Main 10 Intra | 1000 * HbrFactor * ShFactor | 1100 * HbrFactor * ShFactor | 1.875 | 1.0 ÷ HbrFactor |
| Main 12 Intra | 1000 * HbrFactor * ShFactor | 1100 * HbrFactor * ShFactor | 2.250 | 1.0 ÷ HbrFactor |
| Main 4:2:2 10 Intra | 1250 * HbrFactor * ShFactor | 1375 * HbrFactor * ShFactor | 2.500 | 0.5 ÷ HbrFactor |
| Main 4:2:2 12 Intra | 1250 * HbrFactor * ShFactor | 1375 * HbrFactor * ShFactor | 3.000 | 0.5 ÷ HbrFactor |

FIG. 24

Long GOP profiles

| Tier | general_tier_flag | general_intra_constraint_flag | general_lower_bit_rate_constraint_flag | general_higher_bit_rate_indication_flag | HbrFactor | ShFactor |
|---|---|---|---|---|---|---|
| Main | 0 | 0 or 1 | 1 | 0 | 1 | 1 |
| High | 1 | 0 or 1 | 1 | 1 | 2 | 1 |
| Super High | 1 | 0 or 1 | 0 | 1 | 4 | 2 |

All Intra profiles

| Tier | general_tier_flag | general_intra_constraint_flag | general_lower_bit_rate_constraint_flag | general_higher_bit_rate_indication_flag | HbrFactor |
|---|---|---|---|---|---|
| Main | 0 | 1 | 0 or 1 | 0 | 2 or 1 |
| High | 1 | 1 | 0 or 1 | 1 | 4 or 2 |
| Super High | 1 | 1 | 0 | 1 | 4 |

VCL HRD parameter: Max bit rate = CpbBrVclFactor * MaxBR
NAL HRD parameter: Max bit rate = CpbBrNalFactor * MaxBR
MinCR = Max(1, MinCrBase * MinCrScaleFactor)

FIG. 25

HbrFactor = 2 − general_lower_bit_rate_constraint_flag + 2*general_higher_bit_rate_indication_flag ShFactor = 1 + (!general_lower_bit_rate_constraint_flag) *3*general_higher_bit_rate_indication_flag Table A-3—Specification of CpbBrVclFactor, CpbBrNalFactor, FormatCapabilityFactor, and MinCrScaleFactor

| Profile | CpbBrVclFactor | CpbBrNalFactor | FormatCapabilityFactor | MinCrScaleFactor |
|---|---|---|---|---|
| Monochrome 12 | 1000 * ShFactor | 1100 * ShFactor | 1.500 | 1.0 ÷ HbrFactor |
| Monochrome 16 | 1000 * ShFactor | 1100 * ShFactor | 2.000 | 1.0 ÷ HbrFactor |
| Main | 1000 * ShFactor | 1100 * ShFactor | 1.500 | 1.0 ÷ HbrFactor |
| Main 10 | 1000 * ShFactor | 1100 * ShFactor | 1.875 | 1.0 ÷ HbrFactor |
| Main 12 | 1000 * ShFactor | 1100 * ShFactor | 2.250 | 1.0 ÷ HbrFactor |
| Main 4:2:2 10 | 1250 * ShFactor | 1375 * ShFactor | 2.500 | 0.5 ÷ HbrFactor |
| Main 4:2:2 12 | 1250 * ShFactor | 1375 * ShFactor | 3.000 | 0.5 ÷ HbrFactor |
| Main 4:4:4 10 | 1500 * ShFactor | 1650 * ShFactor | 3.750 | 0.5 ÷ HbrFactor |
| Main 4:4:4 12 | 1500 * ShFactor | 1650 * ShFactor | 4.500 | 0.5 ÷ HbrFactor |
| Main Intra | 1000 * HbrFactor * ShFactor | 1100 * HbrFactor * ShFactor | 1.500 | 1.0 ÷ HbrFactor |
| Main 10 Intra | 1000 * HbrFactor * ShFactor | 1100 * HbrFactor * ShFactor | 1.875 | 1.0 ÷ HbrFactor |
| Main 12 Intra | 1000 * HbrFactor * ShFactor | 1100 * HbrFactor * ShFactor | 2.250 | 1.0 ÷ HbrFactor |
| Main 4:2:2 10 Intra | 1250 * HbrFactor * ShFactor | 1375 * HbrFactor * ShFactor | 2.500 | 0.5 ÷ HbrFactor |
| Main 4:2:2 12 Intra | 1250 * HbrFactor * ShFactor | 1375 * HbrFactor * ShFactor | 3.000 | 0.5 ÷ HbrFactor |

FIG. 26

Long GoP profiles

| Tier | general_tier_flag | general_intra_constraint_flag | general_lower_bit_rate_constraint_flag | general_higher_bit_rate_indication_flag | HbrFactor | ShFactor |
|---|---|---|---|---|---|---|
| Main | 0 | 0 or 1 | 1 | 0 | 1 | 1 |
| High | 1 | 0 or 1 | 1 | 1 | 2 | 1 |
| Super High | 1 | 0 or 1 | 0 | 1 | 4 | 4 |

All Intra profiles

| Tier | general_tier_flag | general_intra_constraint_flag | general_lower_bit_rate_constraint_flag | general_higher_bit_rate_indication_flag | HcrFactor | HbrFactor |
|---|---|---|---|---|---|---|
| Main | 0 | 1 | 0 or 1 | 0 | 2 or 1 | 2 or 1 |
| High | 1 | 1 | 0 or 1 | 1 | 4 or 2 | 4 or 2 |
| Super High | 1 | 1 | 0 | 1 | 4 | 4 |

VCL HRD parameter: Max bit rate = CpbBrVclFactor * MaxBR
NAL HRD parameter: Max bit rate = CpbBrNalFactor * MaxBR
MinCR = Max(1, MinCrBase * MinCrScaleFactor)

*FIG. 27*

| profile_tier_level(maxNumSubLayersMinus1) { | Descriptor |
|---|---|
|   general_profile_space | u(2) |
|   general_tier_flag | u(1) |
|   general_profile_idc | u(5) |
|   for(j = 0; j < 32; j++) | |
|     general_profile_compatibility_flag[j] | u(1) |
|   general_progressive_source_flag | u(1) |
|   general_interlaced_source_flag | u(1) |
|   general_non_packed_constraint_flag | u(1) |
|   general_frame_only_constraint_flag | u(1) |
|   general_max_12bit_constraint_flag | u(1) |
|   general_max_10bit_constraint_flag | u(1) |
|   general_max_8bit_constraint_flag | u(1) |
|   general_max_422chroma_constraint_flag | u(1) |
|   general_max_420chroma_constraint_flag | u(1) |
|   general_max_monochrome_constraint_flag | u(1) |
|   general_intra_constraint_flag | u(1) |
|   general_lower_bit_rate_constraint_flag | u(1) |
|   general_super_high_tier_flag | u(1) |
|   general_reserved_zero_35bits | u(35) |
|   general_level_idc | u(8) |

FIG. 28

Table A-1—General tier and level limits

| Level | Max luma picture size MaxLumaPs (samples) | Max CPB size MaxCPB (1000 or 1100 bits) | | | Max slice segments per picture MaxSliceSegmentsPerPicture | Max # of tile rows MaxTileRows | Max # of tile columns MaxTileCols |
|---|---|---|---|---|---|---|---|
| | | Main tier | High tier | Super high tier | | | |
| 1 | 36 864 | 350 | – | – | 16 | 1 | 1 |
| 2 | 122 880 | 1 500 | – | – | 16 | 1 | 1 |
| 2.1 | 245 760 | 3 000 | – | – | 20 | 1 | 1 |
| 3 | 552 960 | 6 000 | – | – | 30 | 2 | 2 |
| 3.1 | 983 040 | 10 000 | – | – | 40 | 3 | 3 |
| 4 | 2 228 224 | 12 000 | 30 000 | 120 000 | 75 | 5 | 5 |
| 4.1 | 2 228 224 | 20 000 | 50 000 | 200 000 | 75 | 5 | 5 |
| 5 | 8 912 896 | 25 000 | 100 000 | 400 000 | 200 | 11 | 10 |
| 5.1 | 8 912 896 | 40 000 | 160 000 | 640 000 | 200 | 11 | 10 |
| 5.2 | 8 912 896 | 60 000 | 240 000 | 960 000 | 200 | 11 | 10 |
| 6 | 35 651 584 | 60 000 | 240 000 | 960 000 | 600 | 22 | 20 |
| 6.1 | 35 651 584 | 120 000 | 480 000 | 1 920 000 | 600 | 22 | 20 |
| 6.2 | 35 651 584 | 240 000 | 800 000 | 3 200 000 | 600 | 22 | 20 |

FIG. 29

Table A-2—Tier and level limits for the Monochrome 12, Monochrome 16, Main, Main 10, Main 12, Main 4:2:2 10, Main 4:2:2 12, Main 4:4:4, Main 4:4:4 10, and Main 4:4:4 12, Main Intra, Main 10 Intra, Main 12 Intra, Main 4:2:2 10 Intra, Main 4:2:2 12 Intra, Main 4:4:4 Intra, Main 4:4:4 10 Intra, and Main 4:4:4 12 Intra profiles

| Level | Max luma sample rate MaxLumaSr (samples/sec) | Max bit rate MaxBR (CpbBrVclFactor or CpbBrNalFactor bits/s) | | | Min compression ratio base MinCrBase |
|---|---|---|---|---|---|
| | | Main tier | High tier | Super high tier | |
| 1 | 552 960 | 128 | – | – | 2 |
| 2 | 3 686 400 | 1 500 | – | – | 2 |
| 2.1 | 7 372 800 | 3 000 | – | – | 2 |
| 3 | 16 588 800 | 6 000 | – | – | 2 |
| 3.1 | 33 177 600 | 10 000 | – | – | 2 |
| 4 | 66 846 720 | 12 000 | 30 000 | 120 000 | 4 |
| 4.1 | 133 693 440 | 20 000 | 50 000 | 200 000 | 4 |
| 5 | 267 386 880 | 25 000 | 100 000 | 400 000 | 6 |
| 5.1 | 534 773 760 | 40 000 | 160 000 | 640 000 | 8 |
| 5.2 | 1 069 547 520 | 60 000 | 240 000 | 960 000 | 8 |
| 6 | 1 069 547 520 | 60 000 | 240 000 | 960 000 | 8 |
| 6.1 | 2 139 095 040 | 120 000 | 480 000 | 1 920 000 | 8 |
| 6.2 | 4 278 190 080 | 240 000 | 800 000 | 3 200 000 | 6 |

FIG. 30

Table A-3—Specification of FormatCapabilityFactor and MinCrScaleFactor

| Profile | FormatCapability Factor | MinCrScaleFactor |
|---|---|---|
| Monochrome 12 | 1.500 | 1.0 |
| Monochrome 16 | 2.000 | 1.0 |
| Main | 1.500 | 1.0 |
| Main 10 | 1.875 | 1.0 |
| Main 12 | 2.250 | 1.0 |
| Main 4:2:2 10 | 2.500 | 0.5 |
| Main 4:2:2 12 | 3.000 | 0.5 |
| Main 4:4:4 | 3.000 | 0.5 |
| Main 4:4:4 10 | 3.750 | 0.5 |
| Main 4:4:4 12 | 4.500 | 0.5 |
| Main Intra | 1.500 | 1.0 ÷ HbrFactor |
| Main 10 Intra | 1.875 | 1.0 ÷ HbrFactor |
| Main 12 Intra | 2.250 | 1.0 ÷ HbrFactor |
| Main 4:2:2 10 Intra | 2.500 | 0.5 ÷ HbrFactor |
| Main 4:2:2 12 Intra | 3.000 | 0.5 ÷ HbrFactor |
| Main 4:4:4 Intra | 3.000 | 0.5 ÷ HbrFactor |
| Main 4:4:4 10 Intra | 3.750 | 0.5 ÷ HbrFactor |
| Main 4:4:4 12 Intra | 4.500 | 0.5 ÷ HbrFactor |

FIG. 31

Long GOP profiles

| Tier | general_tier_flag | general_super_high_tier_flag | general_intra_constraint_flag | general_lower_bit_rate_constraint_flag | HbrFactor |
|---|---|---|---|---|---|
| Main | 0 | 0 | 0 or 1 | 1 | 1 |
| High | 1 | 0 | 0 or 1 | 1 | 1 |
| Super high | 0 | 1 | 0 or 1 | 1 | 1 |

All Intra profiles

| Tier | general_tier_flag | general_super_high_tier_flag | general_intra_constraint_flag | general_lower_bit_rate_constraint_flag | HbrFactor |
|---|---|---|---|---|---|
| Main | 0 | 0 | 1 | 0 or 1 | 2 or 1 |
| High | 1 | 0 | 1 | 0 or 1 | 2 or 1 |
| Super high | 0 | 1 | 1 | 0 or 1 | 2 or 1 |

FIG. 32

Table A-1—General tier and level limits

| Level | Max luma picture size MaxLumaPs (samples) | Max CPB size MaxCPB (1000 or 1100 bits) Main tier | Max CPB size MaxCPB (1000 or 1100 bits) High tier | Max slice segments per picture MaxSliceSegmentsPerPicture | Max # of tile rows MaxTileRows | Max # of tile columns MaxTileCols |
|---|---|---|---|---|---|---|
| 1 | 36 864 | 350 | – | 16 | 1 | 1 |
| 2 | 122 880 | 1 500 | – | 16 | 1 | 1 |
| 2.1 | 245 760 | 3 000 | – | 20 | 1 | 1 |
| 3 | 552 960 | 6 000 | – | 30 | 2 | 2 |
| 3.1 | 983 040 | 10 000 | – | 40 | 3 | 3 |
| 4 | 2 228 224 | 12 000 | 120 000 | 75 | 5 | 5 |
| 4.1 | 2 228 224 | 20 000 | 200 000 | 75 | 5 | 5 |
| 5 | 8 912 896 | 25 000 | 400 000 | 200 | 11 | 10 |
| 5.1 | 8 912 896 | 40 000 | 640 000 | 200 | 11 | 10 |
| 5.2 | 8 912 896 | 60 000 | 960 000 | 200 | 11 | 10 |
| 6 | 35 651 584 | 60 000 | 960 000 | 600 | 22 | 20 |
| 6.1 | 35 651 584 | 120 000 | 1 920 000 | 600 | 22 | 20 |
| 6.2 | 35 651 584 | 240 000 | 3 200 000 | 600 | 22 | 20 |

FIG. 33

Table A-2—Tier and level limits for the Main and Main 10 profiles

| Level | Max luma sample rate MaxLumaSr (samples/sec) | Max bit rate MaxBR (CpbBrVclFactor or CpbBrNalFactor bits/s) | | MinCrBase | |
|---|---|---|---|---|---|
| | | Main tier | High tier | Main tier | High tier |
| 1 | 552 960 | 128 | – | 2 | – |
| 2 | 3 686 400 | 1 500 | – | 2 | – |
| 2.1 | 7 372 800 | 3 000 | – | 2 | – |
| 3 | 16 588 800 | 6 000 | – | 2 | – |
| 3.1 | 33 177 600 | 10 000 | – | 2 | – |
| 4 | 66 846 720 | 12 000 | 120 000 | 4 | 2 |
| 4.1 | 133 693 440 | 20 000 | 200 000 | 4 | 2 |
| 5 | 267 386 880 | 25 000 | 400 000 | 6 | 3 |
| 5.1 | 534 773 760 | 40 000 | 640 000 | 8 | 4 |
| 5.2 | 1 069 547 520 | 60 000 | 960 000 | 8 | 4 |
| 6 | 1 069 547 520 | 60 000 | 960 000 | 8 | 4 |
| 6.1 | 2 139 095 040 | 120 000 | 1 920 000 | 8 | 4 |
| 6.2 | 4 278 190 080 | 240 000 | 3 200 000 | 6 | 3 |

DECODING APPARATUS AND DECODING METHOD, AND CODING APPARATUS AND CODING METHOD

CROSS REFERENCE TO PRIOR APPLICATION

This application is a continuation of U.S. patent application Ser. No. 15/037,204 (filed on May 17, 2016), which is a National Stage Patent Application of PCT International Patent Application No. PCT/JP2014/084229 (filed on Dec. 25, 2014) under 35 U.S.C. § 371, which claims priority to Japanese Patent Application Nos. 2014-003739 (filed on Jan. 10, 2014) and 2014-002047 (filed on Jan. 8, 2014), which are all hereby incorporated by reference in their entirety.

TECHNICAL FIELD

The present disclosure relates to a decoding apparatus and a decoding method, and a coding apparatus and a coding method and, more particularly, to a decoding apparatus and a decoding method, and a coding apparatus and a coding method capable of adjusting a compression rate of a lowest limit.

BACKGROUND ART

Recently, in order to improve the coding efficiency more than that of MPEG-4 Part 10 (Advanced Video Coding; hereinafter, referred to as AVC), standardization of an coding system called High Efficiency Video Coding (HEVC) has been progressed by Joint Collaboration Team—Video Coding (JCTVC) that is a joint standards organization of International Telecommunication Union Telecommunication Standardization Sector (ITU-T) and International Organization for Standardization/International Electrotechnical Commission (ISO/IEC) (for example, see Patent Document 1).

In addition, in the HEVC, a range extension has been reviewed, for example, for supporting a high-end dedicated format such as an image of a color difference signal format called 4:2:2 or 4:4:4 or a profile for a screen content (for example, see Non-Patent Document 2).

CITATION LIST

Non-Patent Document

Non-Patent Document 1: Benjamin Bross, Gary J. Sullivan, Ye-Kui Wang, "Editors' proposed corrections to HEVC version 1", JCTVC-M0432_v3,2013.4.25

Non-Patent Document 2: David Flynn, Joel Sole, Teruhiko Suzuki, "High Efficiency Video Coding (HEVC), Range Extension text specification:Draft 4", JCTVC-N1005_v1, 2013.8.8

SUMMARY OF THE INVENTION

Problems to be Solved by the Invention

However, in the HEVC system, as items defining restrictions of tools (elemental technology) necessary for decoding defined in each profile, a level and a tier are present. The level defines a maximum value of the size (resolution) of an image that is a coding target, and the tier defines a maximum value of the bit rate of an image that is a coding target. In the HEVC system, since many images having the same size and different bit rates are handled, necessary tools for decoding are defined by using two axes of the level and the tier. In addition, for each level, MinCr representing a compression rate of a lowest limit is set.

However, adaptation to a coded stream by adjusting the compression rate of a lowest limit has not been considered.

The present disclosure is in consideration of such situations and enables adjustment of the compression rate of a lowest limit.

Solutions to Problems

A decoding apparatus according to a first aspect of the present disclosure is a decoding apparatus including a decoding unit that decodes a bit stream coded according to a coding standard having a profile in which a lowest compression rate at the time of coding an image is set for each of a plurality of tiers in units of blocks that are recursively divided.

A decoding method according to the first aspect of the present disclosure corresponds to the decoding apparatus according to the first aspect of the present disclosure.

According to the first aspect of the present disclosure, a bit stream coded according to a coding standard having a profile in which a lowest compression rate at the time of coding an image is set for each of a plurality of tiers is decoded in units of blocks that are recursively divided.

A coding apparatus according to a second aspect of the present disclosure is a coding apparatus including a coding unit that codes an image according to a coding standard having a profile in which a lowest compression rate at the time of coding an image is set for each of a plurality of tiers in units of blocks that are recursively divided.

A coding method according to the second aspect of the present disclosure corresponds to the coding apparatus according to the second aspect of the present disclosure.

According to the second aspect of the present disclosure, an image is coded according to a coding standard having a profile in which a lowest compression rate at the time of coding an image is set for each of a plurality of tiers in units of blocks that are recursively divided.

The decoding apparatus according to the first aspect and the coding apparatus according to the second aspect can be realized by causing a computer to execute a program.

In order to realize the decoding apparatus according to the first aspect and the coding apparatus according to the second aspect, a program that is executed by a computer can be provided by transmitting the program through a transmission medium or by recording the program on a recording medium.

The decoding apparatus according to the first aspect and the coding apparatus according to the second aspect may be independent apparatuses or internal blocks configuring one apparatus.

Effects of the Invention

According to the first aspect of the present disclosure, a coded stream can be decoded. In addition, according to the first aspect of the present disclosure, a coded stream of which the compression rate of a lowest limit is adjusted can be decoded.

According to the second aspect of the present disclosure, an image can be coded. In addition, according to the second aspect of the present disclosure, the compression rate of a lowest limit can be adjusted.

The advantages described here are not necessarily limited, but there may be included any advantage that is described in the present disclosure.

BRIEF DESCRIPTION OF DRAWINGS

FIG. 1 is a diagram that illustrates restrictions defined by a level and a tier in an HEVC system.

FIG. 2 is a diagram that illustrates unique restrictions defined by a level and a tier in a case where a profile is Main and Main10.

FIG. 3 is a block diagram that illustrates an example of the configuration of a coding apparatus of a first embodiment according to the present disclosure.

FIG. 4 is a diagram that illustrates an example of the syntax of profile_tier_level.

FIG. 5 is a diagram that illustrates a first example of parameters.

FIG. 6 is a diagram that illustrates a first example of parameters HbrFactor and ShFactor.

FIG. 16 is a diagram that illustrates a second example of parameters.

FIG. 17 is a diagram that illustrates a second example of the parameters HbrFactor and ShFactor.

FIG. 18 is a diagram that illustrates a third example of parameters.

FIG. 19 is a diagram that illustrates a third example of the parameters HbrFactor and ShFactor.

FIG. 20 is a diagram that illustrates an example of MinCr set for each tier.

FIG. 21 is a diagram that illustrates a second embodiment according to the present disclosure.

FIG. 22 is a diagram that illustrates the second embodiment according to the present disclosure.

FIG. 23 is a diagram that illustrates the second embodiment according to the present disclosure.

FIG. 24 is a diagram that illustrates the second embodiment according to the present disclosure.

FIG. 25 is a diagram that illustrates the second embodiment according to the present disclosure.

FIG. 26 is a diagram that illustrates the second embodiment according to the present disclosure.

FIG. 27 is a diagram that illustrates the second embodiment according to the present disclosure.

FIG. 28 is a diagram that illustrates the second embodiment according to the present disclosure.

FIG. 29 is a diagram that illustrates the second embodiment according to the present disclosure.

FIG. 30 is a diagram that illustrates the second embodiment according to the present disclosure.

FIG. 31 is a diagram that illustrates the second embodiment according to the present disclosure.

FIG. 32 is a diagram that illustrates the second embodiment according to the present disclosure.

FIG. 33 is a diagram that illustrates the second embodiment according to the present disclosure.

MODE FOR CARRYING OUT THE INVENTION

Figure 7:
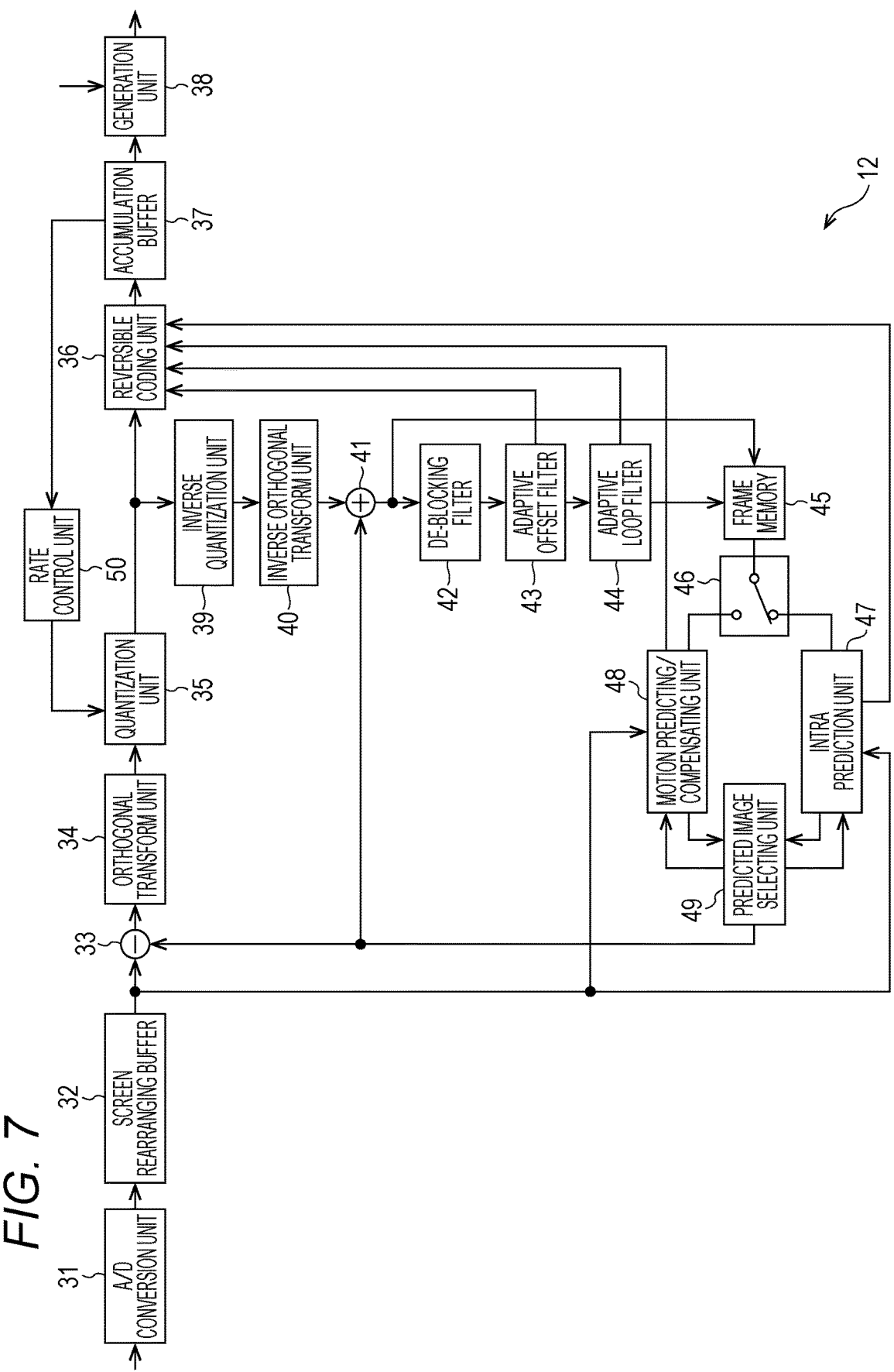
FIG. 7 is a block diagram that illustrates an example of the configuration of a coding unit illustrated in FIG. 3.

Overview of Present Disclosure (Description of Tier and Level)

FIG. 1 is a diagram that illustrates restrictions defined by a level and a tier in an HEVC system, and FIG. 2 is a diagram that illustrates unique restrictions defined by a level and a tier in a case where a profile is Main and Main10.

As illustrated in FIGS. 1 and 2, in the HEVC system, for each level, a maximum size (Max luma picture size) of a coding target image is defined. In addition, for each level of level 4 or a higher level, information (Max CPB size, MaxBR) representing a maximum value of the bit rate that is different for each a tier within the same level is defined. As such tiers, there are a main tier (Main tier) defining a relatively low bit rate used for an application such as a broadcast and a high tier (High tier) defining a relatively high bit rate used for an application such as video production or recording on a storage medium. In addition, as illustrated in FIG. 2, MinCr is set for each level.

However, in the high tier, since the bit rate is high, there are cases where the compression rate of a coded stream is higher than MinCr. In such cases, it is necessary to perform coding again such that the compression rate is lower than MinCr. Arithmetic coding (CABAC) using a context used in the HEVC standard is performed while the state of the periphery is stored as a context. Accordingly, in a case where retry is required in a coding unit level, it is necessary to perform retry with all the context states being stored. Thus, particularly in case of the CABAC, a calculation load accompanying the arithmetic coding according to the retry is high, and a load applied to the system is high.

In addition, in the HEVC system, the number of tiers is two including a main tier and a high tier, and a coded stream having a higher bit rate cannot be generated. However, in a case where an application performing visually lossless compression, lossless compression, or low compression for a medical image or the like is considered, a tier corresponding to a bit rate higher than the bit rate of the high tier is necessary.

Thus, in the present disclosure, identification data used for identifying the adjustment of a compression rate of a lowest limit and a maximum value of the bit rate corresponding to a tier is set, and MinCr and the maximum value of the bit rate are adjusted based on the identification data.

First Embodiment (Example of Configuration of Coding Apparatus According to First Embodiment)

FIG. 3 is a block diagram that illustrates an example of the configuration of a coding apparatus of a first embodiment according to the present disclosure.

The coding apparatus 10 illustrated in FIG. 3 is configured by a setting unit 11, a coding unit 12, a control unit 13, and a transmission unit 14 and codes an image using a system compliant to the HEVC system.

More specifically, the setting unit 11 of the coding apparatus 10 sets parameter sets such as an Sequence Parameter Set (SPS), a Picture Parameter Set (PPS), Video Usability Information (VUI), and Supplemental Enhancement Information (SEI). To the SPS and the VPS, profile_tier_level including identification data, information representing a level and a tier, and the like are set. The setting unit 11 supplies the set parameter set to the coding unit 12 and the control unit 13.

To the coding unit 12, images in units of frames are input. The coding unit 12 performs coding of input images using the HEVC system under the control of the control unit 13. The coding unit 12 generates a coded stream based on coded data acquired as a result of the coding process and a parameter set supplied from the setting unit 11 and supplies the generated coded stream to the transmission unit 14.

The control unit 13 calculates a compression rate of a lowest limit based on MinCr and identification data corresponding to a level represented by the information included in profile_tier_level supplied from the setting unit 11. In addition, the control unit 13 calculates a maximum value of the bit rate based on a maximum value of the bit rate and identification data corresponding to the tier represented by the information included in profile_tier_level. The control unit 13 controls a coding process performed by the coding unit 12 based on the compression rate of the lowest limit and the maximum value of the bit rate.

More specifically, the control unit 13 determines whether or not the compression rate of the coded data is higher than the compression rate of the lowest limit and, in a case where the compression rate of the coded data is the compression rate of the lowest limit or lower, causes the coding process to be performed again such that the compression rate of the coded data is higher than the compression rate of the lowest limit.

The transmission unit 14 transmits a coded stream supplied from the coding unit 12 to a decoding apparatus to be described later.

(Example of Syntax of Profile_Tier_Level)

FIG. 4 is a diagram that illustrates an example of the syntax of profile_tier_level.

As illustrated in FIG. 4, in profile_tier_level, a tier flag (general_tier_flag) representing whether a tier is a main tier or a high tier is set. In addition, in profile_tier_level, a low bit rate flag (general_lower_bit_rate_constraint_flag) representing whether or not the bit rate is low and identification data (general_higher_bit_rate_indication_flag) are set.

The low bit rate flag is "1" in a case where it represents that the bit rate is low and is "0" in a case where it represents that the bit rate is not low. In addition, the identification data is "1" in a case where it represents that the maximum value of the bit rate corresponding to the compression rate of the lowest limit and the tier is adjusted and is "0" in a case where it represents no adjustment thereof.

In addition, in profile_tier_level, level information (general_level_idc) representing a level is set.

(First Example of Parameter Used for Calculating Maximum Value of Bit Rate and Compression Rate of Lowest Limit)

FIG. 5 is a diagram that illustrates a first example of parameters used for calculating a maximum value of the bit rate and a compression rate of a lowest limit.

The maximum value of the bit rate is calculated using the following Equation (3) by using parameters CpbBrVclFactor and CpbBrNalFactor.

[Mathematical Formula 1]

$$VCL\ HRD\ \text{parameter:Max bit rate} = CpbBrVcl\text{Factor} * \text{Max}BR$$

$$NAL\ HRD\ \text{parameter:Max bit rate} = CpbBrNal\text{Factor} * \text{Max}BR \quad (3)$$

In Equation (3), Maxbitrate is a maximum value of the bit rate, and MaxBR is information representing the maximum value of the bit rate, which is illustrated in FIG. 2, corresponding to the level information and the tier flag included in profile_tier_level.

In addition, the compression rate of the lowest limit is calculated using the following Equation (4) by using a parameter MinCrScaleFactor.

[Mathematical Formula 2]

$$\text{Min}Cr = \text{Max}(1, \text{Min}Cr\text{Base} * \text{Min}Cr\text{Scalefactor}) \quad (4)$$

In Equation (4), MinCr is the compression rate of the lowest limit, and MinCrBase is MinCr, which is represented in FIG. 2, corresponding to the level information and the tier flag included in profile_tier_level.

The parameter CpbBrVclFactor or CpbBrNalFactor used for the calculation of the maximum value of the bit rate and the parameter MinCrScaleFactor used for the calculation of the compression rate of the lowest limit, as illustrated in FIG. 5, are set for each profile.

In the example illustrated in FIG. 5, the parameters CpbBrVclFactor and CpbBrNalFactor are adjusted by using a parameter HbrFactor and a parameter ShFactor, and the parameter MinCrScaleFactor is adjusted by using the parameter HbrFactor.

The parameter HbrFactor is defined by using the following Equation (5) using a low bit rate flag (general_lower_bit_rate_constraint_flag) and identification data (general_higher_bit_rate_indication_flag) included in profile_tier_level.

[Mathematical Formula 3]

$$Hbr\text{Factor} = 2 - general\_lower\_bit\_rate\_constraint\_flag + 2 * general\_higher\_bit\_rate\_indication\_flag \quad (5)$$

The parameter ShFactor is defined by using the following Equation (6) using a low bit rate flag (general_lower_bit_rate_constraint_flag) and the identification data (general_higher_bit_rate_indication_flag) included in profile_tier_level.

[Mathematical Formula 4]

$$ShFactor = 1 + (!general\_lower\_bit\_rate\_constraint\_flag) * 3 * general\_higher\_bit\_rate\_indication\_flag \qquad (6)$$

(First Example of Parameters HbrFactor and ShFactor)

FIG. 6 is a diagram that illustrates an example of the parameters HbrFactor and ShFactor used for adjusting the parameters illustrated in FIG. 5 in a case where the profiles are Long Gop profiles and All Intra profiles.

Here, a super high tier is a virtual tier having a maximum value of the bit rate to be higher than that of the high tier.

As illustrated in FIG. 6, in a case where the profile is Long Gop profiles, and the tier is the main tier, a tier flag (general_tier_flag) is set to zero. In addition, a low bit rate flag (general_lower_bit_rate_constraint_flag) is set to "1", and identification data (general_higher_bit_rate_indication_flag) is set to "0". Accordingly, the parameter HbrFactor becomes "1", and the parameter ShFactor becomes "1".

As a result, the maximum value of the bit rate and the compression rate of the lowest limit respectively become a maximum value of the bit rate corresponding to the main tier and a compression rate of the lowest limit represented by MinCr, and the maximum value of the bit rate and the compression rate of the lowest limit are not adjusted.

On the other hand, in a case where the profile is the Long Gop profiles, and the tier is the high tier, the tier flag (general_tier_flag) is set to "1". In addition, the low bit rate flag (general_lower_bit_rate_constraint_flag) is set to "1", and the identification data (general_higher_bit_rate_indication_flag) is set to "1" Thus, the parameter HbrFactor becomes "2", and the parameter ShFactor becomes "1".

As a result, while the maximum value of the bit rate becomes a maximum value of the bit rate corresponding to the main tier and is not adjusted, the compression rate of the lowest limit becomes ½ of the compression rate of the lowest limit represented by MinCr.

In addition, in a case where the profile is the Long Gop profiles, and the tier is the super high tier, the tier flag (general_tier_flag) is set to "1". In addition, the low bit rate flag (general_lower_bit_rate_constraint_flag) is set to "0", and the identification data (general_higher_bit_rate_indication_flag) is set to "1". Thus, the parameter HbrFactor becomes "4", and the parameter ShFactor becomes "4".

As a result, the maximum value of the bit rate becomes four times the bit rate corresponding to the main tier, and the compression rate of the lowest limit becomes ¼ of the compression rate of the lowest limit represented by MinCr.

In a case where the profile is All Intra profiles, and the tier is the main tier, the tier flag (general_tier_flag) is set to "0". In addition, the low bit rate flag (general_lower_bit_rate_constraint_flag) is set to "0" or "1", and the identification data (general_higher_bit_rate_indication_flag) is set to "0". Thus, the parameter HbrFactor becomes "2" or "1", and the parameter ShFactor becomes "2" or "1".

As a result, the maximum value of the bit rate becomes twice the bit rate corresponding to the main tier, and the compression rate of the lowest limit becomes ½ of the compression rate of the lowest limit represented by MinCr, or both thereof are not adjusted.

On the other hand, in a case where the profile is the All Intra profiles, and the tier is the high tier, the tier flag (general_tier_flag) is set to "1". In addition, the low bit rate flag (general_lower_bit_rate_constraint_flag) is set to "0" or "1", and the identification data (general_higher_bit_rate_indication_flag) is set to "1". Thus, the parameter HbrFactor becomes "4" or "2", and the parameter ShFactor becomes "4" or "2".

As a result, the maximum value of the bit rate becomes four times or two times the bit rate corresponding to the main tier, and the compression rate of the lowest limit becomes ¼ or ½ of the compression rate of the lowest limit represented by MinCr.

In addition, in a case where the profile is the All Intra profiles, and the tier is the super high tier, the tier flag (general_tier_flag) is set to "1". In addition, the low bit rate flag (general_lower_bit_rate_constraint_flag) is set to "0", and the identification data (general_higher_bit_rate_indication_flag) is set to "1". Thus, the parameter HbrFactor becomes "4", and the parameter ShFactor becomes "4".

As a result, the maximum value of the bit rate becomes four times the bit rate corresponding to the main tier, and the compression rate of the lowest limit becomes ¼ of the compression rate of the lowest limit represented by MinCr.

(Example of Configuration of Coding Unit)

FIG. 7 is a block diagram that illustrates an example of the configuration of the coding unit 12 illustrated in FIG. 3.

The coding unit 12 illustrated in FIG. 7 includes: an A/D conversion unit 31; a screen rearranging buffer 32; a calculation unit 33; an orthogonal transform unit 34; a quantization unit 35; a reversible coding unit 36; an accumulation buffer 37; a generation unit 38; an inverse quantization unit 39; an inverse orthogonal transform unit 40; and an addition unit 41. In addition, the coding unit 12 includes: a deblocking filter 42; an adaptive offset filter 43; an adaptive loop filter 44; a frame memory 45; a switch 46; an intra prediction unit 47; a motion predicting/compensating unit 48; a predicted image selecting unit 49; and a rate control unit 50.

The A/D conversion unit 31 of the coding unit 12 performs an A/D conversion of images configured in units of frames input as coding targets. The A/D conversion unit 31 outputs an image that is a digital signal after the conversion to the screen rearranging buffer 32 so as to be stored therein.

The screen rearranging buffer 32 rearranges stored images configured in units of frames, which are arranged in order of display, in order for coding in accordance with a GOP structure. The screen rearranging buffer 32 outputs images after the rearrangement to the calculation unit 33, the intra prediction unit 47, and the motion predicting/compensating unit 48.

The calculation unit 33 subtracts a predicted image supplied from the predicted image selecting unit 49 from an image supplied from the screen rearranging buffer 32, thereby performing coding. The calculation unit 33 outputs an image acquired as a result thereof to the orthogonal transform unit 34 as residual information. In addition, in a case where a predicted image is not supplied from the predicted image selecting unit 49, the calculation unit 33 outputs an image read from the screen rearranging buffer 32 as it is to the orthogonal transform unit 34 as the residual information.

The orthogonal transform unit 34 performs an orthogonal transform of residual information supplied from the calculation unit 33 in units of transform units (TU). The orthogonal transform unit 34 supplies orthogonal transform coefficients acquired as a result of the orthogonal transform to the quantization unit 35.

The quantization unit 35 quantizes the orthogonal transform coefficients supplied from the orthogonal transform unit 34. The quantization unit 35 supplies the quantized orthogonal transform coefficients to the reversible coding unit 36.

The reversible coding unit 36 acquires intra prediction mode information representing an optimal intra prediction mode from the intra prediction unit 47. In addition, the reversible coding unit 36 acquires inter prediction mode information representing an optimal inter prediction mode, a motion vector, information specifying a reference image, and the like from the motion predicting/compensating unit 48.

In addition, the reversible coding unit 36 acquires offset filter information relating to an offset filter from the adaptive offset filter 43 and acquires filter coefficients from the adaptive loop filter 44.

The reversible coding unit 36 performs reversible coding such as variable length coding (for example, Context-Adaptive Variable Length Coding (CAVLC), arithmetic coding (for example, Context-Adaptive Binary Arithmetic Coding (CABAC), or the like for the quantized orthogonal transform coefficients supplied from the quantization unit 35.

The reversible coding unit 36 performs reversible coding using intra prediction mode information or the inter prediction mode information, the motion vector, the information specifying a reference image, the offset filter information, and the filter coefficients as coding information relating to the coding. The reversible coding unit 36 supplies the coding information and the orthogonal transform coefficients, which have been reversibly coded, to the accumulation buffer 37 as coded data so as to be stored therein. In addition, the coding information that has been reversibly coded may be added to the coded data as a header section such as a slice header.

The accumulation buffer 37 temporarily stores the coded data supplied from the reversible coding unit 36. In addition, the accumulation buffer 37 supplies the stored coded data to the generation unit 38.

The generation unit 38 generates a coded stream based on the parameter sets supplied from the setting unit 11 illustrated in FIG. 3 and the coded data supplied from the accumulation buffer 37 and supplies the generated coded stream to the transmission unit 14 illustrated in FIG. 3.

In addition, the quantized orthogonal transform coefficients output from the quantization unit 35 are input also to the inverse quantization unit 39. The inverse quantization unit 39 performs inverse quantization of the orthogonal transform coefficients quantized by the quantization unit 35 using a method corresponding to the quantization method used by the quantization unit 35. The inverse quantization unit 39 supplies the orthogonal transform coefficients acquired as a result of the inverse quantization process to the inverse orthogonal transform unit 40.

The inverse orthogonal transform unit 40 performs an inverse orthogonal transform of the orthogonal transform coefficients supplied from the inverse quantization unit 39 in units of TUs by using a method corresponding to the orthogonal transform method used by the orthogonal transform unit 34. The inverse orthogonal transform unit 40 supplies residual information acquired as a result thereof to the addition unit 41.

The addition unit 41 adds residual information supplied from the inverse orthogonal transform unit 40 and a predicted image supplied from the predicted image selecting unit 49 and locally performs decoding. In a case where a predicted image is not supplied from the predicted image selecting unit 49, the addition unit 41 sets the residual information supplied from the inverse orthogonal transform unit 40 as a locally-decoded image. The addition unit 41 supplies the locally-decoded image to the de-blocking filter 42 and the frame memory 45.

The de-blocking filter 42 performs a de-blocking filter process of eliminating a block distortion for the locally-decoded image supplied from the addition unit 41 and supplies an image acquired as a result thereof to the adaptive offset filter 43.

The adaptive offset filter 43 performs an adaptive offset filter (Sample Adaptive Offset (SAO)) process for mainly eliminating ringing for an image after the de-blocking filter process performed by the de-blocking filter 42.

More specifically, the adaptive offset filter 43 determines the type of an adaptive offset filter process for each Largest Coding Unit (LCU) that is a maximum coding unit and acquires an offset used in the adaptive offset filter process. The adaptive offset filter 43 performs the adaptive offset filter process of the determined type for the image after the de-blocking filter process by using the acquired offset.

The adaptive offset filter 43 supplies the image after the adaptive offset filter process to the adaptive loop filter 44. In addition, the adaptive offset filter 43 supplies information representing the type of the performed adaptive offset filter process and the offset to the reversible coding unit 36 as offset filter information.

The adaptive loop filter 44, for example, is configured by a two-dimensional Wiener filter. The adaptive loop filter 44, for example, performs an adaptive loop filter (Adaptive Loop Filter (ALF)) process for the image after the adaptive offset filter process supplied from the adaptive offset filter 43 for each LCU.

More specifically, the adaptive loop filter 44, for each LCU, calculates filter coefficients used in the adaptive loop filter process such that a residual between an original image that is an image output from the screen rearranging buffer 32 and an image after the adaptive loop filter is minimal. Then, the adaptive loop filter 44 performs an adaptive loop filter process for the image after the adaptive offset filter process by using the calculated filter coefficients for each LCU.

The adaptive loop filter 44 supplies the image after the adaptive loop filter process to the frame memory 45. In addition, the adaptive loop filter 44 supplies the filter coefficients used in the adaptive loop filter process to the reversible coding unit 36.

Here, while the adaptive loop filter process is described to be performed for each LCU, the processing unit of the adaptive loop filter process is not limited to the LCU. However, by matching the processing units of the adaptive offset filter 43 and the adaptive loop filter 44, the process can be efficiently performed.

The frame memory 45 accumulates images supplied from the adaptive loop filter 44 and images supplied from the addition unit 41. In an image, for which a filter process has not been performed, accumulated in the frame memory 45, pixels adjacent to a Prediction Unit (PU) are supplied to the intra prediction unit 47 through the switch 46 as surrounding pixels. On the other hand, an image, for which the filter process has been performed, accumulated in the frame memory 45 is output to the motion predicting/compensating unit 48 through the switch 46 as a reference image.

The intra prediction unit 47 performs an intra prediction process of all the intra prediction modes that are candidates by using the surrounding pixels read from the frame memory 45 through the switch 46 in units of PUs.

In addition, the intra prediction unit 47 calculates cost function values (details thereof will be described later) for all the intra prediction modes that are the candidates based on the image read from the screen rearranging buffer 32 and the predicted image generated as a result of the intra prediction process. Then, the intra prediction unit 47 determines an intra prediction mode of which the cost function value is minimal as an optimal intra prediction mode.

The intra prediction unit 47 supplies a predicted image generated in the optimal intra prediction mode and a corresponding cost function value to the predicted image selecting unit 49. In a case where the selection of a predicted image generated in the optimal intra prediction mode is notified from the predicted image selecting unit 49, the intra prediction unit 47 supplies the intra prediction mode information to the reversible coding unit 36.

In addition, the cost function value is also called an Rate Distortion (RD) cost and, for example, is calculated based on a technique of a high complexity mode or a low complexity mode as defined in a Joint Model (JM) that is reference software in an H.264/AVC system. The reference software in the H.264/AVC system is disclosed in http://iphome.hhi.de/suehring/tml/index.htm.

More specifically, in a case where the high complexity mode is employed as a technique for calculating the cost function value, a cost function value represented in the following Equation (1) is calculated for each prediction mode by provisionally performing up to decoding for all the prediction modes that are candidates.

[Mathematical Formula 5]

$$\text{Cost(Mode)} = D + \lambda \cdot R \quad (1)$$

Here, D is a difference (distortion) between the original image and a decoded image, R is a generated coding amount including up to the orthogonal transform coefficients, and $\lambda$ is a Lagrange undefined multiplier given as a function of a quantization parameter (QP).

On the other hand, in a case where the low complexity mode is employed as a technique for calculating the cost function value, a cost function (Cost(Mode)) represented in the following Equation (2) is calculated for each prediction mode by generating a predicted image and calculating the coding amount of the coding information for all the prediction modes that are candidates.

[Mathematical Formula 6]

$$\text{Cost(Mode)} = D + QP\text{toQuant}(QP) \cdot \text{Header\_Bit} \quad (2)$$

Here, D is a difference (distortion) between the original image and a predicted image, Header_Bit is a coding amount of the coding information, and QPtoQuant is a function given as a function of a quantization parameter QP.

In the low complexity mode, only predicted images may be generated for all the prediction modes, and a decoded image does not need to be generated, and the amount of calculation is small.

The motion predicting/compensating unit 48 performs motion predicting/compensating processes of all the inter prediction modes that are candidates in units of PUs. More specifically, the motion predicting/compensating unit 48 includes a two-dimensional linear interpolation adaptive filter. In addition, the motion predicting/compensating unit 48 performs an interpolation filter process for an image supplied from the screen rearranging buffer 32 and a reference image by using the two-dimensional linear interpolation adaptive filter, thereby increasing the resolutions of the image and the reference image.

The motion predicting/compensating unit 48 detects motion vectors of all the inter prediction modes that are candidates with fractional pixel accuracy based on the image and the reference image of which the resolutions have been increased. Then, the motion predicting/compensating unit 48 performs a compensation process for the reference image based on the motion vector, thereby generating a predicted image. Here, the inter prediction mode is a mode that represents the size of the PU and the like.

In addition, the motion predicting/compensating unit 48 calculates cost function values for all the inter prediction modes that are candidates based on the image supplied form the screen rearranging buffer 32 and the predicted image and determines an inter prediction mode of which the cost function value is minimal as an optimal inter prediction mode. Then, the motion predicting/compensating unit 48 supplies the cost function value of the optimal inter prediction mode and a corresponding predicted image to the predicted image selecting unit 49.

In addition, in a case where the selection of the predicted image generated in the optimal inter prediction mode is notified from the predicted image selecting unit 49, the motion predicting/compensating unit 48 outputs the inter prediction mode information, a corresponding motion vector, the information specifying the reference image, and the like to the reversible coding unit 36.

The predicted image selecting unit 49 determines one of the optimal intra prediction mode and the optimal inter prediction mode that has a smaller corresponding cost function value as an optimal prediction mode based on the cost function values supplied from the intra prediction unit 47 and the motion predicting/compensating unit 48. Then, the predicted image selecting unit 49 supplies the predicted image of the optimal prediction mode to the calculation unit 33 and the addition unit 41. In addition, the predicted image selecting unit 49 notifies the intra prediction unit 47 or the motion predicting/compensating unit 48 of the selection of the predicted image of the optimal prediction mode.

The rate control unit 50 controls the rate of the quantization operation performed by the quantization unit 35 based on the coded data accumulated in the accumulation buffer 37 such that an overflow or an underflow does not occur.

(Description of Coding Unit)

Figure 8:
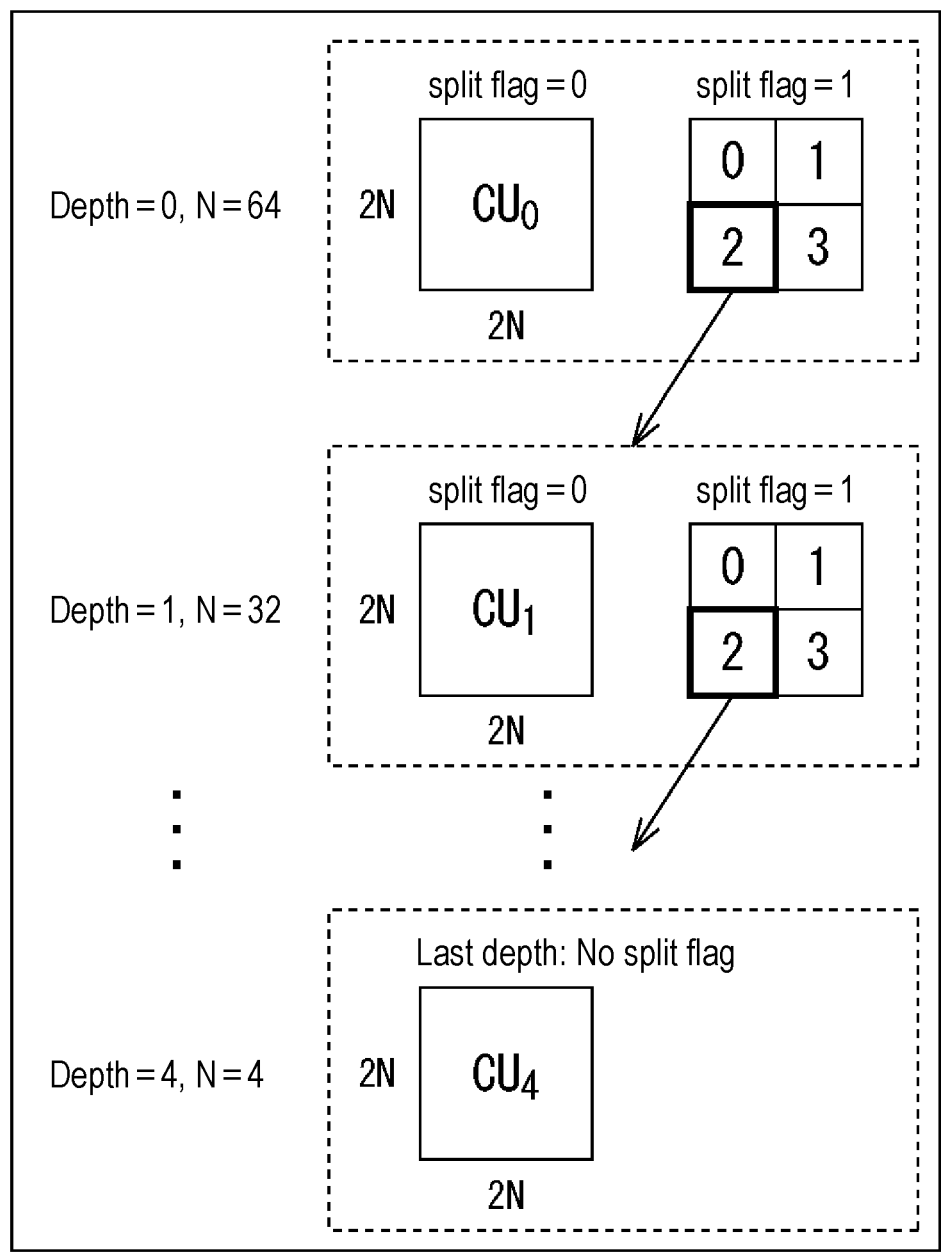
FIG. 8 is a diagram that illustrates a CU.

FIG. 8 is a diagram that illustrates a coding unit (CU) that is a coding unit used in the HEVC system.

The HEVC system is targeted also for an image having a large picture frame such as Ultra High Definition (UHD) of 4000 pixels×2000 pixels, and thus, it is not optimal to fix the size of the coding unit to 16 pixels×16 pixels. Accordingly, in the HEVC system, a CU is defined as a coding unit. Details of the CU are described in Non-Patent Document 1.

The CU (coding block) achieves the same role as that of a macro block in the AVC system. More specifically, the CU is divided into PUs or divided into TUs.

However, the CU has a square shape of which the size is represented by pixels of exponent of two that is changeable for each sequence. More specifically, the CU is set by recursively dividing an LCU, which is a CU having a maximum size, into two parts for an arbitrary number of times so as not to be less than an Smallest Coding Unit (SCU) that is a CU having a minimal size in the horizontal direction and the vertical direction. In other words, the size of an arbitrary hierarchy at the time of hierarchizing an LCU such that the size of a higher hierarchy is ¼ of the size of a lower hierarchy until the LCU becomes an SCU is the size of the CU.

For example, in the case illustrated in FIG. 8, the size of the LCU is 128, and the size of the SCU is 8. Thus, the hierarchical depths (Depth) of the LCU are 0 to 4, and the number of the hierarchical depths is 5. In other words, the number of divisions corresponding to the CU is one of "0" to "4".

Here, information designating the sizes of the LCU and the SCU is included in the SPS. In addition, the number of divisions corresponding to the CU is designated by split_flag representing whether or not further division is performed for each hierarchy.

The size of the TU, similarly to split_flag of the CU, can be designated using split_transform_flag. The maximum numbers of divisions of the TU at the time of performing an inter prediction and at the time of performing an intra prediction are respectively designated as max_transform_hierarchy_depth_inter and max_transform_hierarchy_depth_intra by using the SPS.

In this specification, a Coding Tree Unit (CTU) is assumed to be a unit that includes a Coding Tree Block (CTB) of a LCU and a parameter at the time of processing at the LCU base (level) thereof. In addition, a CU configuring the CTU is assumed to be a unit that includes a Coding Block (CB) and a parameter at the time of processing at the CU base (level) thereof.

(Description of Process Performed by Coding Apparatus)

Figure 9:
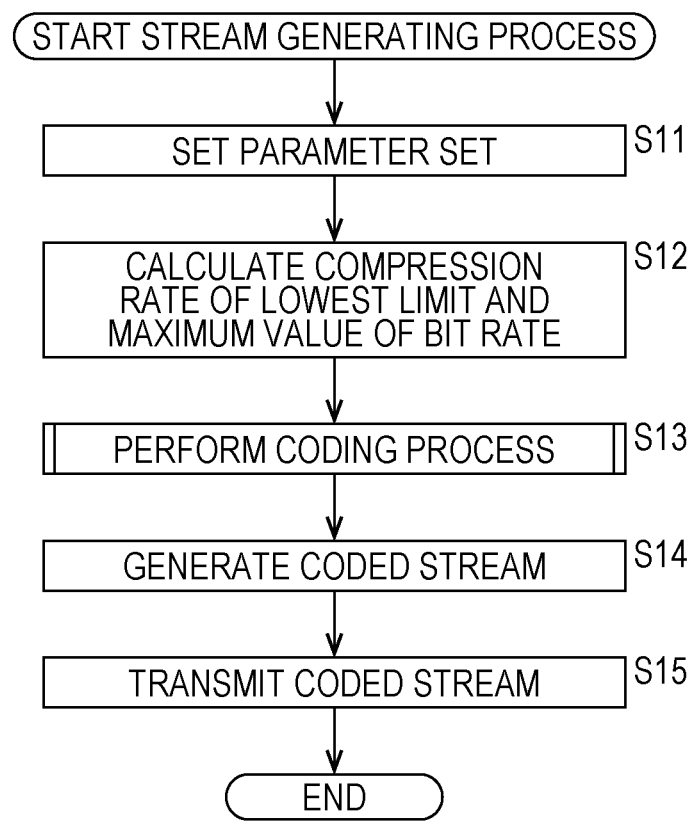
FIG. 9 is a flowchart that illustrates a stream generating process performed by the coding apparatus illustrated in FIG. 3.

FIG. 9 is a flowchart that illustrates a stream generating process performed by the coding apparatus 10 illustrated in FIG. 3.

As illustrated in FIG. 9, in Step S11, the setting unit 11 of the coding apparatus 10 sets a parameter set. The setting unit 11 supplies the set parameter set to the coding unit 12 and the control unit 13.

In Step S12, the control unit 13 calculates a compression rate of a lowest limit based on MinCr and identification data corresponding to a level represented by information included in profile_tier_level supplied from the setting unit 11. In addition, the control unit 13 calculates a maximum value of the bit rate based on a maximum value of the bit rate and identification data corresponding to a tier represented by information included in profile_tier_level. The control unit 13 controls the coding process of Step S13 based on the compression rate of the lowest limit and the maximum value of the bit rate.

In Step S13, the coding unit 12 performs a coding process of coding images configured in units of frames input from the outside by using the HEVC system. Details of this coding process will be described with reference to FIGS. 10 and 11 to be described later.

In Step S14, the generation unit 38 (FIG. 7) of the coding unit 12 generates a coded stream based on the parameter set supplied from the setting unit 11 and the accumulated coded data and supplies the generated coded stream to the transmission unit 14.

In Step S15, the transmission unit 14 transmits the coded stream supplied from the setting unit 11 to the decoding apparatus to be described later and ends the process.

Figure 10:
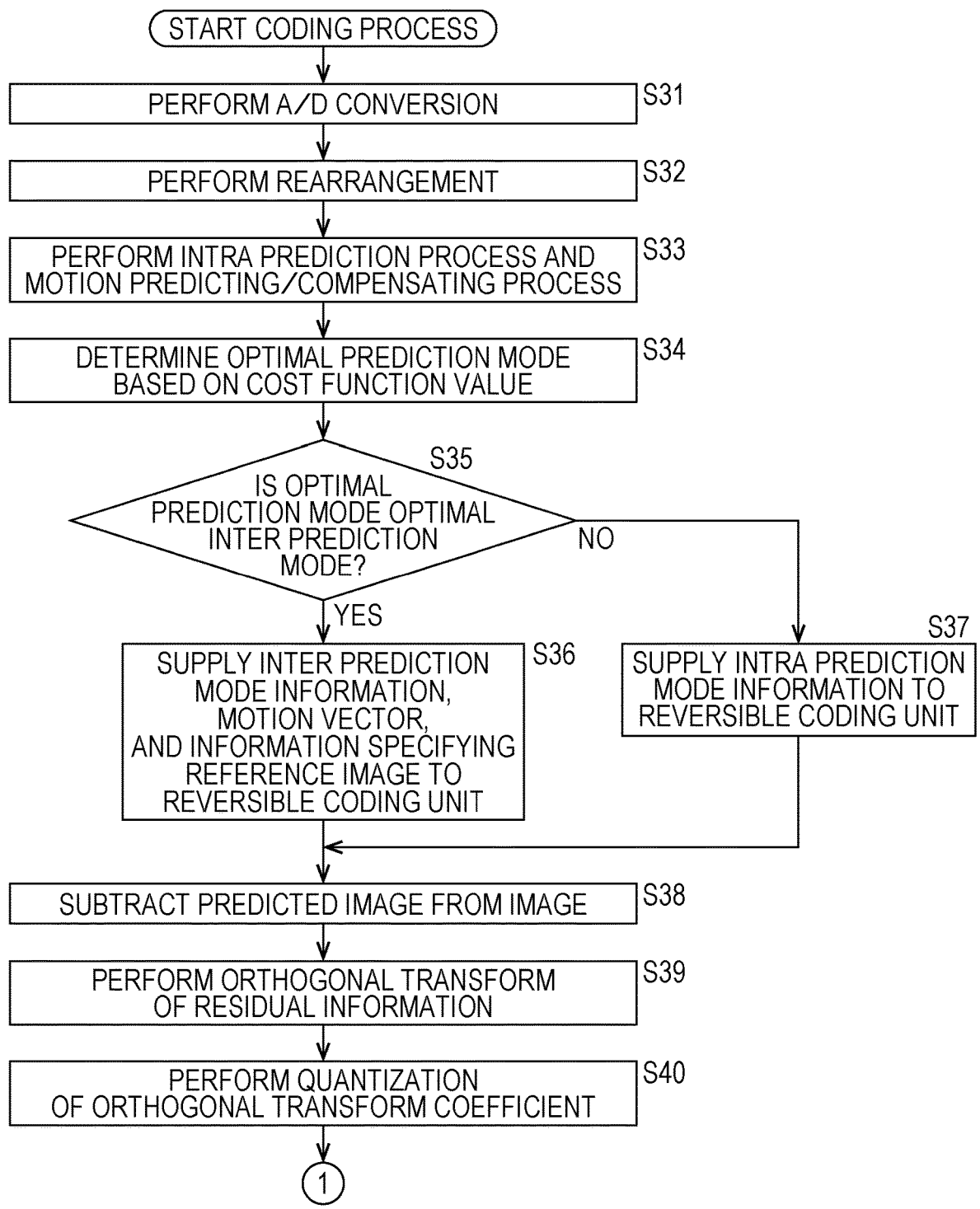
FIG. 10 is a flowchart that illustrates details of a coding process illustrated in FIG. 9.
Figure 11:
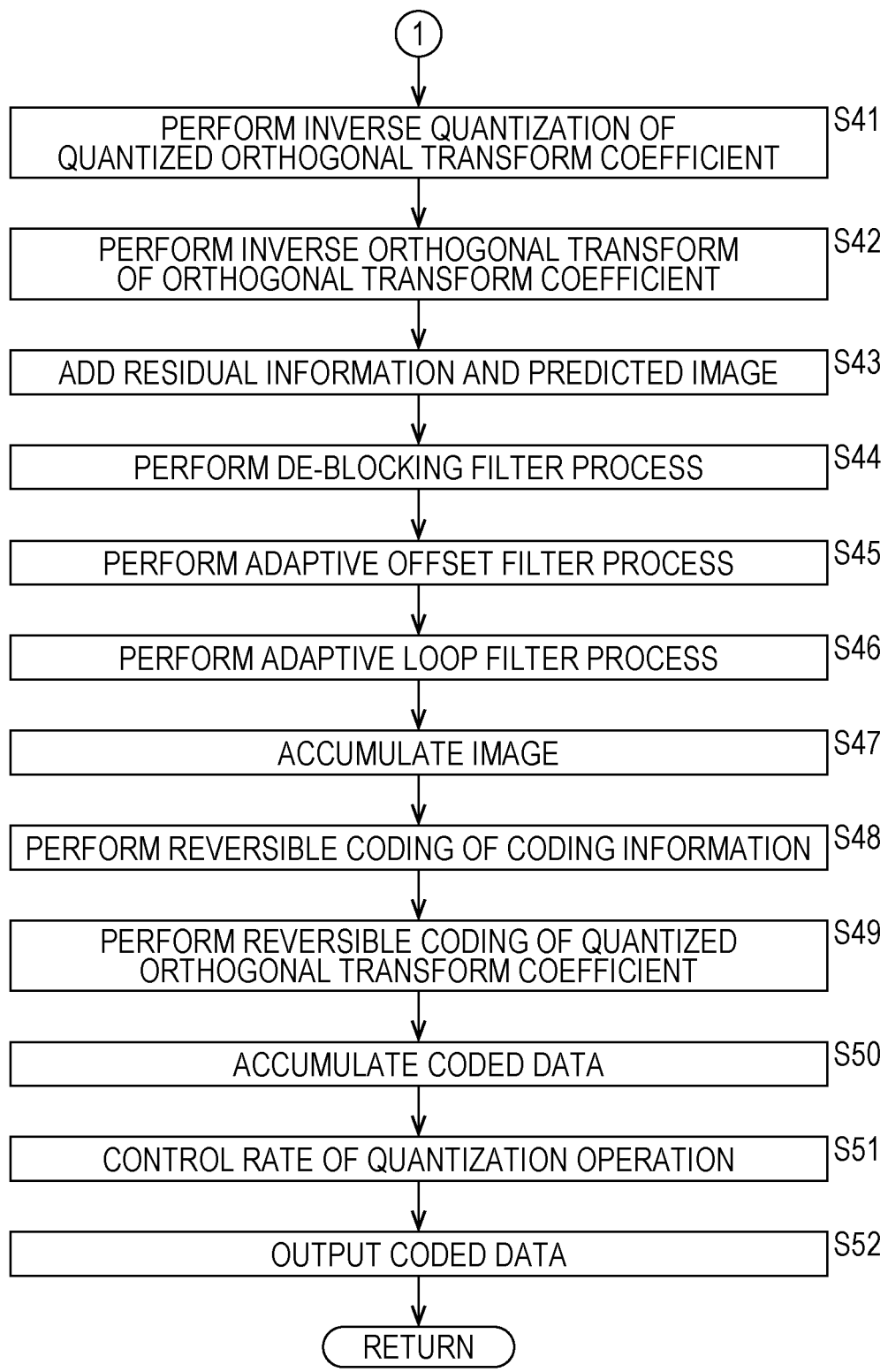
FIG. 11 is a flowchart that illustrates details of the coding process illustrated in FIG. 9.

FIGS. 10 and 11 represent a flowchart that illustrates details of the coding process of Step S13 illustrated in FIG. 9.

In Step S31 illustrated in FIG. 10, the A/D conversion unit 31 of the coding unit 12 performs an A/D conversion of images configured in units of frames input as a coding target. The A/D conversion unit 31 outputs an image that is a digital signal after the conversion to the screen rearranging buffer 32 so as to be stored therein.

In Step S32, the screen rearranging buffer 32 rearranges the stored images of frames in order of display into order for coding in accordance with a GOP structure. The screen rearranging buffer 32 supplies the images configured in units of frames after the rearrangement to the calculation unit 33, the intra prediction unit 47, and the motion predicting/compensating unit 48.

In Step S33, the intra prediction unit 47 performs intra prediction processes of all the intra prediction modes that are candidates in units of PUs. In addition, the intra prediction unit 47 calculates cost function values for all the intra prediction modes that are candidates based on images read from the screen rearranging buffer 32 and predicted images generated as a result of the intra prediction processes. Then, the intra prediction unit 47 determines an intra prediction mode of which the cost function value is minimal as an optimal intra prediction mode. The intra prediction unit 47 supplies a predicted image generated in the optimal intra prediction mode and a corresponding cost function value to the predicted image selecting unit 49.

In addition, the motion predicting/compensating unit 48 performs motion predicting/compensating processes of all the inter prediction modes that are candidates in units of PUs. In addition, the motion predicting/compensating unit 48 calculates cost function values for all the inter prediction modes that are candidates based on the images supplied from the screen rearranging buffer 32 and predicted images and determines an inter prediction mode of which the cost function value is minimal as an optimal inter prediction mode. Then, the motion predicting/compensating unit 48 supplies the cost function value of the optimal inter prediction mode and a corresponding predicted image to the predicted image selecting unit 49.

In Step S34, the predicted image selecting unit 49, based on the cost function values supplied from the intra prediction unit 47 and the motion predicting/compensating unit 48, determines one of the optimal intra prediction mode and the optimal inter prediction mode of which the cost function value is minimal as an optimal prediction mode. Then, the predicted image selecting unit 49 supplies a predicted image of the optimal prediction mode to the calculation unit 33 and the addition unit 41.

In Step S35, the predicted image selecting unit 49 determines whether or not the optimal prediction mode is the optimal inter prediction mode. In a case where the optimal prediction mode is determined to be the optimal inter prediction mode in Step S35, the predicted image selecting unit 49 notifies the motion predicting/compensating unit 48 of the selection of a predicted image generated in the optimal inter prediction mode.

Then, in Step S36, the motion predicting/compensating unit 48 supplies the inter prediction mode information, the motion vector, and the information specifying a reference image to the reversible coding unit 36, and the process proceeds to Step S38.

On the other hand, in a case where the optimal prediction mode is determined not to be the optimal inter prediction mode in Step S35, in other words in a case where the optimal prediction mode is the optimal intra prediction mode, the predicted image selecting unit 49 notifies the intra prediction unit 47 of the selection of a predicted image generated in the optimal intra prediction mode. Then, in Step S37, the intra prediction unit 47 supplies the intra prediction mode information to the reversible coding unit 36, and the process proceeds to Step S38.

In Step S38, the calculation unit 33 performs coding by subtracting a predicted image supplied from the predicted image selecting unit 49 from an image supplied from the screen rearranging buffer 32. The calculation unit 33 outputs an image acquired as a result thereof to the orthogonal transform unit 34 as residual information.

In Step S39, the orthogonal transform unit 34 performs an orthogonal transform for the residual information supplied from the calculation unit 33 in units of TUs and supplies orthogonal transform coefficients acquired as a result thereof to the quantization unit 35.

In Step S40, the quantization unit 35 quantizes the orthogonal transform coefficients supplied form the orthogonal transform unit 34 and supplies the quantized orthogonal transform coefficients to the reversible coding unit 36 and the inverse quantization unit 39.

In Step S41 illustrated in FIG. 11, the inverse quantization unit 39 performs inverse quantization of the quantized coefficients supplied from the quantization unit 35 and supplies the orthogonal transform coefficients acquired as a result thereof to the inverse orthogonal transform unit 40.

In Step S42, the inverse orthogonal transform unit 40 performs an inverse orthogonal transform of the orthogonal transform coefficients supplied from the inverse quantization unit 39 in units of TUs and supplies residual information acquired as a result thereof to the addition unit 41.

In Step S43, the addition unit 41 adds the residual information supplied from the inverse orthogonal transform unit 40 and the predicted image supplied from the predicted image selecting unit 49 and locally performs decoding. The addition unit 41 supplies the locally-decoded image to the de-blocking filter 42 and the frame memory 45.

In Step S44, the de-blocking filter 42 performs a de-blocking filter process for the locally-decoded image supplied from the addition unit 41. The de-blocking filter 42 supplies an image acquired as a result thereof to the adaptive offset filter 43.

In Step S45, the adaptive offset filter 43 performs an adaptive offset filter process for the image supplied from the de-blocking filter 42 for each LCU. The adaptive offset filter 43 supplies an image acquired as a result thereof to the adaptive loop filter 44. In addition, the adaptive offset filter 43 supplies offset filter information to the reversible coding unit 36 for each LCU.

In Step S46, the adaptive loop filter 44 performs an adaptive loop filter process for the image supplied from the adaptive offset filter 43 for each LCU. The adaptive loop filter 44 supplies an image acquired as a result thereof to the frame memory 45. In addition, the adaptive loop filter 44 supplies the filter coefficients used in the adaptive loop filter process to the reversible coding unit 36.

In Step S47, the frame memory 45 accumulates the image supplied from the adaptive loop filter 44 and the image supplied from the addition unit 41. In an image, for which a filter process has not been performed, accumulated in the frame memory 45, pixels adjacent to a PU are supplied to the intra prediction unit 47 through the switch 46 as surrounding pixels. On the other hand, an image, for which the filter process has been performed, accumulated in the frame memory 45 is output to the motion predicting/compensating unit 48 through the switch 46 as a reference image.

In Step S48, the reversible coding unit 36 performs reversible coding of the intra prediction mode information or the inter prediction mode information, the motion vector, the information specifying a reference image, the offset filter information, and the filter coefficients as coding information.

In Step S49, the reversible coding unit 36 performs reversible coding of the quantized orthogonal transform coefficients supplied from the quantization unit 35. Then, the reversible coding unit 36 generates coded data based on the coding information that has been reversibly coded in the process of Step S48 and the orthogonal transform coefficients that have been reversibly coded and supplies the generated coded data to the accumulation buffer 37.

In Step S50, the accumulation buffer 37 temporarily accumulates the coded data supplied from the reversible coding unit 36.

In Step S51, the rate control unit 50 controls the rate of the quantization operation performed by the quantization unit 35 based on the coded data accumulated in the accumulation buffer 37 such that an overflow or underflow does not occur.

In Step S52, the accumulation buffer 37 outputs the stored coded data to the generation unit 38. Then, the process is returned to Step S13 illustrated in FIG. 9 and proceeds to Step S14. Then, the process is returned to Step S13 illustrated in FIG. 9 and proceeds to Step S14.

In the coding process illustrated in FIGS. 10 and 11, for the simplification of description, while the intra prediction process and the motion predicting/compensating process are configured to be performed all the time, actually, there are also cases where only one thereof is performed based on the picture type or the like.

As above, since the identification data is set, the coding apparatus 10 can adjust the compression rate of a lowest limit and the maximum value of the bit rate based on the identification data. As a result, a retrial of the coding process can be suppressed. In addition, a coded stream of a higher bit rate can be generated.

(Example of Configuration of Decoding Apparatus According to First Embodiment)

Figure 12:
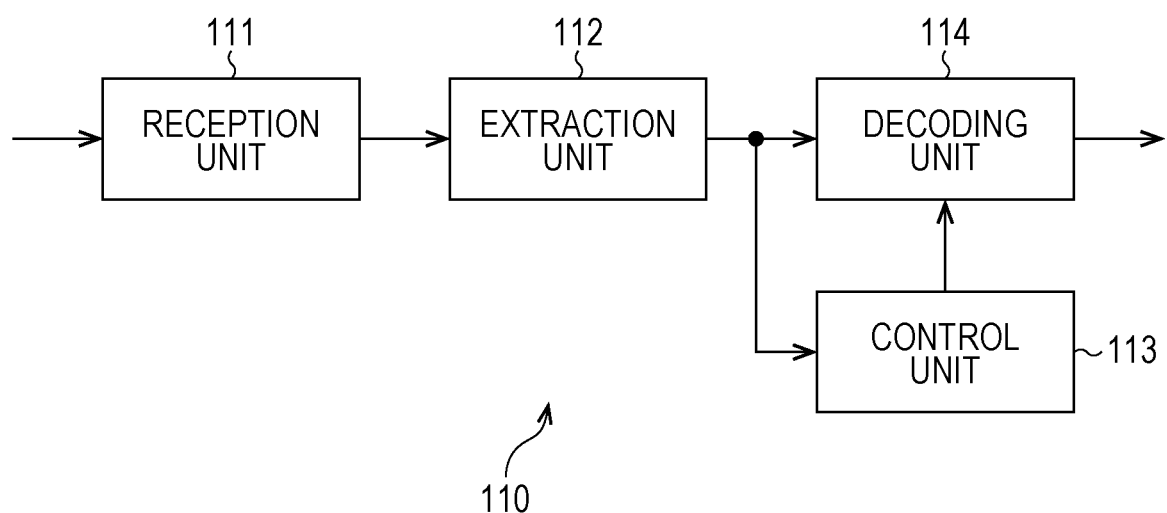
FIG. 12 is a block diagram that illustrates an example of the configuration of the decoding apparatus of the first embodiment according to the present disclosure.

FIG. 12 is a block diagram that illustrates an example of the configuration of a decoding apparatus of the first embodiment according to the present disclosure that decodes a coded stream transmitted from the coding apparatus 10 illustrated in FIG. 3.

The decoding apparatus 110 illustrated in FIG. 12 is configured by: a reception unit 111; an extraction unit 112; a control unit 113; and a decoding unit 114.

The reception unit 111 of the decoding apparatus 110 receives a coded stream transmitted from the coding apparatus 10 illustrated in FIG. 3 and supplies the received coded stream to the extraction unit 112.

The extraction unit (parsing unit) 112 extracts (parses) a parameter set and coded data from the coded stream supplied from the reception unit 111 and supplies the extracted coded data to the decoding unit 114. In addition, the extraction unit 112 supplies the parameter set to the control unit 113.

The control unit 113 calculates a compression rate of a lowest limit, similarly to the control unit 13 illustrated in FIG. 3, based on MinCr and identification data corresponding to a level represented by the information included in profile_tier_level supplied from the extraction unit 112. In addition, the control unit 113 calculates a maximum value of the bit rate, similarly to the control unit 13, based on a maximum value of the bit rate and identification data corresponding to the tier represented by the information included in profile_tier_level. The control unit 113 controls the decoding process performed by the decoding unit 114 based on the compression rate of the lowest limit and the maximum value of the bit rate.

The decoding unit 114 decodes the coded data supplied from the extraction unit 112 in units of CUs by using the HEVC system under the control of the control unit 113. At this time, the decoding unit 114, as is necessary, refers to the parameter set supplied from the extraction unit 112. The decoding unit 114 outputs an image acquired as a result of the decoding process.

(Example of Configuration of Decoding Unit)

Figure 13:
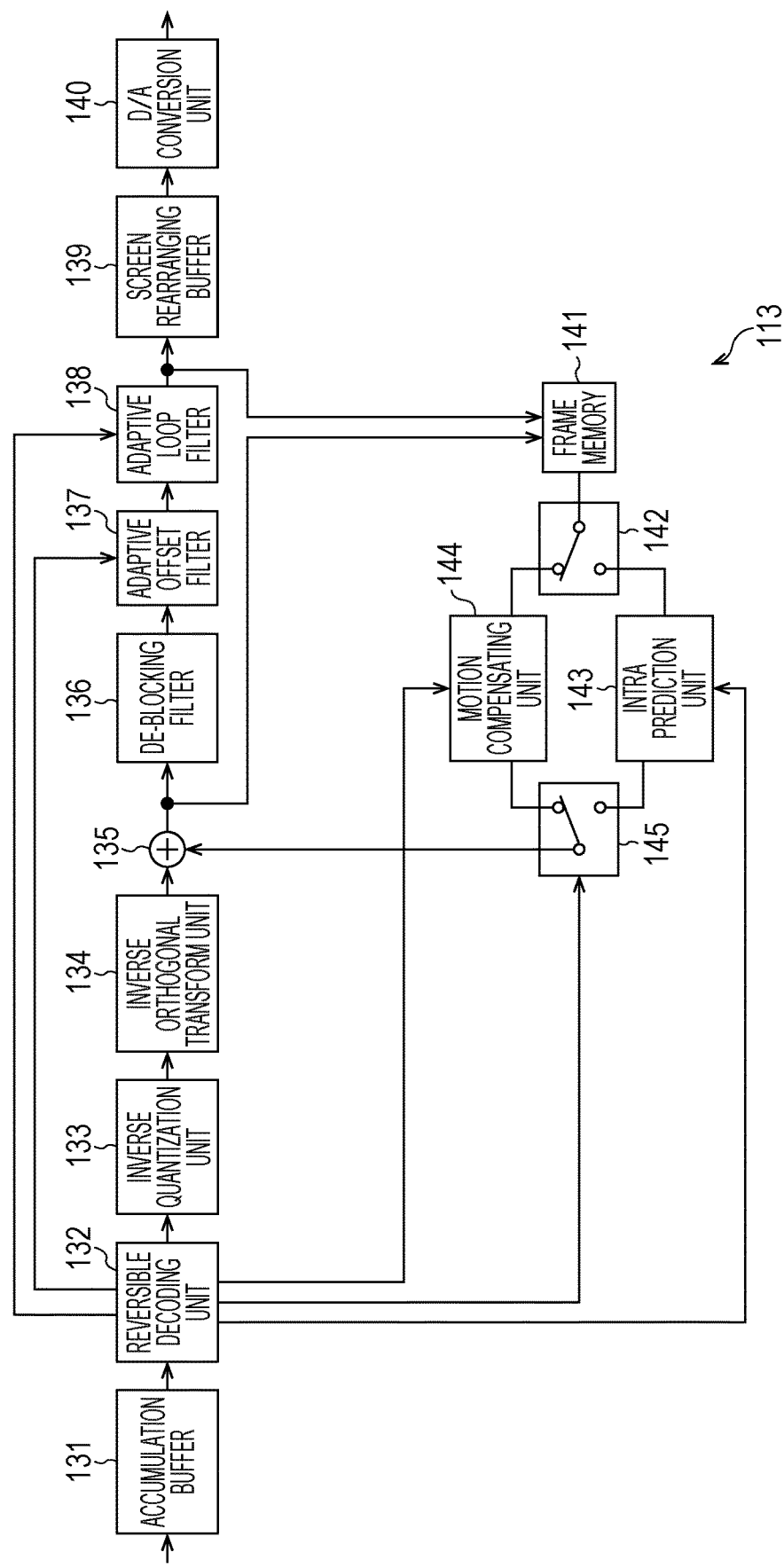
FIG. 13 is a block diagram that illustrates an example of the configuration of a decoding unit illustrated in FIG. 12.

FIG. 13 is a block diagram that illustrates an example of the configuration of the decoding unit 114 illustrated in FIG. 12.

The decoding unit 114 illustrated in FIG. 13 includes: an accumulation buffer 131; a reversible decoding unit 132; an inverse quantization unit 133; an inverse orthogonal transform unit 134; an addition unit 135; a de-blocking filter 136; an adaptive offset filter 137; an adaptive loop filter 138; and a screen rearranging buffer 139. In addition, the decoding unit 114 includes: a D/A conversion unit 140; a frame memory 141; a switch 142; an intra prediction unit 143; a motion compensation unit 144; and a switch 145.

The accumulation buffer 131 of the decoding unit 114 receives coded data from the extraction unit 112 illustrated in FIG. 12 and accumulates the received coded data. The accumulation buffer 131 supplies the accumulated coded data to the reversible decoding unit 132.

The reversible decoding unit 132 performs reversible decoding such as variable length decoding or arithmetic decoding corresponding to the reversible coding process performed by the reversible coding unit 36 illustrated in FIG. 7 for the coded data supplied from the accumulation buffer 131, thereby acquiring the quantized orthogonal transform coefficients and the coding information. The reversible decoding unit 132 supplies the quantized orthogonal transform coefficients to the inverse quantization unit 133. In addition, the reversible decoding unit 132 supplies the intra prediction mode information and the like to the intra prediction unit 143 as coding information. The reversible decoding unit 132 supplies the motion vector, the inter prediction mode information, the information specifying a reference image, and the like to the motion compensation unit 144.

Furthermore, the reversible decoding unit 132 supplies the intra prediction mode information or the inter prediction mode information as coding information to the switch 145. The reversible decoding unit 132 supplies the offset filter information as coding information to the adaptive offset filter 137. The reversible decoding unit 132 supplies the filter coefficients as coding information to the adaptive loop filter 138.

The inverse quantization unit 133, the inverse orthogonal transform unit 134, the addition unit 135, the de-blocking filter 136, the adaptive offset filter 137, the adaptive loop filter 138, the frame memory 141, the switch 142, the intra prediction unit 143, and the motion compensation unit 144 respectively perform processes similar to the processes performed by the inverse quantization unit 39, the inverse orthogonal transform unit 40, the addition unit 41, the de-blocking filter 42, the adaptive offset filter 43, the adaptive loop filter 44, the frame memory 45, the switch 46, the intra prediction unit 47, and the motion predicting/compensating unit 48 illustrated in FIG. 7, and accordingly, an image is decoded.

More specifically, the inverse quantization unit 133 performs inverse quantization of the quantized orthogonal transform coefficients supplied from the reversible decoding unit 132 and supplies orthogonal transform coefficients acquired as a result thereof to the inverse orthogonal transform unit 134.

The inverse orthogonal transform unit 134 performs an inverse orthogonal transform of the orthogonal transform coefficients supplied from the inverse quantization unit 133 in units of TUs. The inverse orthogonal transform unit 134 supplies residual information acquired as a result of the inverse orthogonal transform to the addition unit 135.

The addition unit 135 adds the residual information supplied from the inverse orthogonal transform unit 134 and the predicted image supplied from the switch 145, thereby performing decoding. The addition unit 135 supplies an image acquired as a result of the decoding process to the de-blocking filter 136 and the frame memory 141.

In addition, in a case where a predicted image is not supplied from the switch 145, the addition unit 135 supplies an image that is the residual information supplied from the inverse orthogonal transform unit 134 to the de-blocking filter 136 and the frame memory 141 as an image acquired as a result of the decoding process.

The de-blocking filter 136 performs a de-blocking filter process for the image supplied from the addition unit 135 and supplies an image acquired as a result thereof to the adaptive offset filter 137.

The adaptive offset filter 137 performs an adaptive offset filter process of a type represented by the offset filter information for an image after the de-blocking filter process for each LCU by using an offset represented by the offset filter information supplied from the reversible decoding unit 132. The adaptive offset filter 137 supplies an image after the adaptive offset filter process to the adaptive loop filter 138.

The adaptive loop filter 138 performs an adaptive loop filter process for an image supplied from the adaptive offset filter 137 for each LCU by using the filter coefficients supplied from the reversible decoding unit 132. The adaptive loop filter 138 supplies an image acquired as a result thereof to the frame memory 141 and the screen rearranging buffer 139.

The screen rearranging buffer 139 stores images supplied from the adaptive loop filter 138 in units of frames. The screen rearranging buffer 139 rearranges stored images configured in units of frames in order for coding into the original display order and supplies the rearranged images to the D/A conversion unit 140.

The D/A conversion unit 140 performs D/A conversion of the images configured in units of frames supplied from the screen rearranging buffer 139 and outputs converted images.

The frame memory 141 accumulates images supplied from the adaptive loop filter 138 and images supplied from the addition unit 135. In an image, for which a filter process has not been performed, accumulated in the frame memory 141, pixels adjacent to a PU are supplied to the intra prediction unit 143 through the switch 142 as surrounding pixels. On the other hand, an image, for which the filter process has been performed, accumulated in the frame memory 141 is supplied to the motion compensation unit 144 through the switch 142 as a reference image.

The intra prediction unit 143 performs an intra prediction process of the optimal intra prediction mode represented by the intra prediction mode information supplied from the reversible decoding unit 132 by using the surrounding pixels read from the frame memory 141 through the switch 142 in units of PUs. The intra prediction unit 143 supplies a predicted image generated as a result thereof to the switch 145.

The motion compensation unit 144 reads a reference image, which is specified by the information specifying a reference image that is supplied from the reversible decoding unit 132, from the frame memory 141 through the switch 142. The motion compensation unit 144 includes a two-dimensional linear interpolation adaptation filter. The motion compensation unit 144 performs an interpolation filter process for the reference image by using the two-dimensional linear interpolation adaptation filter, thereby increasing the resolution of the reference image. The motion compensation unit 144 performs a motion compensation process of the optimal inter prediction mode represented by the inter prediction mode information supplied from the reversible decoding unit 132 in units of PUs by using the reference image of which the resolution has been increased and the motion vector supplied from the reversible decoding unit 132. The motion compensation unit 144 supplies a predicted image generated as a result thereof to the switch 145.

In a case where the intra prediction mode information is supplied from the reversible decoding unit 132, the switch 145 supplies a predicted image supplied from the intra prediction unit 143 to the addition unit 135. On the other hand, in a case where the inter prediction mode information is supplied from the reversible decoding unit 132, the switch 145 supplies a predicted image supplied from the motion compensation unit 144 to the addition unit 135.

(Description of Process of Decoding Apparatus)

Figure 14:
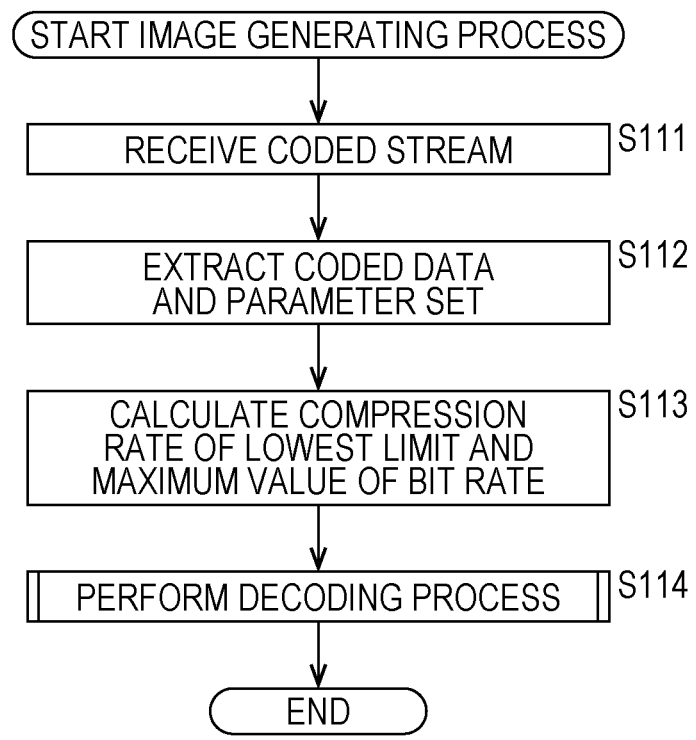
FIG. 14 is a flowchart that illustrates an image generating process performed by the decoding apparatus illustrated in FIG. 12.

FIG. 14 is a flowchart that illustrates an image generating process performed by the decoding apparatus 110 illustrated in FIG. 12.

In Step S111 illustrated in FIG. 14, the reception unit 111 of the decoding apparatus 110 receives a coded stream transmitted from the coding apparatus 10 illustrated in FIG. 3 and supplies the received coded stream to the extraction unit 112.

In Step S112, the extraction unit 112 extracts the coded data and the parameter set from the coded stream supplied from the reception unit 111 and supplies the coded data and the parameter set, which have been extracted, to the decoding unit 114.

In Step S113, the control unit 113 calculates a compression rate of a lowest limit based on MinCr and identification data corresponding to a level represented by the information included in profile_tier_level supplied from the extraction unit 112. In addition, the control unit 113 calculates a maximum value of the bit rate based on the maximum value of the bit rate and identification data corresponding to a tier represented by the information included in profile_tier_level. The control unit 113 controls the decoding process of Step S114 based on the compression rate of the lowest limit and the maximum value of the bit rate.

In Step S114, the decoding unit 114 performs a decoding process of decoding coded data supplied from the extraction unit 112 by using a system compliant with the HEVC system using the parameter set supplied from the extraction unit 112 as is necessary. Details of this decoding process will be described later with reference to FIG. 15 to be described later. Then, the process ends.

Figure 15:
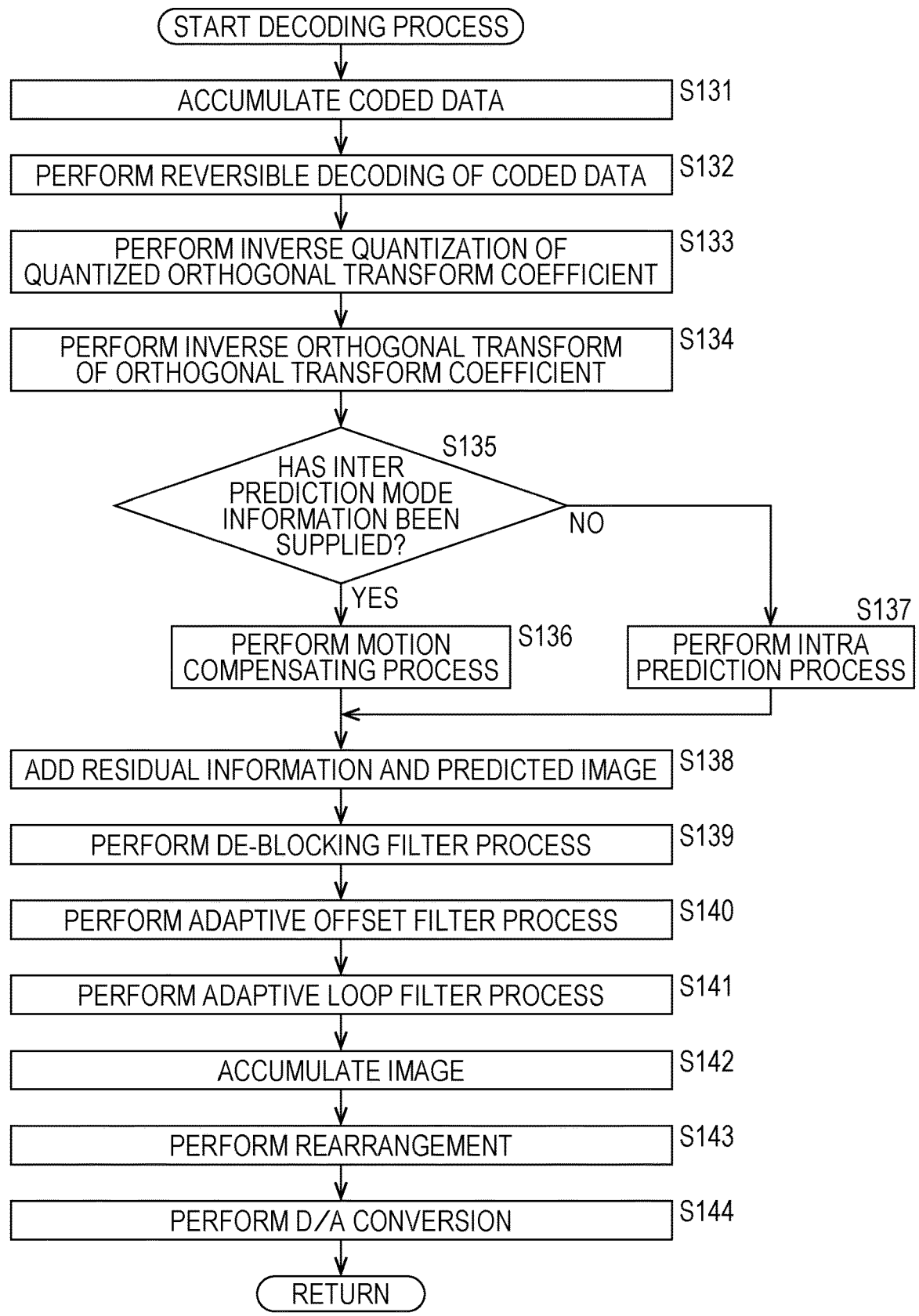
FIG. 15 is a flowchart that illustrates details of a decoding process illustrated in FIG. 14.

FIG. 15 is a flowchart that illustrates details of the decoding process of Step S114 illustrated in FIG. 14.

In Step S131 illustrated in FIG. 15, the accumulation buffer 131 (FIG. 13) of the decoding unit 114 receives coded data in units of frames from the extraction unit 112 illustrated in FIG. 12 and accumulates the received data. The accumulation buffer 131 supplies the accumulated coded data to the reversible decoding unit 132.

In Step S132, the reversible decoding unit 132 performs reversible decoding of the coded data supplied from the accumulation buffer 131, thereby acquiring the quantized orthogonal transform coefficients and the coding information. The reversible decoding unit 132 supplies the quantized orthogonal transform coefficients to the inverse quantization unit 133.

In addition, the reversible decoding unit 132 supplies the intra prediction mode information and the like as coding information to the intra prediction unit 143. The reversible decoding unit 132 supplies the motion vector, the inter prediction mode information, the information specifying a reference image, and the like to the motion compensation unit 144.

In addition, the reversible decoding unit 132 supplies the intra prediction mode information or the inter prediction mode information as coding information to the switch 145. The reversible decoding unit 132 supplies the offset filter information as coding information to the adaptive offset filter 137 and supplies the filter coefficients to the adaptive loop filter 138.

In Step S133, the inverse quantization unit 133 performs inverse quantization of the quantized orthogonal transform coefficients supplied from the reversible decoding unit 132 and supplies orthogonal transform coefficients acquired as a result thereof to the inverse orthogonal transform unit 134.

In Step S134, the inverse orthogonal transform unit 134 performs an inverse orthogonal transform for the orthogonal transform coefficients supplied from the inverse quantization unit 133 and supplies residual information acquired as a result thereof to the addition unit 135.

In Step S135, the motion compensation unit 144 determines whether or not the inter prediction mode information has been supplied from the reversible decoding unit 132. In a case where the inter prediction mode information is determined to have been supplied in Step S135, the process proceeds to Step S136.

In Step S136, the motion compensation unit 144 reads a reference image based on the reference image specifying information supplied from the reversible decoding unit 132 in units of PUs and performs a motion compensation process of an optimal inter prediction mode represented by the inter prediction mode information by using the motion vector and the reference image. The motion compensation unit 144 supplies a predicted image generated as a result thereof to the addition unit 135 through the switch 145, and the process proceeds to Step S138.

On the other hand, in a case where the inter prediction mode information is determined not to have been supplied in Step S135, in other words, in a case where the intra prediction mode information is supplied to the intra prediction unit 143, the process proceeds to Step S137.

In Step S137, the intra prediction unit 143 performs an intra prediction process of an intra prediction mode represented by the intra prediction mode information by using surrounding pixels read from the frame memory 141 through the switch 142 in units of PUs. The intra prediction unit 143 supplies a predicted image generated as a result of the intra prediction process to the addition unit 135 through the switch 145, and the process proceeds to Step S138.

In Step S138, the addition unit 135 adds the residual information supplied from the inverse orthogonal transform unit 134 and the predicted image supplied from the switch 145, thereby locally performing decoding. The addition unit 135 supplies an image acquired as a result of the decoding process to the de-blocking filter 136 and the frame memory 141.

In Step S139, the de-blocking filter 136 performs a de-blocking filter process for the image supplied from the addition unit 135, thereby eliminating a block distortion. The de-blocking filter 136 supplies an image acquired as a result thereof to the adaptive offset filter 137.

In Step S140, the adaptive offset filter 137 performs an adaptive offset filter process for an image supplied from the de-blocking filter 136 for each LCU based on the offset filter information supplied from the reversible decoding unit 132.

The adaptive offset filter 137 supplies an image after the adaptive offset filter process to the adaptive loop filter 138.

In Step S141, the adaptive loop filter 138 performs an adaptive loop filter process for an image supplied from the adaptive offset filter 137 for each LCU by using the filter coefficients supplied from the reversible decoding unit 132. The adaptive loop filter 138 supplies an image acquired as a result thereof to the frame memory 141 and the screen rearranging buffer 139.

In Step S142, the frame memory 141 accumulates an image supplied from the addition unit 135 and an image supplied from the adaptive loop filter 138. In an image, for which the filter process has not been performed, accumulated in the frame memory 141, pixels adjacent to the PU are supplied to the intra prediction unit 143 through the switch 142 as surrounding pixels. On the other hand, an image, for which the filter process has been performed, accumulated in the frame memory 141 is supplied to the motion compensation unit 144 through the switch 142 as a reference image.

In Step S143, the screen rearranging buffer 139 stores images supplied from the adaptive loop filter 138 in units of frames, rearranges stored images configured in units of frames, which are in order for coding, in the original display order, and supplies the rearranged images to the D/A conversion unit 140.

In Step S144, the D/A conversion unit 140 performs a D/A conversion of images configured in units of frames supplied from the screen rearranging buffer 139 and outputs the converted images. Then, the process is returned to Step S114 illustrated in FIG. 14, and the process ends.

As above, the decoding apparatus 110 adjusts the compression rate of the lowest limit and the maximum value of the bit rate based on the identification data. Accordingly, a coded stream, which is generated by the coding apparatus 10, of which the restrictions that are the compression rate of the lowest limit and the maximum value of the bit rate are adjusted, can be decoded.

(Second Example of Parameter Used for Calculating Maximum Value of Bit Rate and Compression Rate of Lowest Limit)

FIG. 16 is a diagram that illustrates a second example of parameters used for calculating a maximum value of the bit rate and a compression rate of a lowest limit.

In the example illustrated in FIG. 16, a parameter MinCrScaleFactor of a case where the profile is a Main profile or a Main 10 profile is adjusted by a parameter ShFactor, and the parameter ShFactor is defined not by Equation (6) described above but by the following Equation (7), which are different from the example illustrated in FIG. 5.

[Mathematical Formula 7]

$$ShFactor = 1 + (!general\_lower\_bit\_rate\_constraint\_flag) * general\_higher\_bit\_rate\_indication\_flag \quad (7)$$

(Second Example of Parameters HbrFactor and ShFactor)

FIG. 17 is a diagram that illustrates an example of the parameters HbrFactor and ShFactor used for adjusting the parameters illustrated in FIG. 16 in a case where the profiles are Long Gop profiles and All Intra profiles.

Here, a super high tier is a virtual tier having a maximum value of the bit rate to be higher than that of the high tier.

As illustrated in FIG. 17, in a case where the profile is Long Gop profiles, and the tier is the main tier, a tier flag (general_tier_flag) is set to zero. In addition, a low bit rate flag (general_lower_bit_rate_constraint_flag) is set to "1", and identification data (general_higher_bit_rate_indication_flag) is set to "0". Accordingly, the parameter HbrFactor becomes "1", and the parameter ShFactor becomes "1".

As a result, the maximum value of the bit rate and the compression rate of the lowest limit respectively become a maximum value of the bit rate corresponding to the main tier and a compression rate of the lowest limit represented by MinCr, and the maximum value of the bit rate and the compression rate of the lowest limit are not adjusted.

On the other hand, in a case where the profile is the Long Gop profiles, and the tier is the high tier, the tier flag (general_tier_flag) is set to "1". In addition, the low bit rate flag (general_lower_bit_rate_constraint_flag) is set to "1", and the identification data (general_higher_bit_rate_indication_flag) is set to "1". Thus, the parameter HbrFactor becomes "2", and the parameter ShFactor becomes "1".

As a result, the maximum value of the bit rate becomes the maximum value of a bit rate corresponding to the main tier and thus, is not adjusted. However, in a case where the profile is other than the Main profile and the Main 10 profile, the compression rate of the lowest limit becomes ½ of the compression rate of the lowest limit represented by MinCr. In a case where the profile is the Main profile or the Main 10 profile, the compression rate of the lowest limit is not adjusted as well.

In addition, in a case where the profile is the Long Gop profiles, and the tier is the super high tier, the tier flag (general_tier_flag) is set to "1". In addition, the low bit rate flag (general_lower_bit_rate_constraint_flag) is set to "0", and the identification data (general_higher_bit_rate_indication_flag) is set to "1". Thus, the parameter HbrFactor becomes "4", and the parameter ShFactor becomes "2".

As a result, the maximum value of the bit rate becomes twice the bit rate corresponding to the main tier. In addition, in a case where the profile is other than the Main profile and the Main 10 profile, the compression rate of the lowest limit becomes ¼ of the compression rate of the lowest limit represented by MinCr. In a case where the profile is the Main profile or the Main 10 profile, the compression rate of the lowest limit becomes ½ of the compression rate of the lowest limit represented by MinCr.

As above, in a case where the profile is the Main profile or the Main 10 profile, the compression rate of the lowest limit is not adjusted at the time of the high tier, but the compression rate of the lowest limit is adjusted only at the time of the super high tier.

A case where the profile is the All Intra profiles is similar to the case illustrated in FIG. 6, and thus, the description thereof will not be presented.

In the description presented above, while the identification data is used for identifying the adjustment of both the compression rate of the lowest limit and the maximum value of the bit rate corresponding to the tier, the identification data may be configured to be used for identifying the adjustment of one thereof. In such a case, based on the identification data, one of the compression rate of the lowest limit and the maximum value of the bit rate corresponding to the tier is adjusted.

For example, in a case where the identification data is used for identifying the adjustment of only the compression rate of the lowest limit, parameters CpbBrVclFactor, CpbBrNalFactor, and MinCrScaleFactor are as illustrated in FIG. 18.

In other words, as illustrated in FIG. 18, the parameters CpbBrVclFactor and CpbBrNalFactor are adjusted using a parameter HbrFactor', and the parameter MinCrScaleFactor is adjusted using the parameter HbrFactor.

The parameter HbrFactor' is defined in the following Equation (8) using the low bit rate flag (general_lower_bit_rate_constraint_flag) included in profile_tier_level.

[Mathematical Formula 8]

$$HbrFactor' = 2 - \text{general\_lower\_bit\_rate\_constraint\_flag} \quad (8)$$

In addition, the parameter HbrFactor of a case where the profile is the Long Gop profiles and the All Intra profiles, for example, is as illustrated in FIG. 19.

As illustrated in FIG. 19, in a case where the profile is the Long Gop profiles, and the tier is the main tier, the tier flag (general_tier_flag) is set to "0". In addition, the low bit rate flag (general_lower_bit_rate_constraint_flag) is set to "1", and the identification data (general_higher_bit_rate_indication_flag) is set to "0". Thus, the parameter HbrFactor becomes "1". As a result, the compression rate of the lowest limit becomes the compression rate of the lowest limit represented by MinCr and thus, is not adjusted.

On the other hand, in a case where the profile is the Long Gop profiles, and the tier is the high tier, the tier flag (general_tier_flag) is set to "1". In addition, the low bit rate flag (general_lower_bit_rate_constraint_flag) is set to "1", and the identification data (general_higher_bit_rate_indication_flag) is set to "1". Thus, the parameter HbrFactor becomes "2". As a result, the compression rate of the lowest limit becomes ½ of the compression rate of the lowest limit represented by MinCr.

In case of the example illustrated in FIG. 18, in a case where the profile is the Long Gop profiles, the maximum value of the bit rate is not adjusted.

In addition, in a case where the profile is the All Intra profiles, and the tier is the main tier, the tier flag (general_tier_flag) is set to "0". In addition, the low bit rate flag (general_lower_bit_rate_constraint_flag) is set to "0" or "1", and the identification data (general_higher_bit_rate_indication_flag) is set to "0". Thus, the parameter HbrFactor becomes "2" or "1", and the parameter ShFactor becomes "2" or "1".

As a result, the maximum value of the bit rate becomes twice the bit rate corresponding to the main tier, and the compression rate of the lowest limit becomes ½ of the compression rate of the lowest limit represented by MinCr, or both are not adjusted.

On the other hand, in a case where the profile is the All Intra profiles, and the tier is the high tier, the tier flag (general_tier_flag) is set to "1". In addition, the low bit rate flag (general_lower_bit_rate_constraint_flag) is set to "0" or "1", and the identification data (general_higher_bit_rate_indication_flag) is set to "1". Thus, the parameter HbrFactor becomes "4" or "2", and the parameter ShFactor becomes "4" or "2".

As a result, the maximum value of the bit rate becomes four times or two times of the bit rate corresponding to the main tier, and the compression rate of the lowest limit becomes ¼ or ½ of the compression rate of the lowest limit represented by MinCr.

In addition, instead of the parameter HbrFactor', the parameter HbrFactor may be configured to be used.

In the description presented above, while the compression rate of the lowest limit is adjusted based on the identification data, as illustrated in FIG. 20, by setting MinCr for each tier, the compression rate of the lowest limit may be adjusted.

Second Embodiment

We have added our arguments to section 1 and added our proposed system as a new. "Option 2", adding working draft text to the annex.

We have pulled FormatCapabilityFactor into the maximum bit rate calculations by making CpbBr[Vcl|Nal]Factor a function of it. If that is too much change, CpbBr[Vcl|Nal]Factor is profile-specific anyway and we can just change that value to accommodate 4:4:4 12-bit or 16-bit (The value is used only for determining maximum bit rate).

We have modified Option 1 with a few extra ShFactors, which should effect the desired quadrupling of the bit rate when in super-high tier. Note that Option 1 does not address the inability of the CPB to store a whole frame, but this is not an actual requirement, just a nice-to-have.

If we go with this option, we will need to tweak the values of CpbBr [Vcl|Nal] Factor for the higher profiles in order to take maximum bit depth into account as well as chroma format.

Variant 1 of Option 1 may have to be removed as it does not address the problem with maximum bit rate—only MinCR is modified.

Option 3 can work as long as it is accepted into 01005_v4 (i.e. alongside the HbrFactor stuff) If this case is used, then, as with Option 1, we will need to tweak CpbBr[Vcl|Nal] Factor for the higher profiles to get the maximum bit rates we want for higher bit depths.

As an aside, there seems to be a missing edit in subclause E.2.3 in the working draft. Specifically the definitions of the inferred default values for cpb_size_value_minus1 and cpb_size_du_value_minus1 still contain references to CpbBrVclFactor and CpbBrNalFactor even though these have been fixed to 1000 and 1100 respectively when determining CPB sizes.

Abstract

The constraint on MinCR is specified to limit the worst case of CABAC decoding process. In the current level/tier definition, the value of MinCR is the same for both Main Tier and High Tier. The current MinCR was defined mainly for Main Tier and larger value is used for higher level. For example, MinCR is equal to 8 for level 5.1 (4K@60p). However this value is too large for high end professional equipments. In addition, the implicit minimum sequence compression ratio defined by the maximum bit rate and maximum luma sample rate is asserted to be overly restrictive when using all-intra coding or higher bit depths and chroma formats, to the point where MinCr becomes superfluous. This contribution proposes to reduce the value of MinCR and introduce a new tier to allow increased bit rates for high end professional applications.

1 MinCR

The level and tier limits are specified in FIG. 1 (Table A-1) and FIG. 2 (Table A-2).

Main tier is defined mainly for consumer applications. high tier is defined for high end consumer and professional applications. The bit rate of high tier is higher than that of main tier. However MinCR is the same for both main and high tier.

For large picture, e.g. 4K video, higher value of MinCR is used to reduce the worst case complexity of CABAC. For example, the value of MinCR is 8 for level 5.1 (4K@60p).

However MinCR=8 is too high for high end applications. When 4K@60p video is encoded at 160 Mbps, this MinCR>8 is normally occurred for I picture and it is not a rare case.

In addition, MinCR=8 is too high when the target quality is visually lossless. It is hard to achieve visually lossless coding due to this constraint.

As well as the per-frame minimum compression ratio defined by MinCR, there also exists an implied minimum compression ratio for the sequence as a whole defined by the maximum bit rate and maximum luma sample rate. In the example given above, if 4K@60p video is to be coded using level 5.1 (the lowest level at which such video can be coded), though the MinCr value is 8, the actual minimum compression ratio is defined as:

Maximum luma sample rate=534,773,760 samples/second(equal to 4096×2176@60p)Maximum bit rate(high tier)=160,000,000 bits/second(main profile CpbBrVclFactor)

Baseband bit rate=534,773,760*1.5(4:2:0)*8(bits/sample)=6,417,285,120 bits/second Minimum sequence compression ratio=baseband bit rate/maximum bit rate=40:1

Though this degree of compression may be acceptable for inter-coded sequences (as the inter pictures can be compressed to a far greater degree than the intra pictures), for all-intra-coded sequences, the MinCR-defined minimum compression ratio becomes purely academic as the sequence must be compressed 40:1 using only intra coding.

Because of this, it will be necessary to modify the maximum bit rate when all-intra coding is in use if the value of MinCR is to be at all relevant. In addition, the above example uses only 4:2:0 8-bit coding. When higher bit depths and more detailed chroma formats are in use, the minimum compression ratio will be even larger. For example, when using 4:4:412-bit processing, the minimum compression ratio doubles to 80:1.

Furthermore, for certain profile and level combinations (e.g. HD@30p 4:4:4 12-bit coded using level 4−MinCr=4 (MinCrBase)*0.5 (MinCrScaleFactor)=2), the Coded Picture Buffer (CPB) (30,000,000 bits at level 4) will not be able to contain a whole coded picture if that picture has compression ratio equal to MinCR. Though there is no actual requirement that a decoder must hold a whole picture at once, it may introduce difficulties in implementation.

There is, however a requirement that the decoder be able to remove pictures from the CPB in real-time. The maximum coded picture size is given as (example: HD@30p 4:4:4 12-bit coded in level 4):

Baseband picture size=1920*1080*3*12=74,649,600 bits

Maximum compressed picture size=baseband size/MinCR=37,324,800 bits

If the CPB is filled at the maximum bit rate (45,000,000 bits/second for 4:4:4 12-bit at level 4 (high tier)), then the decoder will be receiving only 1.2 pictures/second and will not be able to decode the sequence in real-time. It would be possible to alleviate this problem by coding in a higher level, though even for HD@30p, level 6.1 or higher is required to provide a high enough maximum bit rate.

Therefore, this contribution proposes to reduce the value of MinCR and introduce a new tier for high-end professional applications.

2 Proposal

Version 4 of the current working draft text (JCTVC-01005_v4) allows MinCR to be halved and maximum bit rate to be doubled via HbrFactor when all-intra coding is in use. Though this modification to MinCR is sufficient, a greater change to the maximum bit rate is needed for use in high-end professional applications.

Since the product development of HEVC had already been started and there are some deployments in market. Therefore the changes should be made not affecting such deployments. There could be the following options.

Option 1: Add another tier, e.g. "Super high tier", and MinCR is reduced for such tier. A flag is introduced to indicate to reduce MinCR and to increase Max Bitrate and define profile specific level/tier constraints for RExt profiles. For those profiles, MinCR of high tier is interpreted to lower value.

Option 2: Add Super high tier and increase Max Bitrate for this tier. Reduce MinCR using the method specified in JCTVC-01005_v4.

Option 3: If all current deployments are for main tier and if all people agree, it may be possible to change the values of MinCR and Max Bitrate of high tier. It means the changes are applied to Main and Main 10 profiles.

The text changes for each options are summarized in the Annex.

If nobody object, option 2 is desirable as it most easily integrates with the current working draft without requiring modification to version 1, but option 1 and option 3 could be fine too. It should be decided during the discussion in San Jose meeting.

3 Conclusions

In this contribution, three options to reduce MinCR and increase the maximum bit rate are proposed. One of those options should be adopted to support visually lossless coding in HEVC.

4 Annex 4.1 Option 1

Add flag to indicate higher bit rate (general_higher_bit_rate_indication_flag) (FIG. 3)
Change the level limits as follows
Maximum bit rate is derived as follows.
VCL HRD parameter: Max bit rate=CpbBrVclFactor*MaxBR
NAL HRD parameter: Max bit rate=CpbBrNalFactor*MaxBR
MinCR is derived as follows
MinCR=Max(1,MinCrBase*MinCrScaleFactor)
where MaxBR and MinCrBase are defined in Table A-2. CpbBrVclFactor, CpbBrNalFactor and MinCrScaleFactor are defined in Table A-3 as follows.
Variant 1: Reduce MinCR for high tier (FIG. 21 and FIG. 22)
HbrFactor=(2−general_lower_bit_rate_constraint_flag)+2*general_higher_bit_rate_indication_flag
VCL HRD parameter: Max bit rate=CpbBrVclFactor*MaxBR
NAL HRD parameter: Max bit rate=CpbBrNalFactor*MaxBR
MinCR=Max(1, MinCrBase*MinCrScaleFactor)
Variant 2: Add "Super high tier" and MinCR of Main and Main 10 are only changed for new tier (FIG. 23 and FIG. 24)
HbrFactor=(2−general_lower_bit_rate_constraint_flag)+2*general_higher_bit_rate_indication_flag
ShFactor=1+(!general_lower_bit_rate_constraint_flag)*general_higher_bit_rate_indication_flag
Variant 3: Add "Super high tier" and modify MinCR for high tier (FIG. 25 and FIG. 26)

HbrFactor=2−general_lower_bit_rate_constraint_flag+2*general_higher_bit_rate_indication_flag ShFactor=1+(!general_lower_bit_rate_constraint_flag)*3*general_higher_bit_rate_indication_flag VCL HRD parameter: Max bit rate=CpbBrVclFactor*MaxBR NAL HRD parameter: Max bit rate=CpbBrNalFactor*MaxBR MinCR=Max(1, MinCrBase*MinCrScaleFactor)

4.2 Option 2

Introduce super high tier. Use method as in JCTVC-O1005_v4 to modify MinCR.

4.2.1 Profile, Tier and Level Syntax (FIG. 27)

The value of general_super_high_tier_flag shall be 0 except when the value of general_tier_flag is 0. The value 1 of general_super_high_tier_flag when general_tier_flag is 1 is reserved for future use.

Change the level limits as follows

Maximum bit rate is derived as follows.

VCL HRD parameter: Max bit rate=CpbBrVclFactor*MaxBR

NAL HRD parameter: Max bit rate=CpbBrNalFactor*MaxBR

MinCR is derived as follows

MinCR=Max(1, MinCrBase*MinCrScaleFactor)

HbrFactor is derived as follows

HbrFactor=2−general_lower_bit_rate_constraint_flag

CpbBrVclFactor and CpbBrNalFactor are derived as follows.

CpbBrVclFactor=((FormatCapabilityFactor*HbrFactor)/1.5)*1000

CpbBrNalFactor=((FormatCapabilityFactor*HbrFactor)/1.5)*1100 where MaxBR and MinCrBase are defined in Table A-2, FormatCapabilityFactor and MinCrScaleFactor are defined in Table A-3.

Table A 1—General tier and level limits (FIG. 28)

Table A 2—Tier and level limits for the Monochrome 12, Monochrome 16, Main, Main 10, Main 12, Main 4:2:2 10, Main 4:2:2 12, Main 4:4:4, Main 4:4:4 10, and Main 4:4:4 12, Main Intra, Main 10 Intra, Main 12 Intra, Main 4:2:2 10 Intra, Main 4:2:2 12 Intra, Main 4:4:4 Intra, Main 4:4:4 10 Intra, and Main 4:4:4 12 Intra profiles (FIG. 29)

Table A 3—Specification of FormatCapabilityFactor and MinCrScaleFactor (FIG. 30 and FIG. 31)

4.3 Option 3

Replace Table A-1 and A-2 with;

Table A 1—General tier and level limits (FIG. 32)

Table A 2—Tier and level limits for the Main and Main 10 profiles (FIG. 33)

Third Embodiment (Description of Computer According to Present Disclosure)

A series of the processes described above can be executed either by hardware or by software. In a case where the series of the processes is executed by software, a program configuring the software is installed to a computer. Here, the computer includes a computer that is built in dedicated hardware, a computer such as a general-purpose personal computer that can execute various functions by installing various programs thereto, and the like.

Figure 34:
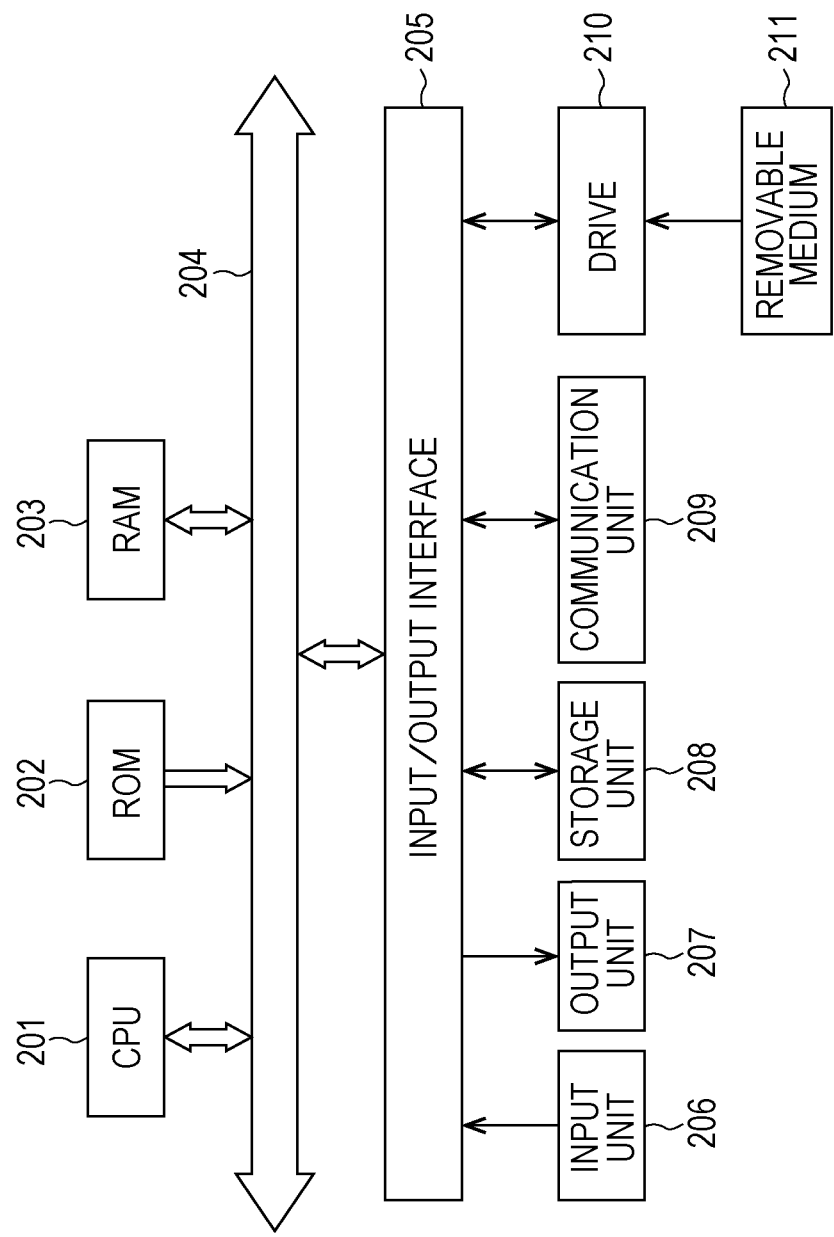
FIG. 34 is a block diagram that illustrates an example of the hardware configuration of a computer.

FIG. 34 is a block diagram that illustrates an example of the hardware configuration of a computer that executes the series of processes described above according to a program.

In the computer, a Central Processing Unit (CPU) 201, a Read Only Memory (ROM) 202, and a Random Access Memory (RAM) 203 are interconnected by a bus 204.

In addition, an input/output interface 205 is connected to the bus 204. An input unit 206, an output unit 207, a storage unit 208, a communication unit 209, and a drive 210 are connected to the input/output interface 205.

The input unit 206 is configured by a keyboard, a mouse, a microphone, and the like. The output unit 207 is configured by a display, a speaker, and the like. The storage unit 208 is configured by a hard disk, a non-volatile memory, and the like. The communication unit 209 is configured by a network interface and the like. The drive 210 drives a magnetic disk, an optical disc, a magneto-optical disk, or a removable medium 211 such as a semiconductor memory.

In the computer configured as above, the CPU 201, for example, loads a program stored in the storage unit 208 into the RAM 203 through the input/output interface 205 and the bus 204 and executes the loaded program, thereby executing the series of the processes described above.

The program executed by the computer (CPU 201), for example, may be provided with being recorded on a removable medium 211 as a package medium or the like. In addition, the program can be provided through a wired or wireless transmission medium such as a local area network, the Internet, or digital satellite broadcast.

In the computer, by loading the removable medium 211 into the drive 210, a program can be installed to the storage unit 208 through the input/output interface 205. In addition, the program can be installed to the storage unit 208 by receiving the program using the communication unit 209 through a wired or wireless transmission medium. Furthermore, the program can be installed to the ROM 202 or the storage unit 208 in advance.

In addition, the program executed by the computer may be a computer that executes the processes in a time series along the sequence described in this specification or a program that executes the processes in a parallel manner or at necessary timing such as at the timing of being called.

Fourth Embodiment (Example of Configuration of Television Apparatus)

Figure 35:
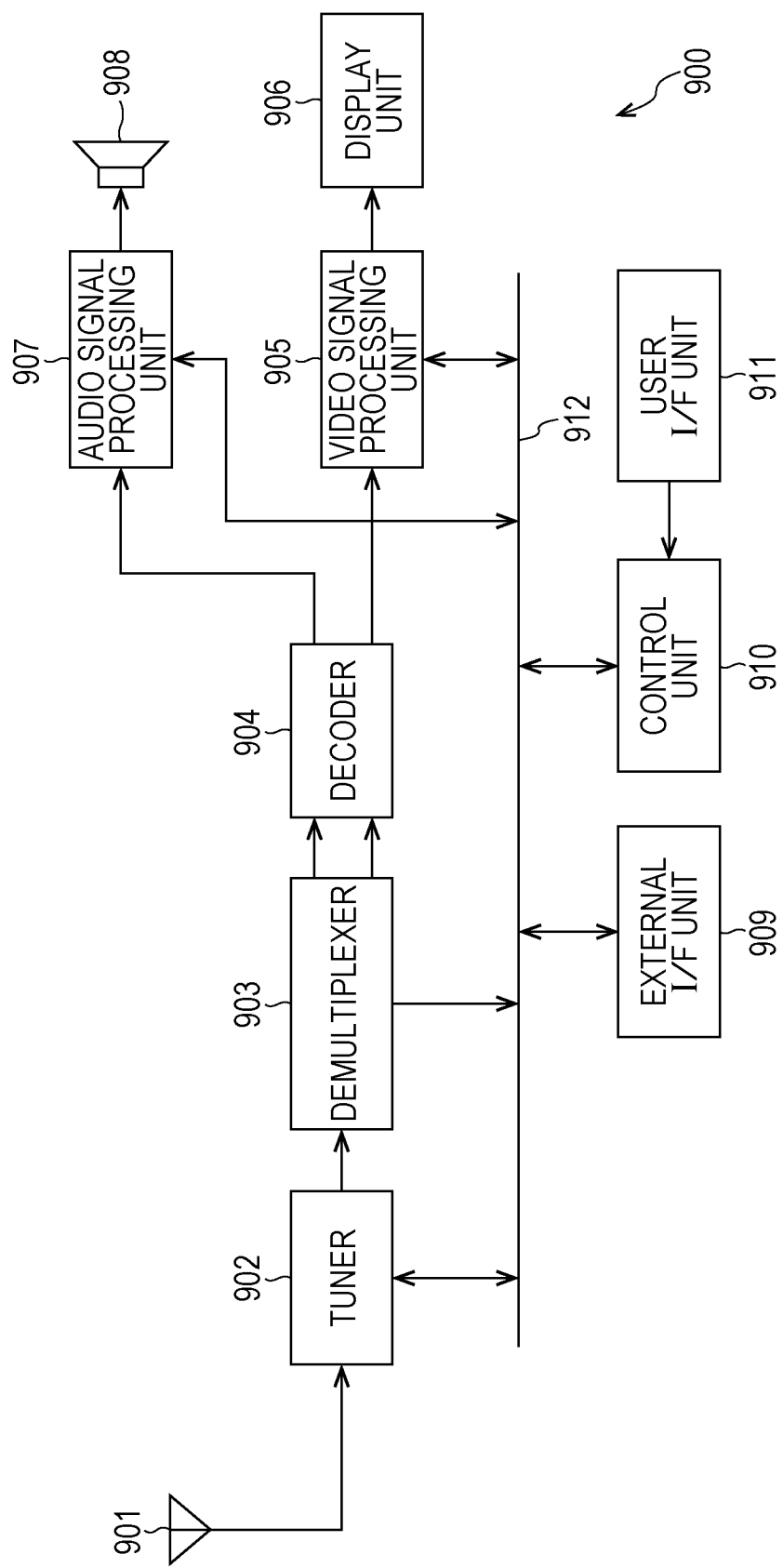
FIG. 35 is a diagram that illustrates an example of the schematic configuration of a television apparatus according to the present disclosure.

FIG. 35 illustrates an example of the schematic configuration of a television apparatus to which the present technology is applied. The television apparatus 900 has an antenna 901, a tuner 902, a demultiplexer 903, a decoder 904, a video signal processing unit 905, a display unit 906, an audio signal processing unit 907, a speaker 908, an external interface unit 909. In addition, the television apparatus 900 has a control unit 910, a user interface unit 911, and the like.

The tuner 902 selects a desired channel from broadcast wave signals received by the antenna 901, performs demodulation, and outputs an acquired coded bit stream to the demultiplexer 903.

The demultiplexer 903 extracts packets of a video and an audio of a program that is a viewing target from the coded bit stream and outputs data of the extracted packets to the decoder 904. In addition, the demultiplexer 903 supplies the packets of data of an Electronic Program Guide (EPG) or the like to the control unit 910. Furthermore, the demultiplexer may perform descrambling using a demultiplexer or the like in a case where the coded bit stream is scrambled.

The decoder 904 performs a process of decoding the packets and outputs video data generated by the decoding process to the video signal processing unit 905 and outputs audio data to the audio signal processing unit 907.

The video signal processing unit 905 performs noise elimination, video processing corresponding to a user setting, and the like for the video data. The video signal processing unit 905 generates video data of a program to be displayed on the display unit 906, image data acquired by a process based on an application supplied through a network, and the like. In addition, the video signal processing unit 905 generates video data, for example, used for displaying a menu screen for an item selection or the like and superimposes the generated video data onto the video data of a program. The video signal processing unit 905 generates a drive signal based on the video data generated in this way and drives the display unit 906.

The display unit 906 drives a display device (for example, a liquid crystal display or the like) based on the drive signal supplied from the video signal processing unit 905, thereby displaying the video of a program and the like.

The audio signal processing unit 907 performs a predetermined process such as noise removal for the audio data, performs a D/A conversion process of audio data after the process or an amplification process thereof, and supplies resultant data to the speaker 908, thereby performing audio output.

The external interface unit 909 is an interface used for a connection to an external device or a network and transmits/receives data such as video data or audio data.

The user interface unit 911 is connected to the control unit 910. The user interface unit 911 is configured by an operation switch, a remote control signal reception unit, and the like and supplies an operation signal according to a user operation to the control unit 910.

The control unit 910 is configured by a Central Processing Unit (CPU), a memory, and the like. The memory stores a program executed by the CPU, various kinds of data that is necessary for the process performed by the CPU, EPG data, data acquired through a network, and the like. The program that is stored in the memory is read and executed by the CPU at predetermined timing such as start-up of the television apparatus 900. By executing the program, the CPU performs control of each unit such that the television apparatus 900 operates in accordance with a user operation.

In addition, in the television apparatus 900, in order to connect the tuner 902, the demultiplexer 903, the video signal processing unit 905, the audio signal processing unit 907, the external interface unit 909, and the like to the control unit 910, a bus 912 is disposed.

In the television apparatus configured in this way, the function of the decoding apparatus (decoding method) according to the present application is implemented in the decoder 904. Accordingly, a coded stream in which restrictions of the compression rate of the lowest limit and the maximum value of the bit rate are adjusted can be decoded.

Fifth Embodiment (Configuration Example of Mobile Phone)

Figure 36:
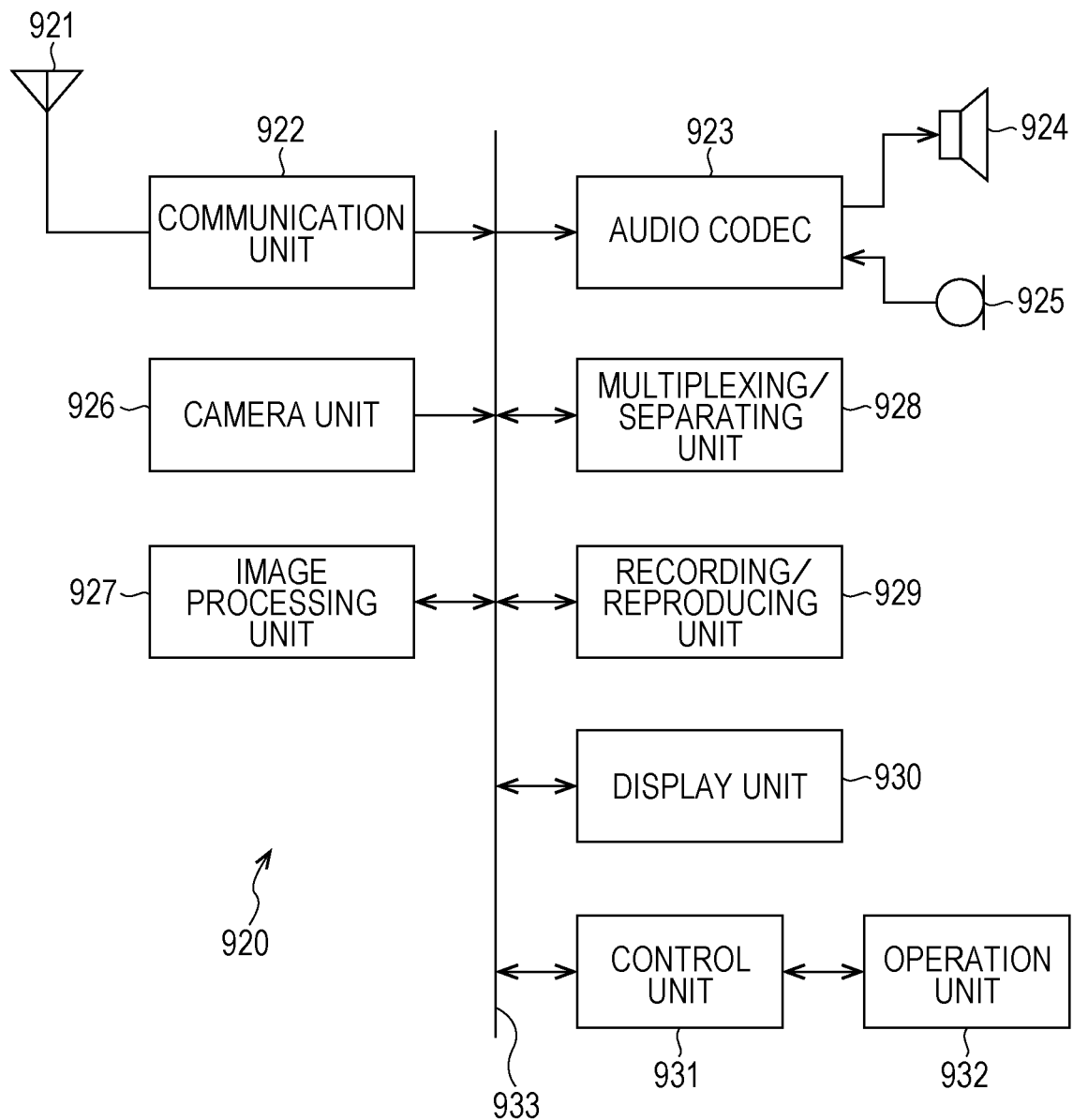
FIG. 36 is a diagram that illustrates an example of the schematic configuration of a mobile phone according to the present disclosure.

FIG. 36 illustrates the schematic configuration of a mobile phone to which the present technology is applied. The mobile phone 920 includes: a communication unit 922; an audio codec 923; a camera unit 926; an image processing unit 927; a multiplexing/separating unit 928; a recording/reproducing unit 929; a display unit 930; and a control unit 931. These are interconnected through the bus 933.

In addition, the antenna 921 is connected to the communication unit 922, and the speaker 924 and the microphone 925 are connected to the audio codec 923. Furthermore, the operation unit 932 is connected to the control unit 931.

The mobile phone 920 performs various operations such as transmission and reception of an audio signal, transmission and reception of an electronic mail and image data, image capturing, and data recording in various modes such as a voice call mode and a data communication mode.

In the voice call mode, an audio signal generated by the microphone 925 is converted into audio data or compressed by the audio codec 923, and a resultant signal is supplied to the communication unit 922. The communication unit 922 performs a modulation process, a frequency conversion process, and the like for the audio data, thereby generating a transmission signal. In addition, the communication unit 922 supplies a transmission signal to the antenna 921 so as to be transmitted to a base station not illustrated in the figure. Furthermore, the communication unit 922 performs an amplification process, a frequency conversion process, a demodulation process, and the like for a reception signal received by the antenna 921 and supplies acquired audio data to the audio codec 923. The audio codec 923 performs data decompression of the audio data and converts the audio data into an analog audio signal and outputs a resultant signal to the speaker 924.

In addition, in the data communication mode, in a case where a mail is transmitted, the control unit 931 receives character data input by an operation for the operation unit 932 and displays the input characters on the display unit 930. Furthermore, the control unit 931 generates mail data based on a user's instruction from the operation unit 932 and supplies the generated mail data to the communication unit 922. The communication unit 922 performs a modulation process, a frequency conversion process, and the like for the mail data and transmits an acquired transmission signal from the antenna 921. In addition, the communication unit 922 performs an amplification process, a frequency conversion process, a demodulation process, and the like for the reception signal received by the antenna 921, thereby restoring the mail data. This mail data is supplied to the display unit 930, whereby the content of the mail is displayed.

In addition, the mobile phone 920 can store the received mail data in a storage medium using the recording/reproducing unit 929. The storage medium may be an arbitrary rewritable storage medium. For example, the storage medium is a semiconductor memory such as a RAM or a built-in type flash memory, a hard disk, a magnetic disk, a magneto-optical disk, an optical disc, or a removable medium such as a Universal Serial Bus (USB) memory or a memory card.

In the data communication mode, in a case where image data is transmitted, the image data generated by the camera unit 926 is supplied to the image processing unit 927. The image processing unit 927 performs a coding process of the image data, thereby generating coded data.

The multiplexing/separating unit 928 multiplexes coded data generated by the image processing unit 927 and audio data supplied from the audio codec 923 in accordance with a predetermined system and supplies multiplexed data to the communication unit 922. The communication unit 922 performs a modulation process, a frequency conversion process, and the like of the multiplexed data and transmits an acquired transmission signal from the antenna 921. In addition, the communication unit 922 performs an amplification process, a frequency conversion process, a demodulation process, and the like for the reception signal received by the antenna 921, thereby restoring the multiplexed data. This multiplexed data is supplied to the multiplexing/separating unit 928. The multiplexing/separating unit 928 separates the multiplexed data and supplies coded data to the image processing unit 927 and supplies audio data to the audio codec 923. The image processing unit 927 performs a decoding process of the coded data, thereby generating image data. This image data is supplied to the display unit 930, whereby the received image is displayed. The audio codec 923 converts audio data into an analog audio signal and supplies the converted analog audio signal to the speaker 924, thereby outputting the received audio.

In the mobile phone device configured in this way, the functions of the coding apparatus and the decoding apparatus (a coding method and a decoding method) according to the present application are implemented in the image processing unit 927. For this reason, restrictions of the compression rate of the lowest limit and the maximum value of the bit rate can be adjusted. In addition, a coded stream of which the compression rate of the lowest limit and the maximum value of the bit rate are adjusted can be decoded.

Sixth Embodiment (Configuration Example of Recording/Reproducing Apparatus)

Figure 37:
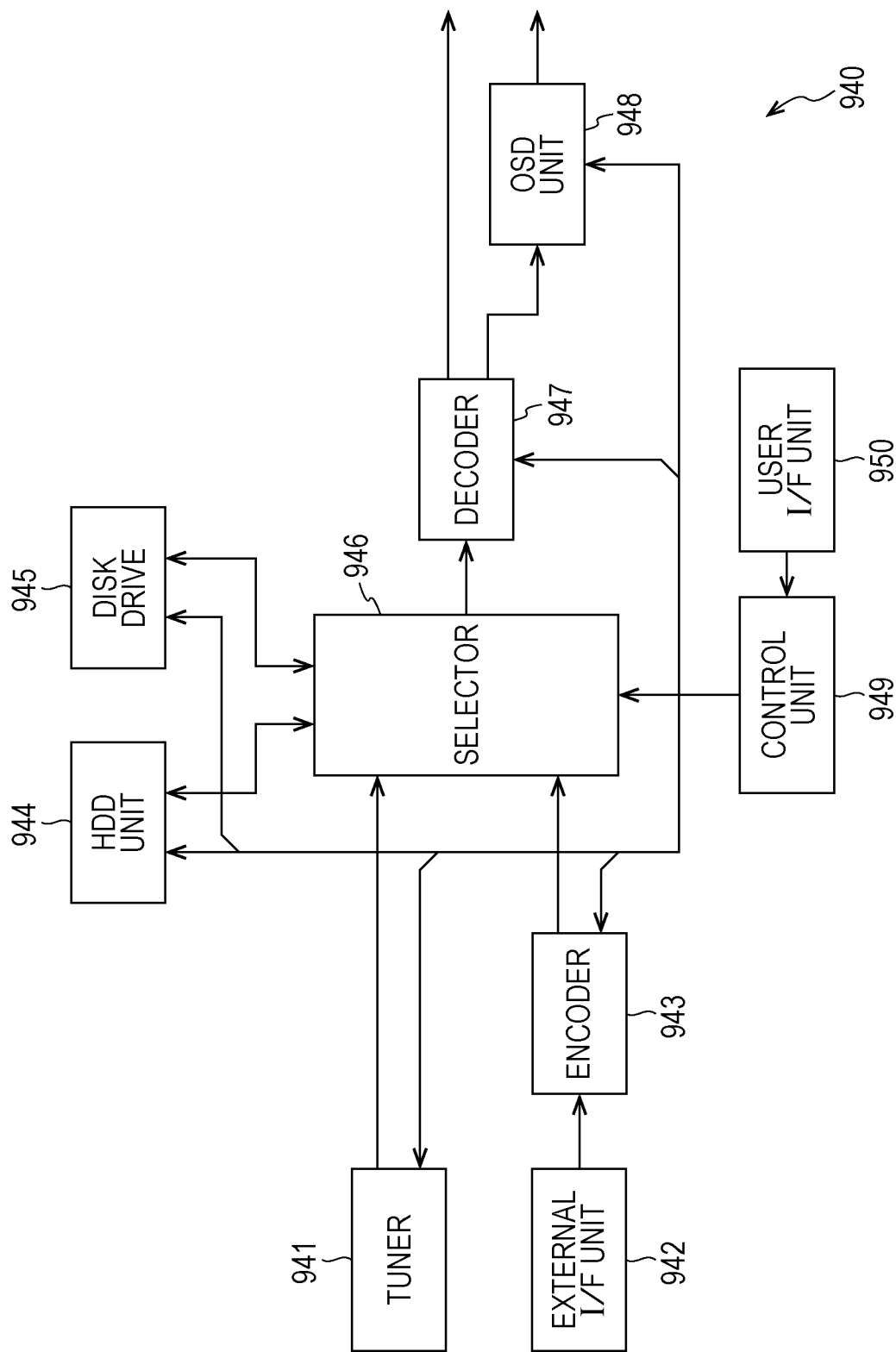
FIG. 37 is a diagram that illustrates an example of the schematic configuration of a recording/reproducing apparatus according to the present disclosure.

FIG. 37 illustrates the schematic configuration of a recording/reproducing apparatus to which the present technology is applied. The recording/reproducing apparatus 940, for example, records audio data and video data of a received broadcast program on a recording medium and provides the recorded data for a user at timing according to a user's instruction. In addition, the recording/reproducing apparatus 940, for example, may acquire audio data and video data from another device and record the audio data and the video data on a recording medium. Furthermore, the recording/reproducing apparatus 940 decodes and outputs the audio data and the video data, which are recorded on the recording medium, whereby the display of an image or the output of an audio can be performed in a monitor device or the like.

The recording/reproducing apparatus 940 has a tuner 941, an external interface unit 942, an encoder 943, a Hard Disk Drive (HDD) unit 944, a disk drive 945, a selector 946, a decoder 947, an On-Screen Display (OSD) unit 948, a control unit 949, and a user interface unit 950.

The tuner 941 selects a desired channel from among broadcast signals received by an antenna not illustrated in the figure. The tuner 941 outputs a coded bit stream acquired by demodulating a reception signal of the desired channel to the selector 946.

The external interface unit 942 is configured by at least one of an IEEE1394 interface, a network interface unit, a USB interface, a flash memory interface, and the like. The external interface unit 942 is an interface for a connection to an external device, a network, a memory card, or the like and performs data reception of video data, audio data, and the like to be recorded.

When the video data and the audio data supplied from the external interface unit 942 are not coded, the encoder 943 codes the video data and the audio data in accordance with a predetermined system and outputs a coded bit stream to the selector 946.

The HDD unit 944 records content data such as videos and audios, various programs, other data, and the like on a built-in hard disk and reads the recorded data from the hard disk at the time of reproduction or the like.

The disk drive 945 performs signal recording and signal reproducing for a loaded optical disc. The optical disc, for example, is a DVD disc (a DVD-Video, a DVD-RAM, a DVD-R, a DVD-RW, a DVD+R, a DVD+RW, or the like), a Blu-ray (registered trademark) disc, or the like.

When a video or an audio is recorded, the selector 946 selects a coded bit stream supplied from the tuner 941 or the encoder 943 and supplies the selected code bit stream to one of the HDD unit 944 and the disk drive 945. In addition, when a video or an audio is reproduced, the selector 946 supplies a coded bit stream output from the HDD unit 944 or the disk drive 945 to the decoder 947.

The decoder 947 performs a decoding process of the coded bit stream. The decoder 947 supplies video data that is generated by performing the decoding process to the OSD unit 948. In addition, the decoder 947 outputs audio data that is generated by performing the decoding process.

The OSD unit 948 generates video data used for displaying a menu screen such as an item selection menu or the like and outputs the generated video data so as to overlap the video data output from the decoder 947.

The user interface unit 950 is connected to the control unit 949. The user interface unit 950 is configured by an operation switch, a remote control signal reception unit, and the like and supplies an operation signal according to a user operation to the control unit 949.

The control unit 949 is configured by using a CPU, a memory, and the like. The memory stores programs that are executed by the CPU and various kinds of data that is necessary for the process performed by the CPU. A program stored in the memory is read and executed by the CPU at predetermined timing such as the start-up of the recording/reproducing apparatus 940. The CPU executes programs, thereby performing control of each unit such that the recording/reproducing apparatus 940 operates in accordance with a user operation.

In the recording/reproducing apparatus configured in this way, the function of the decoding apparatus (decoding method) according to the present application is implemented in the decoder 947. For this reason, a coded stream in which restrictions of the compression rate of the lowest limit and the maximum value of the bit rate are adjusted can be decoded.

Seventh Embodiment

<Configuration Example of Imaging Apparatus>

Figure 38:
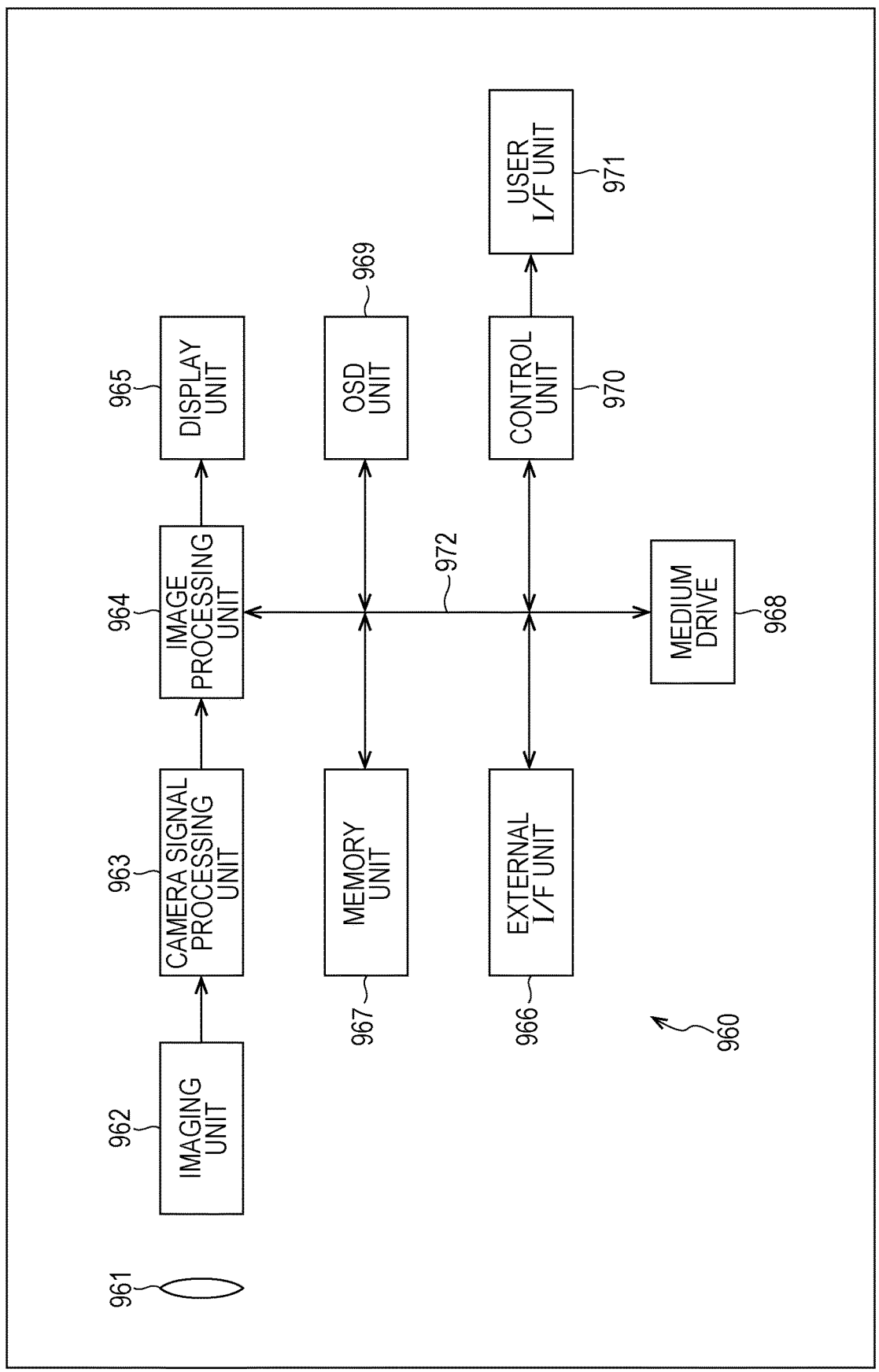
FIG. 38 is a diagram that illustrates an example of the schematic configuration of an imaging apparatus according to the present disclosure.

FIG. 38 is a diagram that illustrates an example of the schematic configuration of an imaging apparatus to which the present technology is applied. The imaging apparatus 960 images a subject and displays the image of the subject on a display unit or records the image of the subject on a recording medium as image data.

The imaging apparatus 960 includes: an optical block 961; an imaging unit 962; a camera signal processing unit 963; an image data processing unit 964; a display unit 965; an external interface unit 966; a memory unit 967; a media drive 968; an OSD unit 969; and a control unit 970. In addition, a user interface unit 971 is connected to the control unit 970. Furthermore, the image data processing unit 964, the external interface unit 966, the memory unit 967, the media drive 968, the OSD unit 969, the control unit 970, and the like are interconnected through a bus 972.

The optical block 961 is configured by using a focusing lens, a diaphragm mechanism, and the like. The optical block 961 forms the optical image of a subject on the imaging surface of the imaging unit 962. The imaging unit 962 is configured by using a CCD or CMOS image sensor and generates an electrical signal according to the optical image through a photoelectric conversion and supplies the generated electrical signal to the camera signal processing unit 963.

The camera signal processing unit 963 performs various kinds of camera signal processing such as a knee correction, a gamma correction, and a color correction for the electrical signal supplied from the imaging unit 962. The camera signal processing unit 963 supplies image data after the camera signal processing to the image data processing unit 964.

The image data processing unit 964 performs a coding process of the image data supplied from the camera signal processing unit 963. The image data processing unit 964 supplies coded data that is generated by performing the coding process to the external interface unit 966 or the media drive 968. In addition, the image data processing unit 964 performs a decoding process of the coded data supplied from the external interface unit 966 or the media drive 968. The image data processing unit 964 supplies the image data generated by performing the decoding process to the display unit 965. In addition, the image data processing unit 964 performs the process of supplying the image data supplied from the camera signal processing unit 963 to the display unit 965 and supplies display data acquired from the OSD unit 969 to the display unit 965 with being overlapped with the image data.

The OSD unit 969 generates display data such as a menu screen or an icon that is configured by symbols, characters, or graphics and outputs the generated display data to the image data processing unit 964.

The external interface unit 966, for example, is configured by a USB input/output terminal and the like and is connected to the printer in a case where an image is printed. In addition, to the external interface unit 966, a drive is connected as is necessary, a removable medium such as a magnetic disk or an optical disc is appropriately installed, and a computer program read therefrom is installed as is necessary. Furthermore, the external interface unit 966 includes a network interface that is connected to a predetermined network such as a LAN or the Internet. For example, in accordance with an instruction from the user interface unit 971, the control unit 970 can read coded data from the media drive 968 and supply the read coded data from the external interface unit 966 to another device connected through a network. In addition, the control unit 970 can acquire coded data or image data, which is supplied from another device through a network, through the external interface unit 966 and supply the acquired data to the image data processing unit 964.

As the recording media driven by the media drive 968, for example, an arbitrary readable/writable removable medium such as a magnetic disk, a magneto-optical disk, an optical disc, or a semiconductor memory is used. In addition, the type of the recording medium as a removable medium is an arbitrary and thus, may be a tape device, a disk, or a memory card. Furthermore, a non-contact Integrated Circuit (IC) card or the like may be used as the recording medium.

In addition, by integrating the media drive 968 and the recording medium together, for example, the recording medium may be configured by a non-portable recording medium such as a built-in type hard disk drive or an Solid State Drive (SSD).

The control unit 970 is configured by using a CPU. The memory unit 967 stores programs that are executed by the control unit 970, various kinds of data that is necessary for the process performed by the control unit 970, and the like. A program stored in the memory unit 967 is read and executed by the control unit 970 at predetermined timing such as the start-up of the imaging apparatus 960. The control unit 970 executes programs, thereby performing control of each unit such that the imaging apparatus 960 operates in accordance with a user operation.

In the imaging apparatus configured in this way, the functions of the coding apparatus and the decoding apparatus (a coding method and a decoding method) according to the present application is implemented in the image data processing unit 964. For this reason, restrictions of the compression rate of the lowest limit and the maximum value of the bit rate can be adjusted. In addition, a coded stream of which the compression rate of the lowest limit and the maximum value of the bit rate are adjusted can be decoded.

Eighth Embodiment (Other Examples)

While the examples of the apparatus, the system, and the like to which the present technology is applied have been described as above, the present technology is not limited thereto. Thus, the present technology may be also implemented as all the components mounted in the apparatus or an apparatus configuring the system such as a processor as a system Large Scale Integration (LSI) or the like, a module using a plurality of processors and the like, a unit using a plurality of modules and the like, and a set acquired by adding another function to the unit (in other words, a part of the configuration of the apparatus).

(Configuration Example of Video Set)

Figure 39:
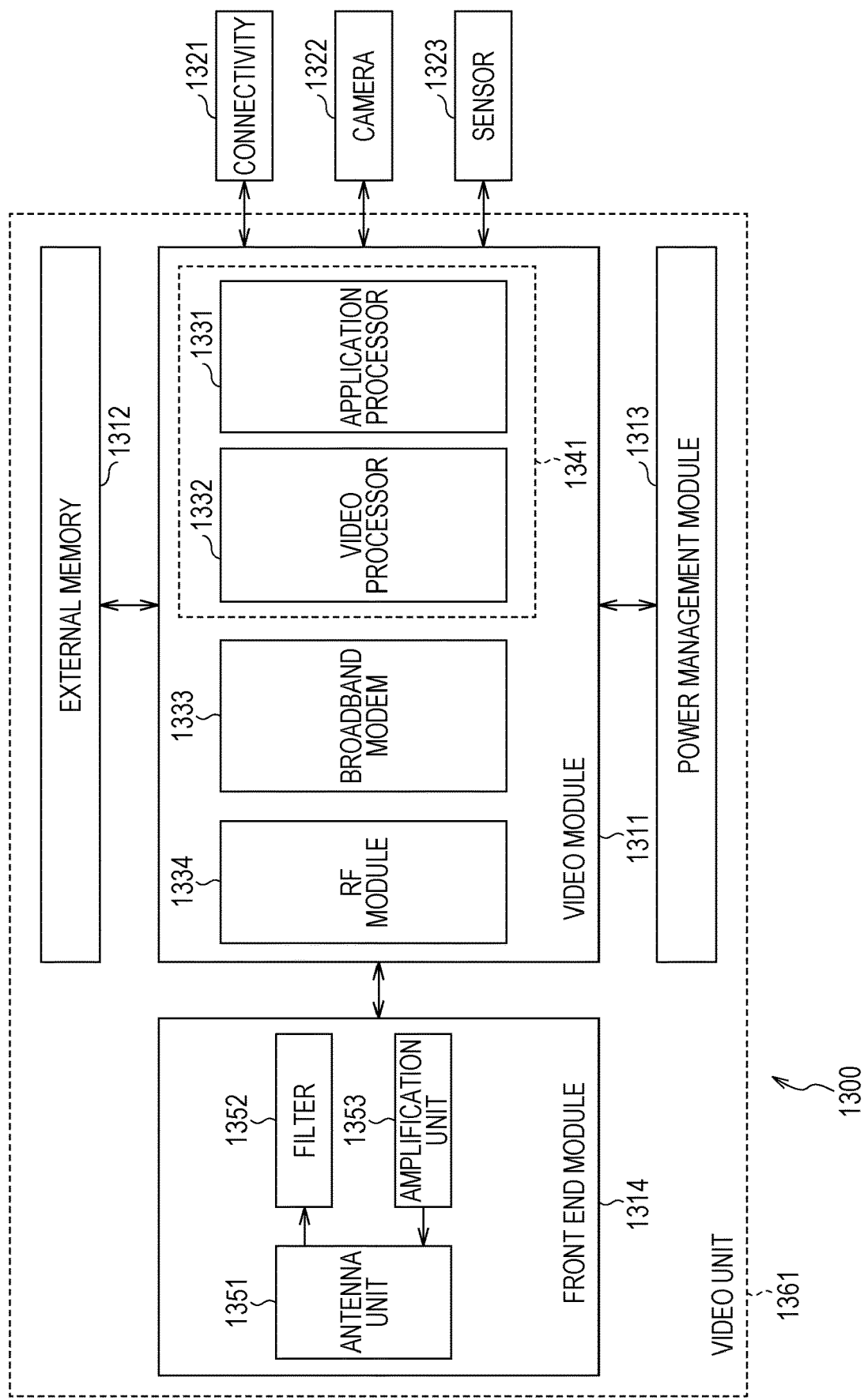
FIG. 39 illustrates an example of the schematic configuration of a video set according to the present disclosure.

An example of a case where the present technology is implemented as a set will be described with reference to FIG. 39. FIG. 39 illustrates an example of the schematic configuration of a video set to which the present technology is applied.

Recently, implementation of multiple functions in electronic apparatuses has been progressed, and, in the development or the manufacture of each electronic apparatus, in a case where a part of the configuration is executed in sales, provision, or the like, frequently, there is not only a case where the part is executed as a configuration having one function but also a case where the part is executed as one set having multiple functions by combining a plurality of configurations having related functions.

The video set 1300 illustrated in FIG. 39 has such a configuration that has multiple functions and is acquired by combining a device having a function relating to coding/decoding (one of coding and decoding or both thereof) of an image with devices having other functions relating to the function.

As illustrated in FIG. 39, the video set 1300 includes: a module group such as a video module 1311, an external memory 1312, a power management module 1313, and a front end module 1314 and devices having related functions such as connectivity 1321, a camera 1322, and a sensor 1323.

A module is a component that has functions having coherence acquired by gathering several component functions relating to each other. A specific physical configuration is arbitrary, and, for example, a configuration may be considered in which a plurality of processors having respective functions, electronic circuit components such as a resistor and a capacitor, and other devices are arranged to be integrated in a wiring board or the like. In addition, it may be considered to form a new module by combining a module with other modules, a processor, or the like.

In the case of the example illustrated in FIG. 39, the video module 1311 is constructed by combining configurations having functions relating to image processing and includes: an application processor, a video processor, a broadband modem 1333, and an RF module 1334.

A processor is formed by integrating a configuration having a predetermined function on a semiconductor chip through a System On a Chip (SoC) and, for example, there is a processor called a Large Scale Integration (LSI) or the like. The configuration having a predetermined function may be a logical circuit (hardware configuration), a configuration including a CPU, a ROM, a RAM, and the like and a program (software configuration) executed using the components, or a configuration acquired by combining both. For example, it may be configured such that a processor includes logic circuits, a CPU, a ROM, a RAM, and the like, some functions thereof are realized by logic circuits (hardware configuration), and the other functions are realized by a program (software configuration) executed by the CPU.

An application processor 1331 illustrated in FIG. 39 is a processor that executes an application relating to image processing. In order to realize a predetermined function, the application executed by this application processor 1331 not only executes a calculation process but also may control configurations of the inside/outside of the video module 1311 such as a video processor 1332 and the like as is necessary.

A video processor 1332 is a processor that has a function relating to coding/decoding (one of coding and decoding or both coding and decoding) of an image.

The broadband modem 1333 is a processor (or a module) relating to wired or wireless (or wired and wireless) broadband communication performed through a broadband line such as the Internet or a public telephone network. For example, the broadband modem 1333 converts data (digital signal) to be transmitted into an analog signal through digital modulation or the like or demodulates a received analog signal so as to be converted into data (digital signal). For example, the broadband modem 1333 can perform digital modulation/demodulation of arbitrary information such as image data processed by the video processor 1332, a stream in which the image data is coded, an application program, setting data, and the like.

The RF module 1334 is a module that performs frequency conversion, modulation/demodulation, amplification, a filter process, and the like for a Radio Frequency (RF) signal that is transmitted or received through an antenna. For example, the RF module 1334 performs the frequency conversion and the like for a dedicated line connection system signal generated by the broadband modem 1333, thereby generating an RF signal. In addition, for example, the RF module 1334 performs the frequency conversion and the like for an RF signal received through the front end module 1314, thereby generating a dedicated line connection system signal.

As denoted by a dotted line 1341 in FIG. 39, the application processor 1331 and the video processor 1332 may be integrated so as to be configured as one processor.

The external memory 1312 is a module that is arranged outside the video module 1311 and has a memory device used by the video module 1311. While the memory device of the external memory 1312 may be realized by a certain physical configuration, generally, the memory device is frequently used for storing data of a large volume such as image data configured in units of frames. Accordingly, it is preferable that memory device is realized by a semiconductor memory of a large capacity such as a Dynamic Random Access Memory (DRAM) at a relatively low cost.

The power management module 1313 manages and controls supply of power to the video module 1311 (each configuration arranged inside the video module 1311).

The front end module 1314 is a module that provides a front end function (a circuit at the transmission/reception end on the antenna side) for the RF module 1334. As illustrated in FIG. 39, the front end module 1314, for example, includes an antenna unit 1351, a filter 1352, and an amplification unit 1353.

The antenna unit 1351 includes an antenna that transmits and receives wireless signals and peripheral configurations. The antenna unit 1351 transmits a signal supplied from the amplification unit 1353 as a wireless signal and supplies the received wireless signal to the filter 1352 as an electrical signal (RF signal). The filter 1352 performs a filter process and the like for the RF signal received through the antenna unit 1351 and supplies the RF signal after the process to the RF module 1334. The amplification unit 1353 amplifies the RF signal supplied from the RF module 1334 and supplies the amplified RF signal to the antenna unit 1351.

The connectivity 1321 is a module that has a function relating to a connection with the outside. The physical configuration of the connectivity 1321 is arbitrary. For example, the connectivity 1321 includes a configuration having a communication function according to a communication standard other than a communication standard with which the broadband modem 1333 compliant, an external input/output terminal, and the like.

For example, the connectivity 1321 may be configured to include a module that has a communication function compliant with a radio communication standard such as Bluetooth (registered trademark), IEEE 802.11 (for example, Wireless Fidelity; registered trademark (Wi-Fi)), Near Field Communication (NFC), or InfraRed Data Association (IrDA), an antenna that transmits and receives signals compliant with the standard, and the like. In addition, for example, the connectivity 1321 may be configured to include a module that has a communication function compliant with a wired communication standard such as Universal Serial Bus (USB) or High-Definition Multimedia Interface (HDMI (registered trademark)) and terminals compliant with the standard. Furthermore, for example, the connectivity 1321 may be configured to have another data (signal) transmission function of an analog input/output terminal or the like.

In addition, the connectivity 1321 may be configured to include a device of the transmission destination of data (signal). For example, the connectivity 1321 may be configured to include a drive (including not only a drive of a removable medium but also a hard disk, a Solid State Drive (SSD), a Network Attached Storage (NAS), and the like) that reads/writes data from/into a recording medium such as a magnetic disk, an optical disc, a magneto-optical disk, or a semiconductor memory. In addition, the connectivity 1321 may be configured to include an output device (a monitor, a speaker, or the like) of an image or a voice.

The camera 1322 is a module that has a function for acquiring image data of an object by imaging the object. The image data acquired by the imaging process performed by the camera 1322, for example, is supplied to the video processor 1332 and is coded.

The sensor 1323 is a module that has the function of an arbitrary sensor such a sound sensor, an ultrasonic sensor, an optical sensor, an illuminance sensor, an infrared sensor, an image sensor, a rotation sensor, an angle sensor, an angular velocity sensor, a velocity sensor, an acceleration sensor, a tilt sensor, a magnetic identification sensor, an impact sensor, or a temperature sensor. Data detected by the sensor 1323, for example, is supplied to the application processor 1331 and is used by the application and the like.

The configuration described above as the module may be realized as the processor. To the contrary, the configuration described above as the processor may be realized as the module.

In the video set 1300 having the above-described configuration, as will be described later, the present technology may be applied to the video processor 1332. Accordingly, the video set 1300 may be executed as a set to which the present technology is applied.

(Configuration Example of Video Processor)

Figure 40:
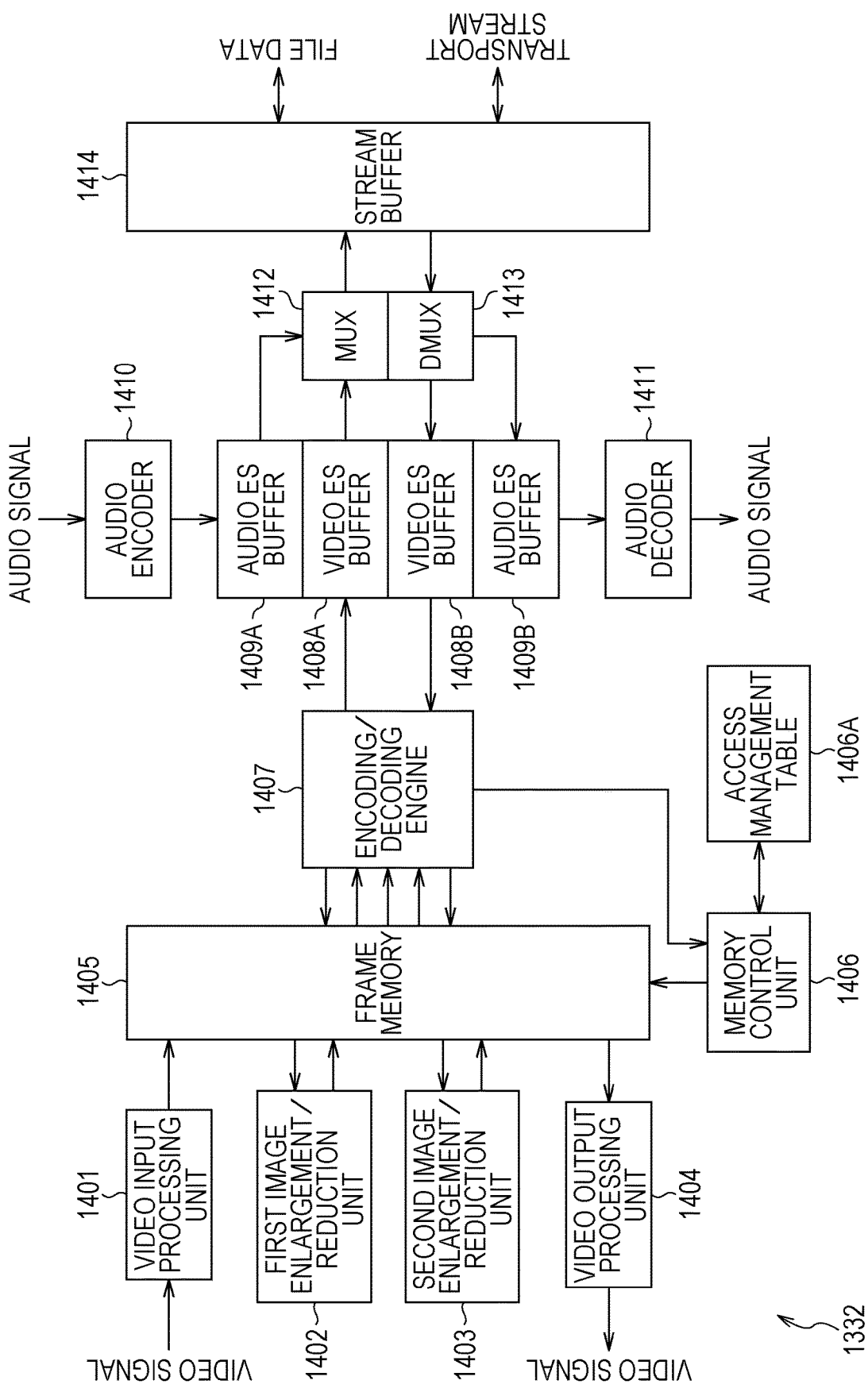
FIG. 40 illustrates an example of the schematic configuration of a video processor according to the present disclosure.

FIG. 40 illustrates an example of the schematic configuration of the video processor 1332 (FIG. 39) to which the present technology is applied.

In the case of the example illustrated in FIG. 40, the video processor 1332 has a function for receiving inputs of a video signal and an audio signal and coding the video signal and the audio signal according to a predetermined system and a function for decoding coded video data and coded audio data and reproducing and outputting a video signal and audio signal.

As illustrated in FIG. 40, the video processor 1332 includes: a video input processing unit 1401; a first image enlargement/reduction unit 1402; a second image enlargement/reduction unit 1403; a video output processing unit 1404; a frame memory 1405; and a memory control unit 1406. In addition, the video processor 1332 includes: an encoding/decoding engine 1407; video Elementary Stream (ES) buffers 1408A and 1408B; and audio ES buffers 1409A and 1409B. Furthermore, the video processor 1332 includes: an audio encoder 1410; an audio decoder 1411; a multiplexing unit (Multiplexer (MUX)) 1412; a demultiplexing unit (Demultiplexer (DMUX)) 1413; and a stream buffer 1414.

The video input processing unit 1401, for example, acquires a video signal input from the connectivity 1321 (FIG. 39) or the like and converts the video signal into digital image data. The first image enlargement/reduction unit 1402 performs a format conversion, an image enlargement/reduction process, and the like for the image data. The second image enlargement/reduction unit 1403 performs an image enlargement/reduction process according to a format of the output destination through the video output processing unit 1404, similar format conversion as that of the first image enlargement/reduction unit 1402, an image enlargement/reduction process, and the like for the image data. The video output processing unit 1404 performs a format conversion, a conversion into an analog signal, and the like for the image data and outputs a resultant signal, for example, to the connectivity 1321 (FIG. 39) or the like as a reproduced video signal.

The frame memory 1405 is a memory for image data that is shared by the video input processing unit 1401, the first image enlargement/reduction unit 1402, the second image enlargement/reduction unit 1403, the video output processing unit 1404, and the encoding/decoding engine 1407. The frame memory 1405, for example, is realized by a semiconductor memory such as a DRAM.

The memory control unit 1406 receives a synchronization signal from the encoding/decoding engine 1407 and controls accesses to the frame memory 1405 for writing/reading according to an access schedule for accessing the frame memory 1405 that is written in an access management table 1406A. The access management table 1406A is updated by the memory control unit 1406 in accordance with the processes executed by the encoding/decoding engine 1407, the first image enlargement/reduction unit 1402, the second image enlargement/reduction unit 1403, and the like.

The encoding/decoding engine 1407 performs an encoding process of image data and a decoding process of a video stream that is data acquired by coding the image data. For example, the encoding/decoding engine 1407 codes the image data read from the frame memory 1405 and sequentially writes the image data into the video ES buffer 1408A as a video stream. In addition, for example, the encoding/decoding engine 1407 sequentially reads and decodes video streams supplied from the video ES buffer 1408B and sequentially writes the decoded video streams into the frame memory 1405 as image data. The encoding/decoding engine 1407 uses the frame memory 1405 as a work area in such coding and decoding processes. In addition, the encoding/decoding engine 1407 outputs a synchronization signal to the memory control unit 1406, for example, at timing when a process for each macro block is started.

The video ES buffer 1408A buffers a video stream generated by the encoding/decoding engine 1407 and supplies the buffered video stream to the multiplexing unit (MUX) 1412. The video ES buffer 1408B buffers a video stream supplied from the demultiplexing unit (DMUX) 1413 and supplies the buffered video stream to the encoding/decoding engine 1407.

The audio ES buffer 1409A buffers an audio stream generated by the audio encoder 1410 and supplies the buffered audio stream to the multiplexing unit (MUX) 1412. The audio ES buffer 1409B buffers an audio stream supplied from the demultiplexer (DMUX) 1413 and supplies the buffered audio stream to the audio decoder 1411.

The audio encoder 1410, for example, converts an audio signal, for example, input from the connectivity 1321 (FIG. 39) or the like into a digital signal and codes the converted digital signal according to a predetermined system such as an MPEG audio system or an Audio Code number 3 (AC3) system. The audio encoder 1410 sequentially writes audio streams each being data acquired by coding an audio signal into the audio ES buffer 1409A. The audio decoder 1411 decodes the audio stream supplied from the audio ES buffer 1409B and, for example, performs a conversion into an analog signal, and the like for the decoded audio stream and supplies a resultant signal, for example, to the connectivity 1321 (FIG. 39) or the like as a reproduced audio signal.

The multiplexing unit (MUX) 1412 multiplexes a video stream and an audio stream. A method of this multiplexing process (in other words, the format of a bit stream generated by the multiplexing process) is arbitrary. In addition, in the multiplexing process, the multiplexing unit (MUX) 1412 may add predetermined header information and the like to the bit stream. In other words, the multiplexing unit (MUX) 1412 can convert the format of a stream through the multiplexing process. For example, by multiplexing a video stream and an audio stream, the multiplexing unit (MUX) 1412 converts the streams into a transport stream that is a bit stream of a transmission format. In addition, for example, by multiplexing the video stream and the audio stream, the multiplexing unit (MUX) 1412 converts the streams into data (file data) of a recording file format.

The demultiplexing unit (DMUX) 1413 demultiplexes a bit stream in which a video stream and an audio stream are multiplexed using a method corresponding to the multiplexing process performed by the multiplexing unit (MUX) 1412. In other words, the demultiplexing unit (DMUX) 1413 extracts a video stream and an audio stream from the bit stream read from the stream buffer 1414 (separates the video stream and the audio stream from each other). In other words, the demultiplexing unit (DMUX) 1413 can convert the format of a stream through the demultiplexing process (an inverse conversion of the conversion performed by the multiplexing unit (MUX) 1412). For example, the demultiplexing unit (DMUX) 1413 acquires a transport stream supplied, for example, from the connectivity 1321, the broadband modem 1333, or the like (all FIG. 39) through the stream buffer 1414 and demultiplexes the supplied transport stream, thereby converting the transport stream into a video stream and an audio stream. In addition, for example, the demultiplexing unit (DMUX) 1413 acquires file data, for example, read from various recording media by the connectivity 1321 (FIG. 39) through the stream buffer 1414 and demultiplexes the acquired file data, thereby converting the file data into a video stream and an audio stream.

The stream buffer 1414 buffers the bit stream. For example, the stream buffer 1414 buffers the transport stream supplied from the multiplexing unit (MUX) 1412 and supplies the buffered transport stream, for example, to the connectivity 1321, the broadband modem 1333 (all FIG. 39), or the like at predetermined timing or based on a request from the external, or the like.

In addition, for example, the stream buffer 1414 buffers the file data supplied from the multiplexing unit (MUX) 1412 and supplies the buffered file data, for example, to the connectivity 1321 (FIG. 39) or the like at predetermined timing, a request from the external, or the like so as to be recorded on various recording media.

Furthermore, the stream buffer 1414 buffers a transport stream, for example, acquired through the connectivity 1321, the broadband modem 1333, or the like (all FIG. 39) and supplies the buffered transport stream to the demultiplexing unit (DMUX) 1413 at predetermined timing or based on a request from the external or the like.

In addition, the stream buffer 1414 buffers file data read from various recording media by the connectivity 1321 (FIG. 39) or the like and supplies the buffered file data to the demultiplexing unit (DMUX) 1413 at predetermined timing or a request from the external or the like.

Next, an example of the operation of the video processor 1332 having such a configuration will be described. For example, a video signal input from the connectivity 1321 (FIG. 39) or the like to the video processor 1332 is converted into digital image data of a predetermined system such as a 4:2:2 Y/Cb/Cr system in the video input processing unit 1401 and is sequentially written into the frame memory 1405. This digital image data is read by the first image enlargement/reduction unit 1402 or the second image enlargement/reduction unit 1403, a format conversion into a predetermined system such as a 4:2:0 Y/Cb/Cr system and an enlargement/reduction process are performed for the read digital image data, and resultant digital image data is rewritten into the frame memory 1405. This image data is coded by the encoding/decoding engine 1407 and is written into the video ES buffer 1408A as a video stream.

In addition, an audio signal input from the connectivity 1321 (FIG. 39) or the like to the video processor 1332 is coded by the audio encoder 1410 and is written into the audio ES buffer 1409A as an audio stream.

A video stream in the video ES buffer 1408A and an audio stream in the audio ES buffer 1409A are read and multiplexed by the multiplexing unit (MUX) 1412 and is converted into a transport stream, file data, or the like. The transport stream generated by the multiplexing unit (MUX) 1412 is buffered in the stream buffer 1414 and then, is output to an external network, for example, through the connectivity 1321, the broadband modem 1333 (all FIG. 39), or the like. In addition, the file data generated by the multiplexing unit (MUX) 1412 is buffered in the stream buffer 1414 and then, is output, for example, to the connectivity 1321 (FIG. 39) or the like and is recorded on various recording media.

In addition, the transport stream input to the video processor 1332 from an external network, for example, through the connectivity 1321, the broadband modem 1333 (all FIG. 39), or the like is buffered in the stream buffer 1414 and then, is demultiplexed by the demultiplexing unit (DMUX) 1413. In addition, the file data that is read from various recording media and is input to the video processor 1332, for example, by the connectivity 1321 (FIG. 39) or the like is buffered in the stream buffer 1414 and then, is demultiplexed by the demultiplexing unit (DMUX) 1413. In other words, the transport stream or the file data input to the video processor 1332 is separated into a video stream and an audio stream by the demultiplexing unit (DMUX) 1413.

The audio stream is supplied to the audio decoder 1411 through the audio ES buffer 1409B and is decoded, and an audio signal is reproduced. In addition, the video stream is written into the video ES buffer 1408B and then is sequentially read and decoded by the encoding/decoding engine 1407 and is written into the frame memory 1405. The decoded image data is processed to be enlarged or reduced by the second image enlargement/reduction unit 1403 and is written into the frame memory 1405. Then, the decoded image data is read by the video output processing unit 1404, is converted into another format according to a predetermined system such as the 4:2:2 Y/Cb/Cr system or the like, and is further converted into an analog signal, and a video signal is reproduced and output.

In a case where the present technology is applied to the video processor 1332 configured as such, the present technology relating to each embodiment described above may be applied to the encoding/decoding engine 1407. In other words, for example, the encoding/decoding engine 1407 may be configured to have the functions of the coding apparatus and the decoding apparatus according to the first and second embodiments. By configuring as such, the video processor 1332 can have the same advantages as those described above with reference to FIGS. 1 to 20.

In addition, in the encoding/decoding engine 1407, the present technology (in other words, the functions of the image coding apparatus and the image decoding apparatus according to each embodiment described above) may be realized by hardware such as logic circuits or software such as an embedded program or may be realized by both the hardware and the software.

(Another Configuration Example of Video Processor)

Figure 41:
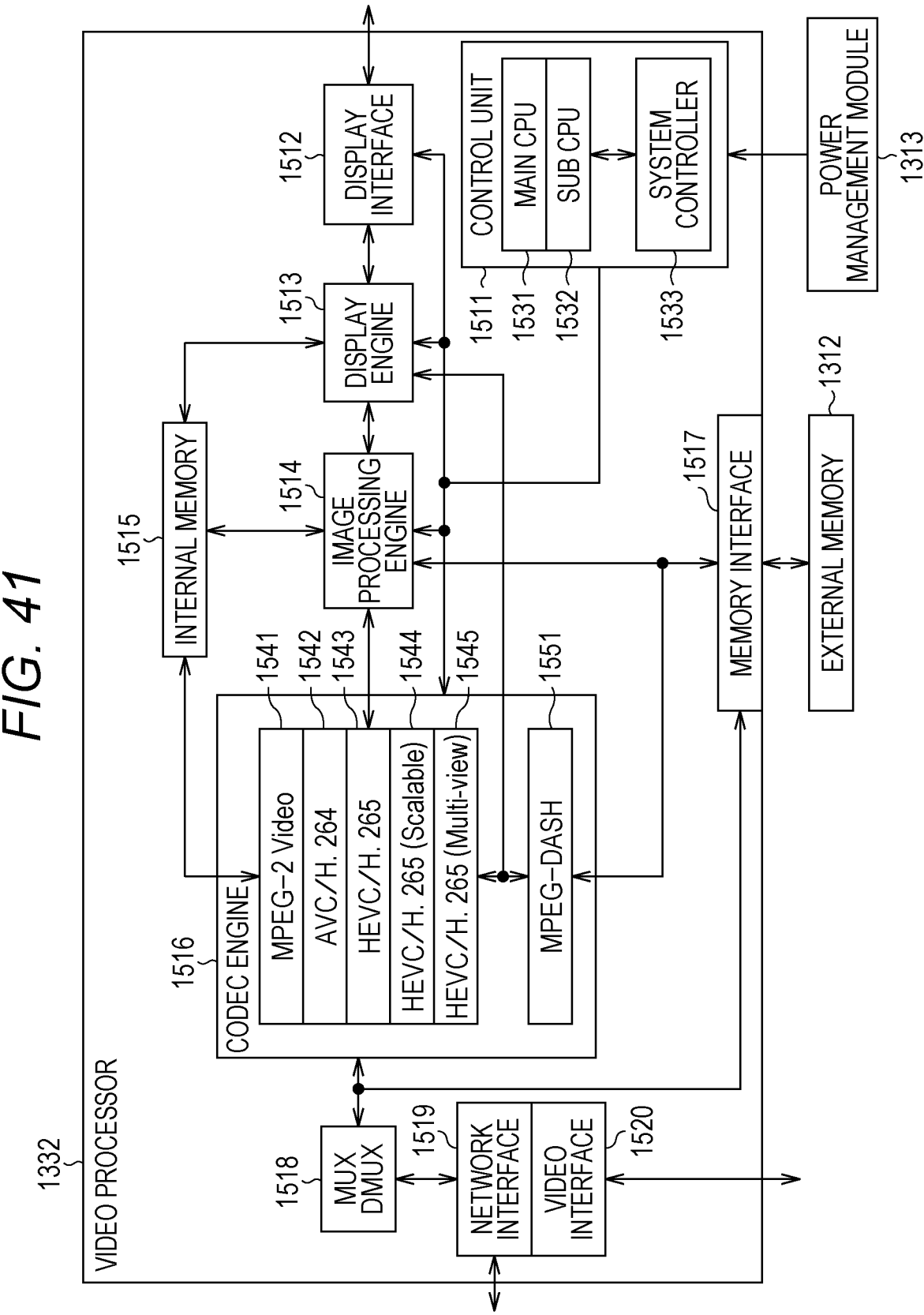
FIG. 41 illustrates another example of the schematic configuration of a video processor according to the present disclosure.

FIG. 41 illustrates another example of the schematic configuration of a video processor 1332 (FIG. 39) to which the present technology is applied. In the case of the example illustrated in FIG. 41, the video processor 1332 has a function for coding and decoding video data according to a predetermined system.

More, specifically, as illustrated in FIG. 41, the video processor 1332 includes: a control unit 1511; a display interface 1512; a display engine 1513; an image processing engine 1514; and an internal memory 1515. In addition, the video processor 1332 includes: a codec engine 1516; a memory interface 1517; a multiplexing/demultiplexing unit (MUX DMUX) 1518; a network interface 1519; and a video interface 1520.

The control unit 1511 controls the operations of each processing unit arranged inside the video processor 1332 such as the display interface 1512, the display engine 1513, the image processing engine 1514, and the codec engine 1516.

As illustrated in FIG. 41, the control unit 1511, for example, includes a main CPU 1531, a sub CPU 1532, and a system controller 1533. The main CPU 1531 executes a program used for controlling the operation of each processing unit arranged inside the video processor 1332 and the like. The main CPU 1531 generates a control signal according to the program or the like and supplies the control signal to each processing unit (in other words, controls the operation of each processing unit). The sub CPU 1532 achieves an auxiliary role of the main CPU 1531. For example, the sub CPU 1532 executes a child process, a subroutine, or the like of a program executed by the main CPU 1531. The system controller 1533 controls the operations of the main CPU 1531 and the sub CPU 1532 by performing designation of programs to be executed by the main CPU 1531 and the sub CPU 1532 and the like.

The display interface 1512 outputs image data, for example, to the connectivity 1321 (FIG. 39) and the like under the control of the control unit 1511. For example, the display interface 1512 converts image data that is digital data into an analog signal and outputs the analog signal as a reproduced video signal or the image data that is the digital data to a monitor device of the connectivity 1321 (FIG. 39) or the like.

The display engine 1513, under the control of the control unit 1511, performs various conversion processes such as a format conversion, a size conversion, and a color gamut conversion for the image data so as to match the hardware specification of a monitor device displaying the image and the like.

The image processing engine 1514 performs predetermined image processing such as a filter process used for improving the image quality and the like for the image data under the control of the control unit 1511.

The internal memory 1515 is a memory that is shared by the display engine 1513, the image processing engine 1514, and the codec engine 1516 and is disposed inside the video processor 1332. The internal memory 1515, for example, is used for data transfer among the display engine 1513, the image processing engine 1514, and the codec engine 1516. For example, the internal memory 1515 stores data supplied from the display engine 1513, the image processing engine 1514, or the codec engine 1516 and supplies the data to the display engine 1513, the image processing engine 1514, or the codec engine 1516 as is necessary (for example, according to a request). This internal memory 1515 may be realized by using any kind of memory device. However, generally, the internal memory is frequently used for storing data having a small volume such as image data in units of blocks and parameters, and accordingly, it is preferable to realize the internal memory using a semiconductor memory having a relatively small capacity (compared to the external memory 1312) and having high response speed such as a Static Random Access Memory (SRAM).

The codec engine 1516 performs processes relating to coding and decoding of image data. The coding/decoding system with which the codec engine 1516 is compliant is arbitrary, and the number of coding/decoding systems may be one or plural. For example, it may be configured such that the codec engine 1516 may have a codec function for a plurality of coding/decoding systems and be configured to perform coding of image data or decoding of coded data by using selected one of the coding/decoding systems.

In the example illustrated in FIG. 41, the codec engine 1516, for example, includes MPEG-2 Video 1541, AVC/H.264 1542, HEVC/H.265 1543, HEVC/H.265 (Scalable) 1544, HEVC/H.265 (Multi-view) 1545, and MPEG-DASH 1551 as functional blocks for the process relating to the codec.

The MPEG-2 Video 1541 is a functional block that codes or decodes image data according to the MPEG-2 system. The AVC/H.264 1542 is a functional block that codes or decodes image data according to the AVC system. The HEVC/H.265 1543 is a functional block that codes or decodes image data according to the HEVC system. The HEVC/H.265 (Scalable) 1544 is a functional block that performs scalable coding or scalable decoding of image data according to the HEVC system. The HEVC/H. 265 (Multi-view) 1545 is a functional block that performs multi-view coding or multi-view decoding of image data according to the HEVC system.

The MPEG-DASH 1551 is a functional block that transmits and receives image data according to a MPEG-Dynamic Adaptive Streaming over HTTP (MPEG-DASH) system. MPEG-DASH is a technology for performing video streaming using a HyperText Transfer Protocol (HTTP), and one of features thereof is that appropriate coded data among a plurality of pieces of coded data having mutually-different resolutions and the like, which is prepared in advance, is selected and transmitted in units of segments. The MPEG-DASH 1551 performs generation of a stream that is compliant with the standard, transmission control of the stream, and the like and uses the MPEG-2 Video 1541 to HEVC/H.265 (Multi-view) 1545 described above for coding and decoding image data.

The memory interface 1517 is an interface for the external memory 1312. The data supplied from the image processing engine 1514 or the codec engine 1516 is supplied to the external memory 1312 through the memory interface 1517. In addition, the data read from the external memory 1312 is supplied to the video processor 1332 (the image processing engine 1514 or the codec engine 1516) through the memory interface 1517.

The multiplexing/demultiplexing unit (MUX DMUX) 1518 performs multiplexing and demultiplexing of various kinds of data relating to an image such as a bit stream of coded data, image data, and a video signal. A method of the multiplexing/demultiplexing is arbitrary. For example, at the time of performing the multiplexing, the multiplexing/demultiplexing unit (MUX DMUX) 1518 may not only arrange a plurality of pieces of data into one but also add predetermined header information or the like to the data. In addition, at the time of performing the demultiplexing, the multiplexing/demultiplexing unit (MUX DMUX) 1518 may not only divide one piece of data into multiple parts but also add predetermined header information or the like to each divided data part. In other words, the multiplexing/demultiplexing unit (MUX DMUX) 1518 can convert the format of data through the multiplexing/demultiplexing process. For example, the multiplexing/demultiplexing unit (MUX DMUX) 1518 can convert a bit stream into a transport stream that is a bit stream of the transmission format or data (file data) of the recording file format by multiplexing the bitstream. It is apparent that an inverse conversion thereof can be performed by the demultiplexing process.

The network interface 1519 is an interface, for example, dedicated for the broadband modem 1333, the connectivity 1321 (all FIG. 39), or the like. The video interface 1520 is an interface, for example, dedicated for the connectivity 1321, the camera 1322 (all FIG. 39), or the like.

Next, an example of the operation of such a video processor 1332 will be described. For example, when a transport stream is received from an external network through the connectivity 1321, the broadband modem 1333 (all FIG. 39), or the like, the transport stream is supplied to the multiplexing/demultiplexing unit (MUX DMUX) 1518 through the network interface 1519, is demultiplexed, and is decoded by the codec engine 1516. For the image data acquired by the decoding process performed by the codec engine 1516, predetermined image processing is performed, for example, by the image processing engine 1514, and a predetermined conversion is performed by the display engine 1513. Then, resultant image data is supplied, for example, to the connectivity 1321 (FIG. 39) or the like through the display interface 1512, and an image thereof is displayed on a monitor. In addition, the image data, for example, acquired by the decoding process performed by the codec engine 1516 is recoded by the codec engine 1516, is multiplexed by the multiplexing/demultiplexing unit (MUX DMUX) 1518, is converted into file data, is output, for example, to the connectivity 1321 (FIG. 39) or the like through the video interface 1520, and is recorded on various recording media.

In addition, the file data of the coded data acquired by coding the image data, which is read from a recording medium not illustrated, for example, by the connectivity 1321 (FIG. 39) or the like is supplied to the multiplexing/demultiplexing unit (MUX DMUX) 1518 through the video interface 1520, is demultiplexed, and is decoded by the codec engine 1516. For the image data acquired by the decoding process performed by the codec engine 1516, predetermined image processing is performed by the image processing engine 1514 and a predetermined conversion is performed by the display engine 1513. Then, resultant image data is supplied, for example, to the connectivity 1321 (FIG. 39) or the like through the display interface 1512, and an image thereof is displayed on the monitor. In addition, the image data, for example, acquired by the decoding process performed by the codec engine 1516 is recoded by the codec engine 1516, is multiplexed by the multiplexing/demultiplexing unit (MUX DMUX) 1518, is converted into a transport stream, is supplied, for example, to the connectivity 1321, the broadband modem 1333 (all FIG. 39), or the like through the network interface 1519, and is transmitted to another apparatus not illustrated.

Here, the transmission/reception of the image data and the other data between each processing unit arranged inside the video processor 1332, for example, is performed using the internal memory 1515 or the external memory 1312. In addition, the power management module 1313, for example, controls the supply of power to the control unit 1511.

In a case where the present technology is applied to the video processor 1332 configured as such, the present technology according to each embodiment described above may be applied to the codec engine 1516. In other words, for example, the codec engine 1516 may be configured to include the functional blocks realizing the coding apparatus and the decoding apparatus according to the first and second embodiments. By the codec engine 1516 configuring as such, the video processor 1332 can acquire advantages similar to the advantages described above with reference to FIGS. 1 to 20.

In addition, in the codec engine 1516, the present technology (in other words, the functions of the image coding apparatus and the image decoding apparatus according to each embodiment described above) may be realized by hardware such as logic circuits or software such as an embedded program or may be realized by both the hardware and the software.

While two examples of the configuration of the video processor 1332 have been described as above, the configuration of the video processor 1332 is arbitrary and may be a configuration other than the two examples described above. Here, the video processor 1332 may be configured as either one semiconductor chip or a plurality of semiconductor chips. For example, the video processor may be configured as a three-dimensional stacked LSI. In addition, the video processor may be realized by a plurality of LSIs.

(Example of Application to Apparatus)

The video set 1300 may be built in various apparatuses that process image data. For example, the video set 1300 may be built in the television apparatus 900 (FIG. 35), the mobile phone 920 (FIG. 36), the recording/reproducing apparatus 940 (FIG. 37), the imaging apparatus 960 (FIG. 38), and the like. By building the video set 1300 therein, the apparatus can acquire advantages similar to those described above with reference to FIGS. 1 to 20.

Furthermore, some of the configurations of the video set 1300 described above may be configurations to which the present technology is applied in a case where the video processor 1332 is included therein. For example, only the video processor 1332 may be configured as a video processor to which the present technology is applied. In addition, as described above, the processor, the video module 1311, and the like denoted by the dotted line 1341 may be configured as a processor, a module, and the like to which the present technology is applied. Furthermore, for example, the video module 1311, the external memory 1312, the power management module 1313, and the front end module 1314 may be combined so as to be configured as a video unit 1361 to which the present technology is applied. In any of the configurations, the same advantages as those described above with reference to FIGS. 1 to 20 can be acquired.

In other words, any configuration that includes the video processor 1332, similarly to the case of the video set 1300, may be built in various apparatuses that process image data. For example, the video processor 1332, the processor denoted by the dotted line 1341, the video module 1311, or the video unit 1361 may be built in the television apparatus 900 (FIG. 35), the mobile phone 920 (FIG. 36), the recording/reproducing apparatus 940 (FIG. 37), the imaging apparatus 960 (FIG. 38), or the like. By building any configuration to which the present technology is applied into an apparatus, similarly to the case of the video set 1300, the apparatus can acquire the same advantages as those described above with reference to FIGS. 1 to 20.

In this specification, an example has been described in which various kinds of information such as the identification data, is multiplexed in the coded data and is transmitted from the coding side to the decoding side. However, a technique for transmitting such information is not limited to such a technique. For example, such information may be transmitted or recorded as individual data associated with a coded data without being multiplexed in the coded data. Here, the term "associated" represents that an image (it may be a part of an image such as a slice, block, or the like) included in a bit stream and information corresponding to the image are acquired with being linked to each other at the time of decoding the image and the information. In other words, the information may be transmitted in a transmission line other than that of the coded data. In addition, the information may be recorded on a recoding medium other than that for the coded data (or a different recording area of the same recording medium). Furthermore, the information and the coded data, for example, may be associated with each other in units of arbitrary parts such as multiple frames, one frame, or a part of the frame.

The present disclosure may be applied to a coding apparatus and a decoding apparatus that are used, as in MPEG, H.26x, or the like, when a bit stream compressed through an orthogonal transform such as a discrete cosine transform and motion compensation is received through a network medium such as satellite broadcasting, a cable TV, the internet, or the mobile phone or when the compressed bit stream is processed on a storage medium such as an optical disc, a magnetic disk, or a flash memory.

Furthermore, the coding system according to the present disclosure may be a coding system other than the HEVC system that performs coding in a unit having a recursive hierarchical structure.

In this specification, a system represents a set of a plurality of constituent elements (an apparatus, a module (component), and the like), and all the constituent elements do not need to be disposed in a same casing. Thus, a plurality of apparatuses that are housed in separate casings and are connected through a network and one apparatus in which a plurality of modules are housed in one casing are systems.

In addition, advantages described in this specification are merely examples, and the advantages are not limited thereto, but there may be another advantage.

An embodiment according to the present disclosure is not limited to the embodiment described above, but various changes may be made therein in a range not departing from the concept of the present disclosure.

For example, the present disclosure may take a configuration of cloud computing in which one function is divided and processed cooperatively by a plurality of apparatuses through a network.

In addition, each step described in each flowchart described above may be either executed by one apparatus or executed by a plurality of apparatuses in a shared manner.

Furthermore, in a case where a plurality of processes are included in one step, the plurality of processes included in the one step may be either executed by one apparatus or executed by a plurality of apparatuses in a shared manner.

The present disclosure may also take the following configurations.

(1)
A decoding apparatus including
a decoding unit that decodes a bit stream coded according to a coding standard having a profile in which a lowest compression rate at the time of coding an image is set for each of a plurality of tiers in units of blocks that are recursively divided.

(2)
The decoding apparatus described above in (1),
wherein the lowest compression rate set for each of the plurality of tiers is different for each level.

(3)
The decoding apparatus described above in (1) or (2),
wherein the plurality of tiers are a main tier and a high tier.

(4)
The decoding apparatus described above in (3),
wherein the lowest compression rate of the high tier of a level that is a predetermined level or a higher level and the lowest compression rate of the main tier are different from each other.

(5)
The decoding apparatus described above in (4),
wherein the predetermined level is level 5.

(6)
The decoding apparatus described above in (5),
wherein the lowest compression rate of the high tier of a level that is level 5 or a higher level is "4".

(7)
The decoding apparatus described above in one of (1) to (6),
wherein the coding standard is an H.265/HEVC standard, and the decoding unit decodes the coded bit stream according to the H.265/HEVC standard.

(8)
A decoding method using a decoding apparatus including
a decoding step of decoding a bit stream coded according to a coding standard having a profile in which a lowest compression rate at the time of coding an image is set for each of a plurality of tiers in units of blocks that are recursively divided.

(9)
A coding apparatus including
a coding unit that codes an image according to a coding standard having a profile in which a lowest compression rate at the time of coding an image is set for each of a plurality of tiers in units of blocks that are recursively divided.

(10)
The coding apparatus described above in (9),
wherein the lowest compression rate set for each of the plurality of tiers is different for each level.

(11)
The coding apparatus described above in (9) or (10),
wherein the plurality of tiers are a main tier and a high tier.

(12)
The coding apparatus described above in (11),
wherein the lowest compression rate of the high tier of a level that is a predetermined level or a higher level and the lowest compression rate of the main tier are different from each other.

(13)
The coding apparatus described above in (12),
wherein the predetermined level is level 5.

(14)
The coding apparatus described above in (13),
wherein the lowest compression rate of the high tier of a level that is level 5 or a higher level is "4".

(15)
The coding apparatus described above in one of (9) to (14),
wherein the coding standard is an H.265/HEVC standard, and the coding unit codes the image according to the H.265/HEVC standard.

(16)
A coding method using a coding apparatus including
a coding step of coding an image according to a coding standard having a profile in which a lowest compression rate at the time of coding an image is set for each of a plurality of tiers in units of blocks that are recursively divided.

REFERENCE SIGNS LIST

10 Coding apparatus
11 Setting unit
12 Coding unit
110 Decoding apparatus
112 Extraction unit
114 Decoding unit

The invention claimed is:

1. A decoding apparatus comprising:
a decoding unit configured to decode a bit stream coded according to a coding standard having a profile in which a lowest compression rate is set for each tier of a plurality of tiers including a main tier and a high tier,
wherein the lowest compression rate of the high tier of each respective level that is a predetermined level or higher and the lowest compression rate of the main tier of the respective level are different from each other, and
wherein the decoding unit is implemented via at least one processor.

2. The decoding apparatus according to claim 1, wherein the predetermined level is level 5.

3. The decoding apparatus according to claim 2, wherein the lowest compression rate of the high tier of the predetermined level or higher is "4".

4. The decoding apparatus according to claim 3, wherein the coding standard is an H.265/HEVC standard, and
wherein the decoding unit is configured to decode the coded bit stream according to the H.265/HEVC standard.

5. A decoding method using a decoding apparatus, the decoding method comprising:
decoding a bit stream coded according to a coding standard having a profile in which a lowest compression rate is set for each tier of a plurality of tiers including a main tier and a high tier,
wherein the lowest compression rate of the high tier of each respective that is a predetermined level or higher and the lowest compression rate of the main tier of the respective level are different from each other.

6. A coding apparatus comprising:
a coding unit configured to code an image according to a coding standard having a profile in which a lowest compression rate is set for each tier of a plurality of tiers including a main tier and a high tier,
wherein the lowest compression rate of the high tier of each respective that is a predetermined level or higher and the lowest compression rate of the main tier of the respective level are different from each other, and
wherein the coding unit is implemented via at least one processor.

7. The coding apparatus according to claim 6, wherein the predetermined level is level 5.

8. The coding apparatus according to claim 7, wherein the lowest compression rate of the high tier of the predetermined level or higher is "4".

9. The coding apparatus according to claim 8, wherein the coding standard is an H.265/HEVC standard, and
wherein the coding unit is configured to code the image according to the H.265/HEVC standard.

10. A coding method using a coding apparatus, the coding method comprising:
coding an image according to a coding standard having a profile in which a lowest compression rate is set for each tier of a plurality of tiers including a main tier and a high tier,
wherein the lowest compression rate of the high tier of each respective level that is a predetermined level or higher and the lowest compression rate of the main tier of the respective level are different from each other.

* * * * *